US012186751B2

(12) United States Patent
Salmanzadeh et al.

(10) Patent No.: US 12,186,751 B2
(45) Date of Patent: Jan. 7, 2025

(54) DEVICES AND SYSTEMS INCORPORATING ACOUSTIC ORDERING AND METHODS OF USE THEREOF

(71) Applicant: 10X Genomics, Inc., Pleasanton, CA (US)

(72) Inventors: Alireza Salmanzadeh, Pleasanton, CA (US); Rajiv Bharadwaj, Pleasanton, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 0 days.

(21) Appl. No.: 16/915,240

(22) Filed: Jun. 29, 2020

(65) Prior Publication Data

US 2020/0406261 A1 Dec. 31, 2020

Related U.S. Application Data

(60) Provisional application No. 62/868,566, filed on Jun. 28, 2019.

(51) Int. Cl.
*B01L 3/00* (2006.01)

(52) U.S. Cl.
CPC ... *B01L 3/502761* (2013.01); *B01L 2200/027* (2013.01); *B01L 2200/0652* (2013.01); *B01L 2400/0496* (2013.01)

(58) Field of Classification Search
CPC ....... B01L 3/502761; B01L 2400/0496; B01L 2200/0652; B01L 2200/027; B01L 2300/0867; B01L 2200/0673; B01L 3/502784; B01L 2400/0436; B01L 2400/0439
See application file for complete search history.

(56) References Cited

U.S. PATENT DOCUMENTS

| | | | |
|---|---|---|---|
| 5,700,692 | A | 12/1997 | Sweet |
| 5,842,787 | A | 12/1998 | Kopf-Sill et al. |
| 5,872,010 | A | 2/1999 | Karger et al. |
| 6,216,538 | B1 | 4/2001 | Yasuda et al. |
| 6,296,020 | B1 | 10/2001 | McNeely et al. |
| 6,432,290 | B1 | 8/2002 | Harrison et al. |
| 6,778,724 | B2 | 8/2004 | Wang et al. |
| 6,808,075 | B2 | 10/2004 | Bohm et al. |
| 6,877,528 | B2 | 4/2005 | Gilbert et al. |
| 6,880,576 | B2 | 4/2005 | Karp et al. |

(Continued)

FOREIGN PATENT DOCUMENTS

| | | | |
|---|---|---|---|
| WO | WO-2007/138178 | A2 | 12/2007 |
| WO | WO-2010/128858 | A1 | 11/2010 |

(Continued)

OTHER PUBLICATIONS

Guldiken et al.(Sheathless Size-Based Acoustic Particle Separation, Sensors, 2102, 12, pp. 905-922 (Year: 2012).*

(Continued)

*Primary Examiner* — Matthew D Krcha
*Assistant Examiner* — Brittany I Fisher
(74) *Attorney, Agent, or Firm* — Clark & Elbing LLP

(57) ABSTRACT

Devices, systems, and their methods of use, for generating droplets are provided. One or more geometric parameters of a microfluidic channel can be selected to generate droplets of a desired and predictable droplet size.

20 Claims, 24 Drawing Sheets

600

(56) References Cited

U.S. PATENT DOCUMENTS

| | | | |
|---|---|---|---|
| 6,994,218 B2 | 2/2006 | Kawano et al. | |
| 7,264,972 B2 | 9/2007 | Foster | |
| 7,452,725 B2 | 11/2008 | Leary et al. | |
| 7,699,767 B2 | 4/2010 | Mueth et al. | |
| 7,901,947 B2 | 3/2011 | Pollack et al. | |
| 7,943,671 B2 | 5/2011 | Herminghaus et al. | |
| 8,096,421 B2 | 1/2012 | Shinoda | |
| 8,186,913 B2 | 5/2012 | Toner et al. | |
| 8,387,803 B2 | 3/2013 | Thorslund et al. | |
| 8,467,040 B2 | 6/2013 | Luscher | |
| 8,524,173 B2 | 9/2013 | Yamanaka et al. | |
| 8,529,026 B2 | 9/2013 | Clarke et al. | |
| 8,592,221 B2 | 11/2013 | Fraden et al. | |
| 8,741,192 B2 | 6/2014 | Torii et al. | |
| 8,820,538 B1 | 9/2014 | Lin | |
| 8,821,006 B2 | 9/2014 | Norikane et al. | |
| 8,871,500 B2 | 10/2014 | Foster et al. | |
| 8,944,083 B2 | 2/2015 | Collier et al. | |
| 9,012,390 B2 | 4/2015 | Holtze et al. | |
| 9,017,623 B2 | 4/2015 | Fraden et al. | |
| 9,133,009 B2 | 9/2015 | Baroud et al. | |
| 9,399,215 B2 | 7/2016 | Cauley, III et al. | |
| 9,403,294 B2 | 8/2016 | Cauley, III | |
| 9,638,620 B2 | 5/2017 | Di Carlo et al. | |
| 9,700,891 B2 | 7/2017 | Smith et al. | |
| 10,011,872 B1 | 7/2018 | Belgrader et al. | |
| 10,323,278 B2 | 6/2019 | Belgrader et al. | |
| 2001/0036669 A1 | 11/2001 | Jedrzejewski et al. | |
| 2003/0005967 A1 | 1/2003 | Karp | |
| 2004/0108917 A1 | 6/2004 | Jian et al. | |
| 2004/0109793 A1 | 6/2004 | McNeely et al. | |
| 2007/0065808 A1 | 3/2007 | Bohm et al. | |
| 2007/0166200 A1 | 7/2007 | Zhou et al. | |
| 2008/0038810 A1 | 2/2008 | Pollack et al. | |
| 2008/0050283 A1 | 2/2008 | Chou et al. | |
| 2009/0090422 A1 | 4/2009 | Baroud et al. | |
| 2009/0269824 A1 | 10/2009 | Kim et al. | |
| 2010/0006441 A1 | 1/2010 | Renaud et al. | |
| 2010/0018584 A1* | 1/2010 | Bransky | B01L 3/502792 137/831 |
| 2010/0021984 A1 | 1/2010 | Edd et al. | |
| 2011/0000560 A1 | 1/2011 | Miller et al. | |
| 2011/0086377 A1 | 4/2011 | Thwar et al. | |
| 2011/0154890 A1 | 6/2011 | Holm et al. | |
| 2011/0223314 A1 | 9/2011 | Zhang et al. | |
| 2012/0091059 A1 | 4/2012 | Beer et al. | |
| 2012/0121480 A1 | 5/2012 | Frenz et al. | |
| 2012/0142018 A1 | 6/2012 | Jiang | |
| 2012/0236299 A1 | 9/2012 | Chiou et al. | |
| 2012/0315690 A1 | 12/2012 | Di Carlo et al. | |
| 2013/0236901 A1 | 9/2013 | Potier et al. | |
| 2014/0008307 A1 | 1/2014 | Guldiken et al. | |
| 2014/0155295 A1 | 6/2014 | Hindson et al. | |
| 2014/0179544 A1 | 6/2014 | Steenblock et al. | |
| 2014/0326339 A1 | 11/2014 | Toner et al. | |
| 2015/0034163 A1 | 2/2015 | Abate et al. | |
| 2015/0224466 A1 | 8/2015 | Hindson et al. | |
| 2015/0258543 A1 | 9/2015 | Baroud et al. | |
| 2015/0267246 A1 | 9/2015 | Baroud et al. | |
| 2015/0292988 A1* | 10/2015 | Bharadwaj | B01L 3/0241 506/27 |
| 2015/0298157 A1* | 10/2015 | Weitz | C12M 47/04 239/4 |
| 2015/0336096 A1 | 11/2015 | Smith et al. | |
| 2015/0360236 A1 | 12/2015 | Garcia et al. | |
| 2016/0097087 A1 | 4/2016 | Wiyatno et al. | |
| 2016/0250637 A1 | 9/2016 | Neild et al. | |
| 2017/0009274 A1 | 1/2017 | Abate et al. | |
| 2017/0114385 A1 | 4/2017 | Di Carlo et al. | |
| 2017/0138935 A1 | 5/2017 | Rivas | |
| 2017/0165663 A1 | 6/2017 | Hong et al. | |
| 2017/0266653 A1* | 9/2017 | Pollack | B03C 1/284 |
| 2018/0056294 A1 | 3/2018 | Di Carlo et al. | |
| 2018/0193829 A1 | 7/2018 | Boitard et al. | |
| 2018/0214874 A1 | 8/2018 | Koksal et al. | |
| 2018/0334670 A1* | 11/2018 | Bharadwaj | C12N 15/1075 |
| 2019/0307946 A1 | 10/2019 | Fiering et al. | |
| 2020/0290048 A1 | 9/2020 | Bharadwaj et al. | |
| 2021/0053053 A1 | 2/2021 | Salmanzadeh et al. | |
| 2021/0205811 A1 | 7/2021 | Salmanzadeh et al. | |

FOREIGN PATENT DOCUMENTS

| | | |
|---|---|---|
| WO | WO-2010/151776 A2 | 12/2010 |
| WO | WO-2013/112121 A1 | 8/2013 |
| WO | WO-2015/132317 A1 | 9/2015 |
| WO | WO-2015/132318 A1 | 9/2015 |
| WO | WO-2015/160919 A1 | 10/2015 |
| WO | WO-2015/191534 A2 | 12/2015 |
| WO | WO-2016/035284 A1 | 3/2016 |
| WO | WO-2016/065056 A1 | 4/2016 |
| WO | WO-2016/075172 A1 | 5/2016 |
| WO | WO-2016/151107 A1 | 9/2016 |
| WO | WO-2017/005872 A1 | 1/2017 |
| WO | WO-2017/075549 A1 | 5/2017 |
| WO | WO-2017/083375 A1 | 5/2017 |
| WO | WO-2017/117490 A1 | 7/2017 |
| WO | WO-2017/180949 A1 | 10/2017 |
| WO | WO-2019/157529 A1 | 8/2019 |

OTHER PUBLICATIONS

Abate et al., "High-throughput injection with microfluidics using picoinjectors," Proc Natl Acad Sci USA. 107(45): 19163-6 (2010).

Abate et al., "Valve based flow focusing for drop formation," Appl Phys Lett. 94(2):023503-1-3 (2009) (3 pages).

AGC Chemicals, "Amorphous Fluoropolymer CYTOP: Chemistry for a Blue Planet," Jul. 2015 (10 pages).

Akartuna et al., "Chemically induced coalescence in droplet-based microfluidics," Lab Chip. DOI:10.1039/c4lc01285b (2014) (5 pages).

Attia et al., "Micro-injection moulding of polymer microfluidic devices," Microfluid Nanofluidics. 7(1): 1-28 (2009) (30 pages).

Baret et al., "Fluorescence-activated droplet sorting (FADS): efficient microfluidic cell sorting based on enzymatic activity," Lab Chip. 9(13): 1850-1859 (2009).

Becker et al., "Polymer microfabrication technologies for microfluidic systems," Anal Bioanal Chem. 390(1): 89-111 (2008).

Bransky et al., "A microfluidic droplet generator based on a piezoelectric actuator," Lab Chip. 9(4): 516-520 (2009).

Brouzes et al., "Droplet microfluidic technology for single-cell high-throughput screening," Proc Natl Acad Sci U S A. 106(34): 14195-14200 (2009).

Brower et al., "Optimized double emulsion flow cytometry with high-throughput single droplet isolation," bioRxiv preprint posted online Nov. 8, 2019; doi: http://dx.doi.org/10.1101/803460.

Chakraborty et al., "Microfluidic step-emulsification in axisymmetric geometry," Lab Chip. 17(21): 3609-3620 (2017).

Chokkalingam et al., "Self-synchronizing pairwise production of monodisperse droplets by microfluidic step emulsification," Appl Phys Lett. 93(25): 254101-1-254101-3 (2008).

Chou et al., "Disposable microdevices for DNA analysis and cell sorting," Proc Solid-State Sensor and Actuator Workshop, Jun. 8-11, Hilton Head, SC, pp. 11-14 (1998).

Dangla et al., "Droplet microfluidics driven by gradients of confinement," Proc Natl Acad Sci U S A. 110(3): 853-858 (2013).

Dangla et al., "The physical mechanisms of step emulsification," J Phys D Appl Phys. 46(11):114003 (2013) (8 pages).

De Mello et al., Chip technology for micro-separation. *Microsystem Technology: Biomethods,* vol. 10. Köhler J.M., Mejevaia T., Saluz H.P., 129-177 (1999).

Demirci et al., "Single cell epitaxy by acoustic picolitre droplets," Lab Chip. 7(9): 1139-1145 (2007).

Doerr, "The smallest bioreactor," Nat Methods. 2(5): 326 (2005).

Draper et al., "Compartmentalization of electrophoretically separated analytes in a multiphase microfluidic platform," Anal Chem. 84(13): 5801-5808 (2012).

Eggersdorfer et al., "Supplementary Information: Tandem emulsification for high-throughput production of double emulsions," Lab Chip. 17(5):936-942 (2017) (2 pages).

(56) References Cited

OTHER PUBLICATIONS

Eggersdorfer et al., "Tandem emulsification for high-throughput production of double emulsions," Lab Chip. 17(5): 936-942 (2017).
Fredrickson et al., "Macro-to-micro interfaces for microfluidic devices," Lab Chip. 4(6): 526-533 (2004).
Galambos et al., "Precision alignment packaging for microsystems with multiple fluid connections," Proceedings of 2001 ASME: International Mechanical Engineering Conference and Exposition, Nov. 11-16, New York, NY. pp. 1-8 (2001).
Garstecki et al., "Formation of monodisperse bubbles in a microfluidic flow-focusing device," Appl Phys Lett. 85(13): 2649-2651 (2004).
Hati et al., "Production of monodisperse drops from viscous fluids," Lab Chip. DOI: 10.1039/c7lc01322a (2018) (7 pages).
He et al., "Selective encapsulation of single cells and subcellular organelles into picoliter- and femtoliter-volume droplets," Anal Chem. 77(6): 1539-1544 (2005).
Huang et al., "Coating of poly(dimethylsiloxane) with n-dodecyl-Beta-D-maltoside to minimize nonspecific protein adsorption," Lab Chip. 5(10):1005-1007 (2005).
Huang et al., "Collective generation of milliemulsions by step-emulsification," RSC Adv. 7(24): 14932-14938 (2017).
Hwang et al., "Surface modification of cyclic olefin copolymer substrate by oxygen plasma treatment," Surf Coat Tech. 202(15): 3669-3674 (2008).
Kahkeshani et al., "Drop formation using ferrofluids driven magnetically in a step emulsification device," Lab Chip. 16(13): 2474-2480 (2016).
Kawai et al., Mass-production system of nearly monodisperse diameter gel particles using droplets formation in a microchannel. *Micro Total Analysis Systems 2002,* vol. 1. Baba Y., Shoji S., van den Berg A., 368-370 (2002).
Kobayashi et al., "Effect of slot aspect ratio on droplet formation from silicon straight-through microchannels," J Colloid Interface Sci. 279(1):277-80 (2004).
Kobayashi et al., "Preparation characteristics of oil-in-water emulsions using differently charged surfactants in straight-through microchannel emulsification," Colloids Surf A Physicochem Eng Asp. 229(1-3): 33-41 (2003).
Li et al., "Step-emulsification in a microfluidic device," Lab Chip. 15(4):1023-31 (2015).
Luo et al., "Microfluidic Single-Cell Manipulation and Analysis: Methods and Applications," Micromachines (Basel). 10(2):104 (2019) (31 pages).
Maan et al., "Microfluidic emulsification in food processing," J Food Eng. 147:1-7 (2015).
Mittal et al., "Dynamics of step-emulsification: From a single to a collection of emulsion droplet generators," Phys Fluids. 26: 082109-1-082109-14 (2014).
Sahin et al., "Microfluidic EDGE emulsification: the importance of interface interactions on droplet formation and pressure stability," Sci Rep. 6(26407):1-7 (2016).
Barea et al., "Recent Advances in Droplet-based Microfluidic Technologies for Biochemistry and Molecular Biology," Micromachines (Basel). 10(6):412 (2019) (25 pages).
Schuler et al., "Digital droplet PCR on disk," Lab Chip. 16 (1): 208-216 (2016).
Shaikh et al., "A modular microfluidic architecture for integrated biochemical analysis," Proc Natl Acad Sci U S A. 102(28):9745-50 (2005).
Shim et al., "Supporting Information: Control and measurement of the phase behavior of aqueous solutions using microfluidics," S1-S13 (2007) (13 pages).
Stolovicki et al., "Throughput enhancement of parallel step emulsifier devices by shear-free and efficient nozzle clearance," Lab Chip. DOI: 10.1039/c7lc01037k (2017) (7 pages).
Su et al., "Microfluidics-based biochips: technology issues, implementation platforms, and design- automation challenges," IEEE Transactions on Computer-Aided Design of Integrated Circuits and Systems. 25(2):211-23 (2006).
Van Dijke et al., "EDGE emulsification for food-grade dispersions," J Food Eng. 97(3): 348-354 (2010).
Van Dijke et al., "Effect of viscosities of dispersed and continuous phases in microchannel oil-in-water emulsification," Microfluid Nanofluid. 9(1):77-85 (2010).
Van Dijke et al., "Microchannel Emulsification: From Computational Fluid Dynamics to Predictive Analytical Model," Langmuir. 24(18): 10107-10115 (2008).
Van Dijke et al., "Parallelized edge-based droplet generation (EDGE) devices," Lab Chip. 9(19): 2824-2830 (2009).
Van Dijke et al., "Simultaneous Formation of Many Droplets in a Single Microfluidic Droplet Formation Unit," AlChE J. 56(3): 833-836 (2010).
Van Dijke et al., "The mechanism of droplet formation in microfluidic EDGE systems," Soft Matter. 6(2): 321-330 (2010).
Xia et al., "Soft Lithography," Angew Chem Int Ed Engl. 37:(5)551-575 (1998) (26 pages).
Zeng et al., "High-performance single cell genetic analysis using microfluidic emulsion generator arrays," Anal Chem. 82(8):3183-90 (2010).
Wu et al., "Actuating and detecting of microdroplet using slanted finger interdigital transducers," J Appl Phys. 98(2):024903 (2005) (7 pages).
Wang et al., "Microfluidic approach for encapsulation via double emulsions," Current Opinion in Pharmacology. 18:35-41 (Oct. 2014).

* cited by examiner

DEVICES AND SYSTEMS INCORPORATING ACOUSTIC ORDERING AND METHODS OF USE THEREOF

BACKGROUND OF THE INVENTION

Many biomedical applications rely on high-throughput assays of samples combined with one or more reagents in droplets. For example, in both research and clinical applications, high-throughput genetic tests using target-specific reagents are able to provide information about samples in drug discovery, biomarker discovery, and clinical diagnostics, among others. Many of these applications, following the formation of a droplet or particle, rely on the presence of a reagent or material within the droplet or particle.

However, most droplet loading processes occur by random, Poisson statistics and thus are inefficient. This inefficiency reveals that a balance needs to be struck between two limiting scenarios. The first is the reduction of the particle concentration to a level that prevents droplets containing multiple particles, which leads to numerous droplets that are empty. The second scenario is the increase in particle concentrations to ensure formed droplets that contain a single particle, which further results in droplets containing multiple particles. Both of these scenarios are undesirable. There exist solutions to overcome Poisson statistics with respect to incorporating particles into droplets, but each solution suffers from numerous drawbacks. Existing solutions include the incorporation of deformable particles, devices with specific control of the liquid inertia, optical tweezers, and magnetic particle manipulation. Devices incorporating inertial control of the liquids in the device are limited to solutions with high concentrations of specific sized particles, largely due to the limited dimensions possible for the channels within the device that ensure a high aspect ratio. These geometric constraints further limit the flow rates within the device. Optical tweezers have expensive and difficult to use optical systems, and due to the power density of the lasers used to entrain particles, the heat generated may cause damage to the particles before incorporation into a droplet. Magnetic manipulation of particles requires the use of labeling reagents, which for certain particles, such as cells, may impact viability post-incorporation. Accordingly, devices and methods that enable accurate and consistent placement of reagent materials within droplets or particles would be advantageous.

SUMMARY OF THE INVENTION

The present invention concerns microfluidic devices that are capable of ordering particles in a liquid. These devices may further be used to produce droplets of a first liquid in a second liquid, immiscible in the first liquid, where the occupancy of the droplets with particles is controlled by the ordering of the particle in the first and/or second liquids.

In one aspect, the invention provides a device for ordering particles in a liquid. The device includes a first channel having a first inlet and a first outlet and a first source of acoustic energy operatively coupled to the first channel. Actuation of the first source of acoustic energy propagates an acoustic wave having one or more nodes in the first channel where the particles in the liquid in the first channel are ordered according to the one or more nodes.

In some embodiments, the first source of acoustic energy includes an interdigitated transducer or a piezoelectric material.

In further embodiments, the device includes a second channel having a second inlet and second outlet, where the second channel intersects the first channel between the first inlet and first outlet. In some embodiments, the device includes a second source of particles in fluid communication with the second channel. In further embodiments, the device includes a second source of acoustic energy operatively coupled to the second channel, where actuation of the second source of acoustic energy propagates an acoustic wave having one or more nodes in the second channel, where particles in liquid in the second channel are ordered according to the one or more nodes. In some embodiments, the second source of acoustic energy includes an interdigitated transducer or a piezoelectric material.

In further embodiments, the device includes a collection region in fluid communication with the first outlet. In particular embodiments, the collection region is a reservoir. In further embodiments, the device includes a droplet formation region configured to form droplets comprising a particle, where the droplet formation region is in fluid communication with the first outlet.

In a related aspect, the invention includes a method of ordering particles in a liquid by: a) providing a device including a first channel having a first inlet and a first outlet and a first source of acoustic energy operatively coupled to the first channel; b) actuating the first source of acoustic energy of the device to propagate an acoustic wave having one or more nodes in the first channel; and c) allowing particles in a liquid in the first channel to order according to the one or more nodes.

In some embodiments, the first source of acoustic energy includes an interdigitated transducer or a piezoelectric material. In further embodiments, the device includes a collection region in fluid communication with the first outlet. In particular embodiments, the collection region is a reservoir. In some embodiments, the particle includes a cell, a bead, or a combination thereof.

In another related aspect, the invention includes a method of producing droplets including a particle by: a) providing a device including a first channel having a first inlet and a first outlet, a first source of acoustic energy operatively coupled to the first channel; and a droplet formation region, where the droplet formation region is in fluid communication with the first outlet; b) actuating the first source of acoustic energy of the device to propagate an acoustic wave having one or more nodes in the first channel; and c) allowing particles in a liquid in the first channel to order according to the one or more nodes so that the droplets produced by the droplet formation region preferentially contain a specified number of particles.

In some embodiments, the first source of acoustic energy includes an interdigitated transducer or a piezoelectric material. In further embodiments, the device includes a collection region in fluid communication with the first outlet. In particular embodiments, the collection region is a reservoir.

In further embodiments, the device includes a second channel having a second inlet and second outlet, where the second channel intersects the first channel between the first inlet and first outlet. In further embodiments, the device includes a second source of acoustic energy operatively coupled to the second channel, where actuation of the second source of acoustic energy propagates an acoustic wave having one or more nodes in the second channel, where particles in liquid in the second channel are ordered according to the one or more nodes. In some embodiments, the second source of acoustic energy includes an interdigitated transducer or a piezoelectric material.

In further embodiments, the method includes the step of actuating the second source of acoustic energy and allowing particles in the second liquid to order according to the one or more nodes, where a specified number of particles in the first channel are preferentially associated with a specified number of particles in the second channel at the intersection of the first and second channels. In particular embodiments, the specified number of particles in the first channel is 1 and the specified number of particles in the second channel is 1. In certain embodiments, the particles in the first channel include a cell, a bead, or a combination thereof, in particular a bead. In other embodiments, the particles in the second channel include a cell, a bead, or a combination thereof, in particular a cell.

In yet another related aspect, the invention provides a system for ordering particles in a liquid, the system including a device comprising a first channel having a first inlet and a first outlet and a first source of acoustic energy operatively coupled to the first channel. Actuation of the first source of acoustic energy propagates an acoustic wave having one or more nodes in the first channel, where particles in the liquid in the first channel are ordered according to the one or more nodes.

In further embodiments, the device includes a first source of particles in fluid communication with the first inlet. In some embodiments, the first source of acoustic energy is an interdigitated transducer or a piezoelectric material. In further embodiments, the device includes a collection region in fluid communication with the first outlet. In particular embodiments, the collection region is a reservoir. In further embodiments, the device includes a second channel having a second inlet and second outlet, where the second channel intersects the first channel between the first inlet and first outlet. In further embodiments, the device includes a second source of particles in fluid communication with the second channel. In certain embodiments, the system includes a second source of acoustic energy operatively coupled to the second channel, where actuation of the second source of acoustic energy propagates an acoustic wave with one or more nodes in the second channel. In some embodiments, the second source of acoustic energy is an interdigitated transducer or a piezoelectric material.

In some embodiments, the particles in the first channel and/or the second channel include a cell, a bead, or a combination thereof.

Examples of various droplet formation regions are described herein.

In embodiments of any aspect of the invention, the acoustic wave is a standing wave. Alternatively, it can be a traveling wave. When stationary, the devices, systems, or methods may include pumps or other fluid transports to transport the ordered particles in the first and/or second channels.

DEFINITIONS

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

The term "about", as used herein, refers to +/−10% of a recited value.

The terms "adaptor(s)", "adapter(s)" and "tag(s)" may be used synonymously. An adaptor or tag can be coupled to a polynucleotide sequence to be "tagged" by any approach including ligation, hybridization, or other approaches.

The term "associated with," as used herein, generally refers to the number of one type of particle, such as a non-biological particle, e.g., a bead, e.g., a gel bead, that is present at the point of droplet formation with a specific number of a different type of particle, such as a biological particle, e.g., a cell. The number of each type of particle that is present at the point of droplet formation may be controlled by a physical parameter, such as a liquid flow rate or the frequency/wavelength of an acoustic wave.

The term "barcode," as used herein, generally refers to a label, or identifier, that conveys or is capable of conveying information about an analyte. A barcode can be part of an analyte. A barcode can be a tag attached to an analyte (e.g., nucleic acid molecule) or a combination of the tag in addition to an endogenous characteristic of the analyte (e.g., size of the analyte or end sequence(s)). A barcode may be unique. Barcodes can have a variety of different formats. For example, barcodes can include: polynucleotide barcodes; random nucleic acid and/or amino acid sequences; and synthetic nucleic acid and/or amino acid sequences. A barcode can be attached to an analyte in a reversible or irreversible manner. A barcode can be added to, for example, a fragment of a deoxyribonucleic acid (DNA) or ribonucleic acid (RNA) sample before, during, and/or after sequencing of the sample. Barcodes can allow for identification and/or quantification of individual sequencing-reads in real time.

The term "bead," as used herein, generally refers to a particle. The bead may be a solid or semi-solid particle. The bead may be a gel bead. The gel bead may include a polymer matrix (e.g., matrix formed by polymerization or cross-linking). The polymer matrix may include one or more polymers (e.g., polymers having different functional groups or repeat units). Polymers in the polymer matrix may be randomly arranged, such as in random copolymers, and/or have ordered structures, such as in block copolymers. Cross-linking can be via covalent, ionic, or inductive, interactions, or physical entanglement. The bead may be a macromolecule. The bead may be formed of nucleic acid molecules bound together. The bead may be formed via covalent or non-covalent assembly of molecules (e.g., macromolecules), such as monomers or polymers. Such polymers or monomers may be natural or synthetic. Such polymers or monomers may be or include, for example, nucleic acid molecules (e.g., DNA or RNA). The bead may be formed of a polymeric material. The bead may be magnetic or non-magnetic. The bead may be rigid. The bead may be flexible and/or compressible. The bead may be disruptable or dissolvable. The bead may be a solid particle (e.g., a metal-based particle including but not limited to iron oxide, gold or silver) covered with a coating comprising one or more polymers. Such coating may be disruptable or dissolvable.

The term "biological particle," as used herein, generally refers to a discrete biological system derived from a biological sample. The biological particle may be a virus. The biological particle may be a cell or derivative of a cell. The biological particle may be an organelle from a cell. Examples of an organelle from a cell include, without limitation, a nucleus, endoplasmic reticulum, a ribosome, a Golgi apparatus, an endoplasmic reticulum, a chloroplast, an endocytic vesicle, an exocytic vesicle, a vacuole, and a lysosome. The biological particle may be a rare cell from a population of cells. The biological particle may be any type of cell, including without limitation prokaryotic cells, eukaryotic cells, bacterial, fungal, plant, mammalian, or other animal cell type, mycoplasmas, normal tissue cells, tumor cells, or any other cell type, whether derived from single cell or multicellular organisms. The biological particle may be a constituent of a cell. The biological particle may be or may include DNA, RNA, organelles, proteins, or any combination thereof. The biological particle may be or may include a matrix (e.g., a gel or polymer matrix) comprising a cell or one or more constituents from a cell (e.g., cell bead), such as DNA, RNA, organelles, proteins, or any combination thereof, from the cell. The biological particle may be obtained from a tissue of a subject. The biological particle may be a hardened cell. Such hardened cell may or may not include a cell wall or cell membrane. The biological particle may include one or more constituents of a cell but may not include other constituents of the cell. An example of such constituents is a nucleus or another organelle of a cell. A cell may be a live cell. The live cell may be capable of being cultured, for example, being cultured when enclosed in a gel or polymer matrix or cultured when comprising a gel or polymer matrix.

The term "fluidically connected", as used herein, refers to a direct connection between at least two device elements, e.g., a channel, reservoir, etc., that allows for fluid to move between such device elements without passing through an intervening element.

The term "genome," as used herein, generally refers to genomic information from a subject, which may be, for example, at least a portion or an entirety of a subject's hereditary information. A genome can be encoded either in DNA or in RNA. A genome can comprise coding regions that code for proteins as well as non-coding regions. A genome can include the sequence of all chromosomes together in an organism. For example, the human genome has a total of 46 chromosomes. The sequence of all of these together may constitute a human genome.

The term "in fluid communication with", as used herein, refers to a connection between at least two device elements, e.g., a channel, reservoir, etc., that allows for fluid to move between such device elements with or without passing through one or more intervening device elements.

The term "macromolecular constituent," as used herein, generally refers to a macromolecule contained within or from a biological particle. The macromolecular constituent may comprise a nucleic acid. In some cases, the biological particle may be a macromolecule. The macromolecular constituent may comprise DNA or a DNA molecule. The macromolecular constituent may comprise RNA or an RNA molecule. The RNA may be coding or non-coding. The RNA may be messenger RNA (mRNA), ribosomal RNA (rRNA) or transfer RNA (tRNA), for example. The RNA may be a transcript. The RNA molecule may be (i) a clustered regularly interspaced short palindromic (CRISPR) RNA molecule (crRNA) or (ii) a single guide RNA (sgRNA) molecule. The RNA may be small RNA that are less than 200 nucleic acid bases in length, or large RNA that are greater than 200 nucleic acid bases in length. Small RNAs may include 5.8S ribosomal RNA (rRNA), 5S rRNA, transfer RNA (tRNA), microRNA (miRNA), small interfering RNA (siRNA), small nucleolar RNA (snoRNAs), Piwi-interacting RNA (piRNA), tRNA-derived small RNA (tsRNA) and small rDNA-derived RNA (srRNA). The RNA may be double-stranded RNA or single-stranded RNA. The RNA may be circular RNA. The macromolecular constituent may comprise a protein. The macromolecular constituent may comprise a peptide. The macromolecular constituent may comprise a polypeptide or a protein. The polypeptide or protein may be an extracellular or an intracellular polypeptide or protein. The macromolecular constituent may also comprise a metabolite. These and other suitable macromolecular constituents (also referred to as analytes) will be appreciated by those skilled in the art (see U.S. Pat. Nos. 10,011,872 and 10,323,278, and WO/2019/157529 each of which is incorporated herein by reference in its entirety).

The term "molecular tag," as used herein, generally refers to a molecule capable of binding to a macromolecular constituent. The molecular tag may bind to the macromolecular constituent with high affinity. The molecular tag may bind to the macromolecular constituent with high specificity. The molecular tag may comprise a nucleotide sequence. The molecular tag may comprise an oligonucleotide or polypeptide sequence. The molecular tag may comprise a DNA aptamer. The molecular tag may be or comprise a primer. The molecular tag may be or comprise a protein. The molecular tag may comprise a polypeptide. The molecular tag may be a barcode.

The term "oil," as used herein, generally refers to a liquid that is not miscible with water. An oil may have a density higher or lower than water and/or a viscosity higher or lower than water.

The term, "preferentially," as used herein, generally refers to an event occurring at a greater frequency that would be predicted by Poisson statistics.

The term "sample," as used herein, generally refers to a biological sample of a subject. The biological sample may be a nucleic acid sample or protein sample. The biological sample may be derived from another sample. The sample may be a tissue sample, such as a biopsy, core biopsy, needle aspirate, or fine needle aspirate. The sample may be a liquid sample, such as a blood sample, urine sample, or saliva sample. The sample may be a skin sample. The sample may be a cheek swap. The sample may be a plasma or serum sample. The sample may include a biological particle, e.g., a cell or virus, or a population thereof, or it may alternatively be free of biological particles. A cell-free sample may include polynucleotides. Polynucleotides may be isolated from a bodily sample that may be selected from the group consisting of blood, plasma, serum, urine, saliva, mucosal excretions, sputum, stool and tears.

The term "sequencing," as used herein, generally refers to methods and technologies for determining the sequence of nucleotide bases in one or more polynucleotides. The polynucleotides can be, for example, nucleic acid molecules such as deoxyribonucleic acid (DNA) or ribonucleic acid (RNA), including variants or derivatives thereof (e.g., single stranded DNA). Sequencing can be performed by various systems currently available, such as, without limitation, a sequencing system by ILLUMINA®, Pacific Biosciences (PACBIO®), Oxford NANOPORE®, or Life Technologies (ION TORRENT®). Alternatively or in addition, sequencing may be performed using nucleic acid amplification, polymerase chain reaction (PCR) (e.g., digital PCR, quantitative PCR, or real time PCR), or isothermal amplification. Such systems may provide a plurality of raw genetic data corresponding to the genetic information of a subject (e.g., human), as generated by the systems from a sample provided by the subject. In some examples, such systems provide sequencing reads (also "reads" herein). A read may include a string of nucleic acid bases corresponding to a sequence of a nucleic acid molecule that has been sequenced. In some situations, systems and methods provided herein may be used with proteomic information.

The term "subject," as used herein, generally refers to an animal, such as a mammal (e.g., human) or avian (e.g., bird), or other organism, such as a plant. The subject can be a vertebrate, a mammal, a mouse, a primate, a simian or a human. Animals may include, but are not limited to, farm animals, sport animals, and pets. A subject can be a healthy or asymptomatic individual, an individual that has or is suspected of having a disease (e.g., cancer) or a pre-disposition to the disease, or an individual that is in need of therapy or suspected of needing therapy. A subject can be a patient.

The term "substantially stationary", as used herein with respect to droplet formation, generally refers to a state when motion of formed droplets in the continuous phase is passive, e.g., resulting from the difference in density between the dispersed phase and the continuous phase.

BRIEF DESCRIPTION OF THE DRAWINGS

FIG. 11A is top view of a device of the invention with reservoirs. FIG. 11B is a micrograph of a first channel intersected by a second channel adjacent a droplet formation region.

FIG. 15A is an overview of a device with four droplet formation regions. FIG. 15B is a zoomed in view of an exemplary droplet formation region within the dotted line box in FIG. 15A.

FIG. 16A shows a device with three reservoirs employed in droplet formation. FIG. 16B is a device of the invention with four reservoirs employed in the droplet formation.

FIG. 18A is a top view of a device having two liquid channels that meet adjacent to a droplet formation region. FIG. 18B is a zoomed in view of the droplet formation region showing the individual droplet formations regions.

FIG. 19A is an overview of the method, and FIG. 19B is a micrograph showing the use of a blocking fluid to protect a channel from a coating agent.

FIG. 20A shows the piezoelectric element in a first state. FIG. 20B shows the piezoelectric element in a second state.

DETAILED DESCRIPTION OF THE INVENTION

Figure 1:
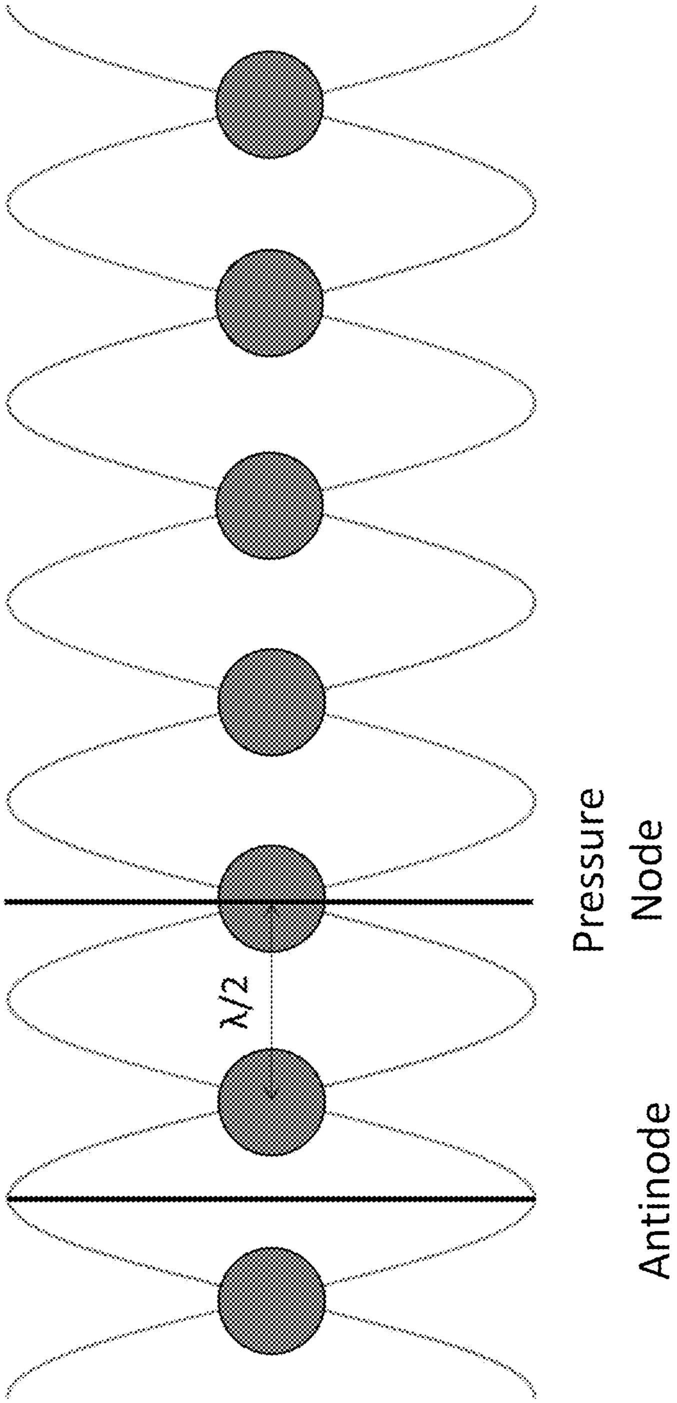
FIG. 1 is a schematic representation of nodes created by interfering acoustic waves allowing particles to order.

The invention provides devices, systems, and methods for ordering particles in a liquid using acoustic waves. Devices of the invention allow for the production of droplets that contain a specified number of particles, e.g., a cell or a gel bead, while minimizing stochastic processes, e.g., the probability that the droplets contain either zero particles or more than one particle. This occurs by the ordering of particles (or other desired contents) at a particular spacing before droplet formation to increase the likelihood that each droplet contains a specified number of particles, such as a single particle or another specified number. An advantage of devices of the invention is that the acoustic wave-based ordering is contactless, label-free, biocompatible, and versatile. Further, the acoustic waves apply only mild forces to the particles to be incorporated into droplets, minimizing damage to the particles, e.g., cell disruption or changes in gene expression.

Devices

A device of the invention includes a first channel having a first inlet and a first outlet. The first channel is operatively coupled to a first source of acoustic energy. The first source of acoustic energy may be actuated to propagate an acoustic wave having one or more nodes in the first channel. Upon actuation of the first source of acoustic energy, particles in the liquid in the first channel may be ordered according to the one or more nodes.

Without wishing to be bound by theory, actuation of a source of acoustic energy operatively coupled to a channel, e.g. a first channel, propagates a traveling or standing acoustic wave in the channel. In a traveling wave, the nodes move along the length of the channel; in a standing wave, the nodes are substantially stationary (e.g., within +7-100 μm) in the channel.

For any wave, points at which the amplitude is at a maximum (whether positive or negative) are called antinodes, and points where the amplitude is zero are called nodes. The liquid in a channel, e.g., a first channel, and any contents of the liquid in the channel, e.g., particles, e.g., cells or gel beads, interact with the nodes and antinodes of the acoustic wave. The solid contents of the liquid in the channel, e.g., particles, are pushed towards the nodes and repelled from the antinodes by the applied acoustic force. As the nodes of an acoustic wave are evenly spaced, the particulate contents of the liquid in the channel are also evenly spaced. For a traveling wave, particles in the channel can be moved by the traveling wave, but other forces may be added to transport the particles in addition to the traveling wave. For a standing wave, the particles in the channel require additional force, e.g., from a liquid source, e.g., a reservoir or a pump, to move within the channel. As the particles in the liquid are transported in devices of the invention, they may experience drag forces from the liquid. The amplitude of the acoustic wave can be controlled to balance drag forces.

The spacing of the nodes of the traveling or standing acoustic wave, and thus the spacing between the particles, may be controlled by the frequency of the acoustic wave, with the frequency being related to the wavelength by $f=c/\lambda$, where f is the frequency, c is the speed of sound in a particular medium, and $\lambda$ is the wavelength. In some cases, the frequency of the acoustic wave may be from about 0.1 Hz to about 200,000,000 Hz, e.g., about 0.1 Hz to about 1000 Hz, about 500 Hz to about 20,000 Hz, about 5,000 Hz to about 100,000 Hz, about 50,000 Hz to about 1,000,000 Hz, about 100,000 Hz to about 10,000,000 Hz, about 500,000 Hz to about 10,000,000 Hz, about 500,000 Hz to about 5,000,000 Hz, about 750,000 Hz to about 3,000,000 Hz, about 5,000,000 Hz to about 50,000,000 Hz, about 10,000,000 Hz to about 100,000,000 Hz, or about 20,000,000 Hz to about 200,000,000 Hz, e.g. about 0.1 Hz, about 1 Hz, about 10 Hz, about 100 Hz, about 500 Hz, about 1,000 Hz, about 5,000 Hz, about 10,000 Hz, about 50,000 Hz, about 100,000 Hz, about 200,000 Hz, about 300,000 Hz, about 400,000 Hz, about 500,000 Hz, about 600,000 Hz, about 700,000 Hz, about 800,000 Hz, about 900,000 Hz, about 1,000,000 Hz, about 2,000,000 Hz, about 3,000,000 Hz, about 4,000,000 Hz, about 5,000,000 Hz, about 6,000,000 Hz, about 7,000,000 Hz, about 8,000,000 Hz, about 9,000,000 Hz, about 10,000,000 Hz, about 20,000,000 Hz, about 30,000,000 Hz, about 40,000,000 Hz, about 50,000,000 Hz, about 60,000,000 Hz, about 70,000,000 Hz, about 80,000,000 Hz, about 90,000,000 Hz, about 100,000,000 Hz, about 110,000,000 Hz, about 120,000,000 Hz, about 130,000,000 Hz, about 140,000,000 Hz, about 150,000,000 Hz, about 160,000,000 Hz, about 170,000,000 Hz, about 180,000,000 Hz, about 190,000,000 Hz, or about 200,000,000 Hz.

Useful sources of acoustic energy in the invention include, but are not limited to, transducers, e.g., an interdigital transducer (IDT), a piezoelectric element, e.g. a piezoelectric crystal, pulsed electromagnetic radiation, e.g., optical or microwave, or thermal elements, e.g., Peltier devices. Other sources of acoustic energy are known in the art. Such sources of acoustic energy are operatively coupled to, e.g., by being integrated with, the device. Alternatively, the sources of acoustic energy may be physically connected to the device, e.g., mechanically connected. Good contact can be assured by using an acoustic gel, if needed.

When the source of acoustic energy is an IDT, the IDT may be of any practical shape to achieve an acoustic wave, such as linear, e.g., rectangular, annular, gradient, e.g., chirped or sloped, or stepped. Other shapes of IDTs are known in the art. In some cases, the IDTs may be a solid conductor that is in contact with the material of the device, such as a conductive wire or a conductive ribbon. Alternatively, the IDTs may be deposited onto the material of the device using deposition methods known in the art. In further embodiments, the IDTs may be a plurality of fluidic electrodes that are molded into the material of the device. In this configuration, the plurality of fluidic IDTs includes a high conductivity fluid, e.g., water or an electrolyte, such that the high conductivity fluid is in contact material of the device.

When the source of acoustic energy is a piezoelectric material, the material may be a crystalline material including, but not limited to, $SiO_4$, e.g., quartz, boron silicates, e.g., tourmaline, and aluminum silicates, e.g., topaz. In some cases, the piezoelectric material may be a semiconducting material, including, but not limited to, zinc oxide (ZnO), aluminum nitride (AlN), gallium arsenide (GeAs) or silicon carbide (SiC), ceramics, e.g., barium titanate ($BaTiO_3$), lead zirconate titanate ($Pb[ZrxTi_{1-x}]O_3$ ($0 \le x \le 1$); PZT), or lead magnesium niobate-lead titanate ($(1-x)[Pb(Mg_{1/3}Nb_{2/3})O_3]-x[PbTiO_3]$ ($0 \le x \le 0.4$), PMN-PT). Alternatively, the piezoelectric material may be a polymer, such as polyvinylidene fluoride (PVDF). The piezoelectric material may be configured to be incorporated in devices of the invention as a portion of the device material, e.g., a component fabricated from a portion of a bulk material. Alternatively, the piezoelectric material may be deposited as a thin film onto a surface of the device by deposition techniques known in the art.

Devices of the invention include an actuator to actuate the source of acoustic energy. In some cases, the actuator provides an electrical signal, e.g., a voltage, to the source of acoustic energy that generates a standing acoustic wave that propagates through the first channel.

Droplet or Particle Sources

The devices described herein include a droplet or particle source. The droplet or particle source may include a droplet or particle formation region. Droplets or particles may be formed by any suitable method known in the art. In general, droplet formation includes two liquid phases. The two phases may be, for example, the aqueous phase and an oil phase. During formation, a plurality of discrete volume droplets or particles are formed.

The droplets may be formed by shaking or stirring a liquid to form individual droplets, creating a suspension or an emulsion containing individual droplets, or forming the droplets through pipetting techniques, e.g., with needles, or the like. The droplets may be formed made using a micro-, or nanofluidic droplet maker. Examples of such droplet makers include, e.g., a T-junction droplet maker, a Y-junction droplet maker, a channel-within-a-channel junction droplet maker, a cross (or "X") junction droplet maker, a flow-focusing junction droplet maker, a micro-capillary droplet maker (e.g., co-flow or flow-focus), and a three-dimensional droplet maker. The droplets may be produced using a flow-focusing device, or with emulsification systems, such as homogenization, membrane emulsification, shear cell emulsification, and fluidic emulsification.

Discrete liquid droplets may be encapsulated by a carrier fluid that wets the microchannel. These droplets, sometimes known as plugs, form the dispersed phase in which the reactions occur. Systems that use plugs differ from segmented-flow injection analysis in that reagents in plugs do not come into contact with the microchannel. In T junctions, the disperse phase and the continuous phase are injected from two branches of the "T". Droplets of the disperse phase are produced as a result of the shear force and interfacial tension at the fluid-fluid interface. The phase that has lower interfacial tension with the channel wall is the continuous phase. To generate droplets in a flow-focusing configuration, the continuous phase is injected through two outside channels and the disperse phase is injected through a central channel into a narrow orifice. Other geometric designs to create droplets would be known to one of skill in the art. Methods of producing droplets are disclosed in Song et al. *Angew. Chem.* 45: 7336-7356, 2006, Mazutis et al. *Nat. Protoc.* 8(5):870-891, 2013, U.S. Pat. No. 9,839,911; U.S. Pub. Nos. 2005/0172476, 2006/0163385, and 2007/0003442, PCT Pub. Nos. WO 2009/005680 and WO 2018/009766. In some embodiments, electric fields or acoustic waves may be used to produce droplets, e.g., as described in PCT Pub. No. WO 2018/009766.

In some cases, a droplet formation region may allow liquid from the first channel to expand in at least one dimension, leading to droplet formation under appropriate conditions as described herein. A droplet formation region can be of any suitable geometry. In one embodiment, the droplet formation region includes a shelf region that allows liquid to expand substantially in one dimension, e.g., perpendicular to the direction of flow. The width of the shelf region is greater than the width of the first channel at its distal end. In certain embodiments, the first channel is a channel distinct from a shelf region, e.g., the shelf region widens or widens at a steeper slope or curvature than the distal end of the first channel. In other embodiments, the first channel and shelf region are merged into a continuous flow path, e.g., one that widens linearly or non-linearly from its proximal end to its distal end; in these embodiments, the distal end of the first channel can be considered to be an arbitrary point along the merged first channel and shelf region. In another embodiment, the droplet formation region includes a step region, which provides a spatial displacement and allows the liquid to expand in more than one dimension. The spatial displacement may be upward or downward or both relative to the channel. The choice of direction may be made based on the relative density of the dispersed and continuous phases, with an upward step employed when the dispersed phase is less dense than the continuous phase and a downward step employed when the dispersed phase is denser than the continuous phase. Droplet formation regions may also include combinations of a shelf and a step region, e.g., with the shelf region disposed between the channel and the step region.

Without wishing to be bound by theory, droplets of a first liquid can be formed in a second liquid in the devices of the invention by flow of the first liquid from the distal end into the droplet formation region. In embodiments with a shelf region and a step region, the stream of first liquid expands laterally into a disk-like shape in the shelf region. As the stream of first liquid continues to flow across the shelf region, the stream passes into the step region wherein the droplet assumes a more spherical shape and eventually detaches from the liquid stream. As the droplet is forming, passive flow of the continuous phase around the nascent droplet occurs, e.g., into the shelf region, where it reforms the continuous phase as the droplet separates from its liquid stream. Droplet formation by this mechanism can occur without externally driving the continuous phase, unlike in other systems. It will be understood that the continuous phase may be externally driven during droplet formation, e.g., by gently stirring or vibration but such motion is not necessary for droplet formation.

In these embodiments, the size of the generated droplets is significantly less sensitive to changes in liquid properties. For example, the size of the generated droplets is less sensitive to the dispersed phase flow rate. Adding multiple formation regions is also significantly easier from a layout and manufacturing standpoint. The addition of further formation regions allows for formation of droplets even in the event that one droplet formation region becomes blocked. Droplet formation can be controlled by adjusting one or more geometric features of fluidic channel architecture, such as a width, height, and/or expansion angle of one or more fluidic channels. For example, droplet size and speed of droplet formation may be controlled. In some instances, the number of regions of formation at a driven pressure can be increased to increase the throughput of droplet formation.

Passive flow of the continuous phase may occur simply around the nascent droplet. The droplet formation region may also include one or more channels that allow for flow of the continuous phase to a location between the distal end of the first channel and the bulk of the nascent droplet. These channels allow for the continuous phase to flow behind a nascent droplet, which modifies (e.g., increase or decreases) the rate of droplet formation. Such channels may be fluidically connected to a reservoir of the droplet formation region or to different reservoirs of the continuous phase. Although externally driving the continuous phase is not necessary, external driving may be employed, e.g., to pump continuous phase into the droplet formation region via additional channels. Such additional channels may be to one or both lateral sides of the nascent droplet or above or below the plane of the nascent droplet.

In general, the components of a device or system, e.g., channels, may have certain geometric features that at least partly determine the sizes and/or content of the droplets. For example, any of the channels described herein have a depth, a height, $h_0$, and width, w. The droplet formation region may have an expansion angle, $\alpha$. Droplet size may decrease with increasing expansion angle. The resulting droplet radius, $R_d$, may be predicted by the following equation for the aforementioned geometric parameters of $h_0$, w, and $\alpha$:

$$R_d \approx 0.44\left(1 + 2.2\sqrt{\tan\alpha}\,\frac{w}{h_0}\right)\frac{h_0}{\sqrt{\tan\alpha}}$$

As a non-limiting example, for a channel with w=21 μm, h=21 μm, and $\alpha$=3°, the predicted droplet size is 121 μm. In another example, for a channel with w=25 μm, h=25 μm, and $\alpha$=5°, the predicted droplet size is 123 μm. In yet another example, for a channel with w=28 μm, h=28 μm, and $\alpha$=7°, the predicted droplet size is 124 μm. In some instances, the expansion angle may be between a range of from about 0.5° to about 4°, from about 0.1° to about 10°, or from about 0° to about 90°. For example, the expansion angle can be at least about 0.01°, 0.1°, 0.2°, 0.3°, 0.4°, 0.5°, 0.6°, 0.7°, 0.8°, 0.9°, 1°, 2°, 3°, 4°, 5°, 6°, 7°, 8°, 9°, 10°, 15°, 20°, 25°, 30°, 35°, 40°, 45°, 50°, 55°, 60°, 65°, 70°, 75°, 80°, 85°, or higher. In some instances, the expansion angle can be at most about 89°, 88°, 87°, 86°, 85°, 84°, 83°, 82°, 81°, 80°, 75°, 70°, 65°, 60°, 55°, 50°, 45°, 40°, 35°, 30°, 25°, 20°, 15°, 10°, 9°, 8°, 7°, 6°, 5°, 4°, 3°, 2°, 1°, 0.1°, 0.01°, or less.

The depth and width of the first channel may be the same, or one may be larger than the other, e.g., the width is larger than the depth, or first depth is larger than the width. In some embodiments, the depth and/or width is between about 0.1 μm and 1000 μm. In some embodiments, the depth and/or width of the first channel is from 1 to 750 μm, 1 to 500 μm, 1 to 250 μm, 1 to 100 μm, 1 to 50 μm, or 3 to 40 μm. In certain embodiments, the depth and/or width of the channel is 10 μm to 100 μm. In some cases, when the width and length differ, the ratio of the width to depth is, e.g., from 0.1 to 10, e.g., 0.5 to 2 or greater than 3, such as 3 to 10, 3 to 7, or 3 to 5. The width and depths of the first channel may or may not be constant over its length. In particular, the width may increase or decrease adjacent the distal end. In general, channels may be of any suitable cross section, such as a rectangular, triangular, or circular, or a combination thereof. In particular embodiments, a channel may include a groove along the bottom surface. The width or depth of the channel may also increase or decrease, e.g., in discrete portions, to alter the rate of flow of liquid or particles or the alignment of particles.

Devices of the invention may also include additional channels that intersect the first channel between its proximal and distal ends, e.g., one or more second channels having a second depth, a second width, a second proximal end, and a second distal end. Each of the first proximal end and second proximal ends are or are configured to be in fluid communication with, e.g., fluidically connected to, a source of liquid, e.g., a reservoir integral to the device or coupled to the device, e.g., by tubing. The inclusion of one or more intersection channels allows for splitting liquid from the first channel or introduction of liquids into the first channel, e.g., that combine with the liquid in the first channel or do not combine with the liquid in the first channel, e.g., to form a sheath flow. Channels can intersect the first channel at any suitable angle, e.g., between 5° and 135° relative to the centerline of the first channel, such as between 75° and 115° or 85° and 95°. Additional channels may similarly be present to allow introduction of further liquids or additional flows of the same liquid. Multiple channels can intersect the first channel on the same side or different sides of the first channel. When multiple channels intersect on different sides, the channels may intersect along the length of the first channel to allow liquid introduction at the same point. Alternatively, channels may intersect at different points along the length of the first channel. In some instances, a channel configured to direct a liquid comprising a plurality of particles may comprise one or more grooves in one or more surface of the channel to direct the plurality of particles towards the droplet formation fluidic connection. For example, such guidance may increase single occupancy rates of the generated droplets or particles. These additional channels may have any of the structural features discussed above for the first channel.

Devices may include multiple first channels, e.g., to increase the rate of droplet formation. In general, throughput may significantly increase by increasing the number of droplet formation regions of a device. For example, a device having five droplet formation regions may generate five times as many droplets than a device having one droplet formation region, provided that the liquid flow rate is substantially the same. A device may have as many droplet formation regions as is practical and allowed for the size of the source of liquid, e.g., reservoir. For example, the device may have at least about 2, 3, 4, 5, 6, 7, 8, 9, 10, 20, 30, 40, 50, 60, 70, 80, 90, 100, 150, 200, 250, 300, 350, 400, 450, 500, 600, 700, 800, 900, 1000, 1500, 2000 or more droplet formation regions. Inclusion of multiple droplet formation regions may require the inclusion of channels that traverse but do not intersect, e.g., the flow path is in a different plane.

Multiple first channel may be in fluid communication with, e.g., fluidically connected to, a separate source reservoir and/or a separate droplet formation region. In other embodiments, two or more first channels are in fluid communication with, e.g., fluidically connected to, the same fluid source, e.g., where the multiple first channels branch from a single, upstream channel. The droplet formation region may include a plurality of inlets in fluid communication with the first proximal end and a plurality of outlets (e.g., plurality of outlets in fluid communication with a collection region) (e.g., fluidically connected to the first proximal end and in fluid communication with a plurality of outlets). The number of inlets and the number of outlets in the droplet formation region may be the same (e.g., there may be 3-10 inlets and/or 3-10 outlets). Alternatively or in addition, the throughput of droplet formation can be increased by increasing the flow rate of the first liquid. In some cases, the throughput of droplet formation can be increased by having a plurality of single droplet forming devices, e.g., devices with a first channel and a droplet formation region, in a single device, e.g., parallel droplet formation.

In certain embodiments, the droplet formation region is a multiplexed droplet formation region having a width that is at least five times greater (e.g., at least 6 times greater, at least 7 times greater, at least 8 times greater, at least 9 times greater, at least 10 times greater, at least 15 times greater, at least 20 times greater, at least 25 times greater, at least 30 times greater, or at least 40 time greater; e.g., 5 to 50 times greater, 10 to 50 times greater, or 15 to 50 times greater) than the combined widths of the channel outlets fluidically connected to the droplet formation region.

The length of the shelf region may be greater than the width of a single first channel outlet by at least 100% (e.g., at least 200%, at least 300%, at least 400%, at least 500%, at least 600%, at least 700%, at least 800%, at least 900%, at least 1000%, at least 1400%, at least 1500%, at least 1900%, or at least 2000%). The length of the shelf region may be greater than the width of a single first channel outlet by 2000% or less (e.g., by 1500% or less, 1000% or less, 900% or less, 800% or less, 700% or less, or 600% or less). For example, the shelf region length may be 100% to 2000% (e.g., 100% to 200%, 100% to 300%, 100% to 400%, 100% to 500%, 100% to 600%, 100% to 700%, 100% to 800%, 100% to 900%, 100% to 1000%, 100% to 1500%, 100% to 2000%, 200% to 300%, 200% to 400%, 200% to 500%, 200% to 600%, 200% to 700%, 200% to 800%, 200% to 900%, 200% to 1000%, 200% to 1500%, 200% to 2000%, 300% to 400%, 300% to 500%, 300% to 600%, 300% to 700%, 300% to 800%, 300% to 900%, 300% to 1000%, 300% to 1500%, 300% to 2000%, 400% to 500%, 400% to 600%, 400% to 700%, 400% to 800%, 400% to 900%, 400% to 1000%, 400% to 1500%, 400% to 2000%, 500% to 600%, 500% to 700%, 500% to 800%, 500% to 900%, 500% to 1000%, 500% to 1500%, 500% to 2000%, 600% to 700%, 600% to 800%, 600% to 900%, 600% to 1000%, 600% to 1500%, 600% to 2000%, 700% to 500%, 700% to 600%, 700% to 700%, 700% to 800%, 700% to 900%, 700% to 1000%, 700% to 1500%, or 700% to 2000%) of the width of a single first channel outlet. The droplet formation region may occupy at least 5% (e.g., at least 10%, at least 15%, at least 20%, at least 25%, or at least 30%) of the perimeter of the droplet collection region. The droplet formation region may occupy 75% or less (e.g., 70% or less, 60% or less, 50% or less, or 40% or less) of the perimeter of the droplet collection region. For example, the droplet formation region may occupy 5% to 75% (e.g., 5% to 70%, 5% to 60%, 5% to 50%, 5% to 40%, 10% to 70%, 10% to 60%, 10% to 50%, 10% to 40%, 15% to 70%, 15% to 60%, 15% to 50%, 15% to 40%, 20% to 70%, 20% to 60%, 20% to 50%, 20% to 40%, 25% to 70%, 25% to 60%, 25% to 50%, 25% to 40%, 30% to 70%, 30% to 60%, 30% to 50%, or 30% to 40%) of the perimeter of the droplet collection region.

In some preferred embodiments, the droplet formation region includes a shelf region protruding from the first channel outlet towards the droplet collection region. For example, the shelf region may be protruding into the step region. In these embodiments, the shelf region width may be twice the width of the first channel outlet or less.

The width of a shelf region may be from 0.1 μm to 1000 μm. In particular embodiments, the width of the shelf is from 1 to 750 μm, 10 to 500 μm, 10 to 250 μm, or 10 to 150 μm. The width of the shelf region may be constant along its length, e.g., forming a rectangular shape. Alternatively, the width of the shelf region may increase along its length away from the distal end of the first channel. This increase may be linear, nonlinear, or a combination thereof. In certain embodiments, the shelf widens 5% to 10,000%, e.g., at least 300%, (e.g., 10% to 500%, 100% to 750%, 300% to 1000%, or 500% to 1000%) relative to the width of the distal end of the first channel. The depth of the shelf can be the same as or different from the first channel. For example, the bottom of the first channel at its distal end and the bottom of the shelf region may be coplanar. Alternatively, a step or ramp may be present where the distal end meets the shelf region. The depth of the distal end may also be greater than the shelf region, such that the first channel forms a notch in the shelf region. The depth of the shelf may be from 0.1 to 1000 μm, e.g., 1 to 750 μm, 1 to 500 μm, 1 to 250 μm, 1 to 100 μm, 1 to 50 μm, or 3 to 40 μm. In some embodiments, the depth is substantially constant along the length of the shelf. Alternatively, the depth of the shelf slopes, e.g., downward or upward, from the distal end of the liquid channel to the step region. The final depth of the sloped shelf may be, for example, from 5% to 1000% greater than the shortest depth, e.g., 10 to 750%, 10 to 500%, 50 to 500%, 60 to 250%, 70 to 200%, or 100 to 150%. The overall length of the shelf region may be from at least about 0.1 μm to about 1000 μm, e.g., 0.1 to 750 μm, 0.1 to 500 μm, 0.1 to 250 μm, 0.1 to 150 μm, 1 to 150 μm, 10 to 150 μm, 50 to 150 μm, 100 to 150 μm, 10 to 80 μm, or 10 to 50 μm. In certain embodiments, the lateral walls of the shelf region, i.e., those defining the width, may be not parallel to one another. In other embodiments, the walls of the shelf region may narrower from the distal end of the first channel towards the step region. For example, the width of the shelf region adjacent the distal end of the first channel may be sufficiently large to support droplet formation. In other embodiments, the shelf region is not substantially rectangular, e.g., not rectangular or not rectangular with rounded or chamfered corners.

A step region includes a spatial displacement (e.g., depth), such as a wall, e.g., of a reservoir, extending from the shelf region. Typically, this displacement occurs at an angle of approximately 90°, e.g., between 85° and 95°. Other angles are possible, e.g., 10-90°, e.g., 20 to 90°, 45 to 90°, or 70 to 90°. The spatial displacement of the step region may be any suitable size to be accommodated on a device, as the ultimate extent of displacement does not affect performance of the device. Preferably the displacement is several times the diameter of the droplet being formed. In certain embodiments, the displacement is from about 1 μm to about 10 cm, e.g., at least 10 μm, at least 40 μm, at least 100 μm, or at least 500 μm, e.g., 40 μm to 600 μm. In some cases, the depth of the step region is substantially constant. In some embodiments, the displacement is at least 40 μm, at least 45 μm, at least 50 μm, at least 55 μm, at least 60 μm, at least 65 μm, at least 70 μm, at least 75 μm, at least 80 μm, at least 85 μm, at least 90 μm, at least 95 μm, at least 100 μm, at least 110 μm, at least 120 μm, at least 130 μm, at least 140 μm, at least 150 μm, at least 160 μm, at least 170 μm, at least 180 μm, at least 190 μm, at least 200 μm, at least 220 μm, at least 240 μm, at least 260 μm, at least 280 μm, at least 300 μm, at least 320 μm, at least 340 μm, at least 360 μm, at least 380 μm, at least 400 μm, at least 420 μm, at least 440 μm, at least 460 μm, at least 480 μm, at least 500 μm, at least 520 μm, at least 540 μm, at least 560 μm, at least 580 μm, or at least 600 μm. In some cases, the depth of the step region is substantially constant. Alternatively, the depth of the step region may increase away from the shelf region, e.g., to allow droplets that sink or float to roll away from the spatial displacement as they are formed. The step region may also increase in depth in two dimensions relative to the shelf region, e.g., both above and below the plane of the shelf region. The reservoir may have an inlet and/or an outlet for the addition of continuous phase, flow of continuous phase, or removal of the continuous phase and/or droplets. The step may be part of a wall of a collection reservoir. The depth of the step may be greater than that of the channel and the shelf.

While dimension of the devices may be described as width or depths, the channels, shelf regions, and step regions may be disposed in any plane. For example, the width of the shelf may be in the x-y plane, the x-z plane, the y-z plane or any plane therebetween. In addition, a droplet formation region, e.g., including a shelf region, may be laterally spaced in the x-y plane relative to the first channel or located above or below the first channel. Similarly, a droplet formation region, e.g., including a step region, may be laterally spaced in the x-y plane, e.g., relative to a shelf region or located above or below a shelf region. The spatial displacement in a step region may be oriented in any plane suitable to allow the nascent droplet to form a spherical shape. The fluidic components may also be in different planes so long as connectivity and other dimensional requirements are met.

The device may also include reservoirs for liquid reagents, e.g., a first or second liquid. For example, the device may include a reservoir for the liquid to flow in a channel, e.g., the first channel. and/or a reservoir for the liquid into which droplets are formed. In some cases, devices of the invention include a collection region, e.g., a volume for collecting formed droplets. A droplet collection region may be a reservoir that houses continuous phase or can be any other suitable structure, e.g., a channel, a shelf, a chamber, or a cavity, on or in the device. For reservoirs or other elements used in collection, the walls may be smooth and not include an orthogonal element that would impede droplet movement. For example, the walls may not include any feature that at least in part protrudes or recedes from the surface. It will be understood, however, that such elements may have a ceiling or floor. The droplets that are formed may be moved out of the path of the next droplet being formed by gravity (either upward or downward depending on the relative density of the droplet and continuous phase). Alternatively or in addition, formed droplets may be moved out of the path of the next droplet being formed by an external force applied to the liquid in the collection region, e.g., gentle stirring, flowing continuous phase, or vibration. Similarly, a reservoir for liquids to flow in additional channels, such as those intersecting the first channel may be present. A single reservoir may also be connected to multiple channels in a device, e.g., when the same liquid is to be introduced at two or more different locations in the device. Waste reservoirs or overflow reservoirs may also be included to collect waste or overflow when droplets are formed. Alternatively, the device may be configured to mate with sources of the liquids, which may be external reservoirs such as vials, tubes, or pouches. Similarly, the device may be configured to mate with a separate component that houses the reservoirs. Reservoirs may be of any appropriate size, e.g., to hold 10 μL to 500 mL, e.g., 10 μL to 300 mL, 25 μL to 10 mL, 100 μL to 1 mL, 40 μL to 300 μL, 1 mL to 10 mL, or 10 mL to 50 mL. When multiple reservoirs are present, each reservoir may have the same or a different size.

In addition to the components discussed above, devices of the invention can include additional components. For example, channels may include filters to prevent introduction of debris into the device. In some cases, the microfluidic systems described herein may comprise one or more liquid flow units to direct the flow of one or more liquids, such as the aqueous liquid and/or the second liquid immiscible with the aqueous liquid. In some instances, the liquid flow unit may comprise a compressor to provide positive pressure at an upstream location to direct the liquid from the upstream location to flow to a downstream location. In some instances, the liquid flow unit may comprise a pump to provide negative pressure at a downstream location to direct the liquid from an upstream location to flow to the downstream location. In some instances, the liquid flow unit may comprise both a compressor and a pump, each at different locations. In some instances, the liquid flow unit may comprise different devices at different locations. The liquid flow unit may comprise an actuator. In some instances, where the second liquid is substantially stationary, the reservoir may maintain a constant pressure field at or near each droplet or particle formation region. Devices may also include various valves to control the flow of liquids along a channel or to allow introduction or removal of liquids or droplets or particles from the device. Suitable valves are known in the art. Valves useful for a device of the present invention include diaphragm valves, solenoid valves, pinch valves, or a combination thereof. Valves can be controlled manually, electrically, magnetically, hydraulically, pneumatically, or by a combination thereof. The device may also include integral liquid pumps or be connectable to a pump to allow for pumping in the first channels and any other channels requiring flow. Examples of pressure pumps include syringe, peristaltic, diaphragm pumps, and sources of vacuum. Other pumps can employ centrifugal or electrokinetic forces. Alternatively, liquid movement may be controlled by gravity, capillarity, or surface treatments. Multiple pumps and mechanisms for liquid movement may be employed in a single device. The device may also include one or more vents to allow pressure equalization, and one or more filters to remove particulates or other undesirable components from a liquid. The device may also include one or more inlets and or outlets, e.g., to introduce liquids and/or remove droplets or particles. Such additional components may be actuated or monitored by one or more controllers or computers operatively coupled to the device, e.g., by being integrated with, physically connected to (mechanically or electrically), or by wired or wireless connection.

Alternatively or in addition to controlling droplet formation via microfluidic channel geometry, droplet formation may be controlled using one or more piezoelectric elements. Piezoelectric elements may be positioned inside a channel (i.e., in contact with a fluid in the channel), outside the channel (i.e., isolated from the fluid), or a combination thereof. In some cases, the piezoelectric element may be at the exit of a channel, e.g., where the channel connects to a reservoir or other channel, that serves as a droplet generation point. For example, the piezoelectric element may be integrated with the channel or coupled or otherwise fastened to the channel. Examples of fastenings include, but are not limited to, complementary threading, form-fitting pairs, hooks and loops, latches, threads, screws, staples, clips, clamps, prongs, rings, brads, rubber bands, rivets, grommets, pins, ties, snaps, adhesives (e.g., glue), tapes, vacuum, seals, magnets, or a combination thereof. In some instances, the piezoelectric element can be built into the channel. Alternatively or in addition, the piezoelectric element may be connected to a reservoir or channel or may be a component of a reservoir or channel, such as a wall. In some cases, the piezoelectric element may further include an aperture therethrough such that liquids can pass upon actuation of the piezoelectric element, or the device may include an aperture operatively coupled to the piezoelectric element.

The piezoelectric element can have various shapes and sizes. The piezoelectric element may have a shape or cross-section that is circular, triangular, square, rectangular, or partial shapes or combination of shapes thereof. The piezoelectric element can have a thickness from about 100 micrometers (μm) to about 100 millimeters (mm). The piezoelectric element can have a dimension (e.g., cross-section) of at least about 1 mm. The piezoelectric element can be formed of, for example, lead zirconate titanate, zinc oxide, barium titanate, potassium niobate, sodium tungstate, $Ba_2NaNb_5O_5$, and $Pb_2KNb_5O_{15}$. The piezoelectric element, for example, can be a piezo crystal. The piezoelectric element may contract when a voltage is applied and return to its original state when the voltage is unapplied. Alternatively, the piezoelectric element may expand when a voltage is applied and return to its original state when the voltage is unapplied. Alternatively or in addition, application of a voltage to the piezoelectric element can cause mechanical stress, vibration, bending, deformation, compression, decompression, expansion, and/or a combination thereof in its structure, and vice versa (e.g., applying some form of mechanical stress or pressure on the piezoelectric element may produce a voltage). In some instances, the piezoelectric element may include a composite of both piezoelectric material and non-piezoelectric material.

In some instances, the piezoelectric element may be in a first state when no electrical charge is applied, e.g., an equilibrium state. When an electrical charge is applied to the piezoelectric element, the piezoelectric element may bend backwards, pulling a part of the first channel outwards, and drawing in more of the first fluid into the first channel via negative pressure, such as from a reservoir of the first fluid. When the electrical charge is altered, the piezoelectric element may bend in another direction (e.g., inwards towards the contents of the channel), pushing a part of the first channel inwards, and propelling (e.g., at least partly via displacement) a volume of the first fluid, thereby generating a droplet of the first fluid in a second fluid. After the droplet is propelled, the piezoelectric element may return to the first state. The cycle can be repeated to generate more droplets. In some instances, each cycle may generate a plurality of droplets (e.g., a volume of the first fluid propelled breaks off as it enters the second fluid to form a plurality of discrete droplets). A plurality of droplets can be collected in a second channel for continued transportation to a different location (e.g., reservoir), direct harvesting, and/or storage.

While the above non-limiting example describes bending of the piezoelectric element in response to application of an electrical charge, the piezoelectric may undergo or experience vibration, bending, deformation, compression, decompression, expansion, other mechanical stress and/or a combination thereof upon application of an electrical charge, which movement may be translated to the first channel.

In some cases, a channel may include a plurality of piezoelectric elements working independently or cooperatively to achieve the desired formation (e.g., propelling) of droplets. For example, a first channel of a device can be coupled to at least 1, 2, 3, 4, 5, 6, 7, 8, 9, 10, 20, 30, 40, 50, 60, 70, 80, 90, 100, 200, 300, 400, or 500 piezoelectric elements. In an example, a separate piezoelectric element may be operatively coupled to (or be integrally part of) each side wall of a channel. In another example, multiple piezoelectric elements may be positioned adjacent to one another along an axis parallel to the direction of flow in the first channel. Alternatively or in addition, multiple piezoelectric elements may circumscribe the first channel. For example, a plurality of piezoelectric elements may each be in electrical communication with the same controller or one or more different controllers. The throughput of droplet generation can be increased by increasing the points of generation, such as increasing the number of junctions between first fluid channels and the second fluid channel. For example, each of the first fluid channels may comprise a piezoelectric element for controlled droplet generation at each point of generation. The piezoelectric element may be actuated to facilitate droplet formation and/or flow of the droplets.

The frequency of application of electrical charge to the piezoelectric element may be adjusted to control the speed of droplet generation. For example, the frequency of droplet generation may increase with the frequency of alternating electrical charge. Additionally, the material of the piezoelectric element, number of piezoelectric elements in the channel, the location of the piezoelectric elements, strength of the electrical charge applied, hydrodynamic forces of the respective fluids, and other factors may be adjusted to control droplet generation and/or size of the droplets generated. For example, without wishing to be bound by a particular theory, if the strength of the electrical charge applied is increased, the mechanical stress experienced by the piezoelectric element may be increased, which can increase the impact on the structural deformation of the first channel, increasing the volume of the first fluid propelled, resulting in an increased droplet size.

In a non-limiting example, the first channel can carry a first fluid (e.g., aqueous) and the second channel can carry a second fluid (e.g., oil) that is immiscible with the first fluid. The two fluids can communicate at a junction. In some instances, the first fluid in the first channel may include suspended particles. The particles may be beads, biological particles, cells, cell beads, or any combination thereof (e.g., a combination of beads and cells or a combination of beads and cell beads, etc.). A discrete droplet generated may include a particle, such as when one or more particles are suspended in the volume of the first fluid that is propelled into the second fluid. Alternatively, a discrete droplet generated may include more than one particle. Alternatively, a discrete droplet generated may not include any particles. For example, in some instances, a discrete droplet generated may contain one or more biological particles where the first fluid in the first channel includes a plurality of biological particles.

Alternatively or in addition, one or more piezoelectric elements may be used to control droplet formation acoustically.

The piezoelectric element may be operatively coupled to a first end of a buffer substrate (e.g., glass). A second end of the buffer substrate, opposite the first end, may include an acoustic lens. In some instances, the acoustic lens can have a spherical, e.g., hemispherical, cavity. In other instances, the acoustic lens can be a different shape and/or include one or more other objects for focusing acoustic waves. The second end of the buffer substrate and/or the acoustic lens can be in contact with the first fluid in the first channel. Alternatively, the piezoelectric element may be operatively coupled to a part (e.g., wall) of the first channel without an intermediary substrate. The piezoelectric element can be in electrical communication with a controller. The piezoelectric element can be responsive to (e.g., excited by) an electric voltage driven at RF frequency. In some embodiments, the piezoelectric element can be made from zinc oxide (ZnO).

The frequency that drives the electric voltage applied to the piezoelectric element may be from about 5 to about 300 megahertz (MHz). e.g., about 5 MHz, about 6 MHz, about 7 MHz, about MHz, about 9 MHz, about 10 MHz, about 20 MHz, about 30 MHz, about 40 MHz, about 50 MHz, about 60 MHz, about 70 MHz, about 80 MHz, about 90 MHz, about 100 MHz, about 110 MHz, about 120 MHz, about 130 MHz, about 140 MHz, about 150 MHz, about 160 MHz, about 170 MHz, about 180 MHz, about 190 MHz, about 200 MHz, about 210 MHz, about 220 MHz, about 230 MHz, about 240 MHz, about 250 MHz, about 260 MHz, about 270 MHz, about 280 MHz, about 290 MHz, or about 300 MHz. Alternatively, the RF energy may have a frequency range of less than about 5 MHz or greater than about 300 MHz. As will be appreciated, the necessary voltage and/or the RF frequency driving the electric voltage may change with the properties of the piezoelectric element (e.g., efficiency).

Before an electric voltage is applied to a piezoelectric element, the first fluid and the second fluid may remain separated at or near the junction via an immiscible barrier. When the electric voltage is applied to the piezoelectric element, it can generate sound waves (e.g., acoustic waves) that propagate in the buffer substrate. The buffer substrate, such as glass, can be any material that can transfer sound waves. The acoustic lens of the buffer substrate can focus the sound waves towards the immiscible interface between the two immiscible fluids. The acoustic lens may be located such that the interface is located at the focal plane of the converging beam of the sound waves. Upon impact of the sound burst on the barrier, the pressure of the sound waves may cause a volume of the first fluid to be propelled into the second fluid, thereby generating a droplet of the volume of the first fluid in the second fluid. In some instances, each propelling may generate a plurality of droplets (e.g., a volume of the first fluid propelled breaks off as it enters the second fluid to form a plurality of discrete droplets). After ejection of the droplet, the immiscible interface can return to its original state. Subsequent applications of electric voltage to the piezoelectric element can be repeated to subsequently generate more droplets. A plurality of droplets can be collected in the second channel for continued transportation to a different location (e.g., reservoir), direct harvesting, and/or storage. Beneficially, the droplets generated can have substantially uniform size, velocity (when ejected), and/or directionality.

In some cases, a device may include a plurality of piezoelectric elements working independently or cooperatively to achieve the desired formation (e.g., propelling) of droplets. For example, the first channel can be coupled to at least 1, 2, 3, 4, 5, 6, 7, 8, 9, 10, 20, 30, 40, 50, 60, 70, 80, 90, 100, 200, 300, 400, or 500 piezoelectric elements. In an example, multiple piezoelectric elements may be positioned adjacent to one another along an axis parallel of the first channel. Alternatively or in addition, multiple piezoelectric elements may circumscribe the first channel. In some instances, the plurality of piezoelectric elements may each be in electrical communication with the same controller or one or more different controllers. The plurality of piezoelectric elements may each transmit acoustic waves from the same buffer substrate or one or more different buffer substrates. In some instances, a single buffer substrate may comprise a plurality of acoustic lenses at different locations.

In some instances, the first channel may be in communication with a third channel. The third channel may carry the first fluid to the first channel such as from a reservoir of the first fluid. The third channel may include one or more piezoelectric elements, for example, as described herein in the described devices. As described elsewhere herein, the third channel may carry first fluid with one or more particles (e.g., beads, biological particles, etc.) and/or one or more reagents suspended in the fluid. Alternatively or in addition, the device may include one or more other channels communicating with the first channel and/or the second channel.

The number and duration of electric voltage pulses applied to the piezoelectric element may be adjusted to control the speed of droplet generation. For example, the frequency of droplet generation may increase with the number of electric voltage pulses. Additionally, the material and size of the piezoelectric element, material and size of the buffer substrate, material, size, and shape of the acoustic lens, number of piezoelectric elements, number of buffer substrates, number of acoustic lenses, respective locations of the one or more piezoelectric elements, respective locations of the one or more buffer substrates, respective locations of the one or more acoustic lenses, dimensions (e.g., length, width, height, expansion angle) of the respective channels, level of electric voltage applied to the piezoelectric element, hydrodynamic forces of the respective fluids, and other factors may be adjusted to control droplet generation speed and/or size of the droplets generated.

A discrete droplet generated may include a particle, such as when one or more beads are suspended in the volume of the first fluid that is propelled into the second fluid. Alternatively, a discrete droplet generated may include more than one particle. Alternatively, a discrete droplet generated may not include any particles. For example, in some instances, a discrete droplet generated may contain one or more biological particles where the first fluid in the first channel further includes a suspension of a plurality of biological particles.

In some cases, the droplets formed using a piezoelectric element may be collected in a collection reservoir that is disposed below the droplet generation point. The collection reservoir may be configured to hold a source of fluid to keep the formed droplets isolated from one another. The collection reservoir used after piezoelectric or acoustic element-assisted droplet formation may contain an oil that is continuously circulated, e.g., using a paddle mixer, conveyor system, or a magnetic stir bar. Alternatively, the collection reservoir may contain one or more reagents for chemical reactions that can provide a coating on the droplets to ensure isolation, e.g., polymerization, e.g., thermal- or photo-initiated polymerization.

Surface Properties

A surface of the device may include a material, coating, or surface texture that determines the physical properties of the device. In particular, the flow of liquids through a device of the invention may be controlled by the device surface properties (e.g., wettability of a liquid-contacting surface). In some cases, a device portion (e.g., a region, channel, or sorter) may have a surface having a wettability suitable for facilitating liquid flow (e.g., in a channel) or assisting droplet formation (e.g., in a channel).

Wetting, which is the ability of a liquid to maintain contact with a solid surface, may be measured as a function of a water contact angle. A water contact angle of a material can be measured by any suitable method known in the art, such as the static sessile drop method, pendant drop method, dynamic sessile drop method, dynamic Wilhelmy method, single-fiber Wilhelmy method, single-fiber meniscus method, and Washburn's equation capillary rise method. The wettability of each surface may be suited to producing droplets.

For example, portions of the device carrying aqueous phases (e.g., a channel) may have a surface material or coating that is hydrophilic or more hydrophilic than another region of the device, e.g., include a material or coating having a water contact angle of less than or equal to about 90°, and/or the other region of the device may have a surface material or coating that is hydrophobic or more hydrophobic than the channel, e.g., include a material or coating having a water contact angle of greater than 70° (e.g., greater than 90°, greater than 95°, greater than 100° (e.g., 95°-120° or 100°-10°)). In certain embodiments, a region of the device may include a material or surface coating that reduces or prevents wetting by aqueous phases. The device can be designed to have a single type of material or coating throughout. Alternatively, the device may have separate regions having different materials or coatings.

The device surface properties may be those of a native surface (i.e., the surface properties of the bulk material used for the device fabrication) or of a surface treatment. Non-limiting examples of surface treatments include, e.g., surface coatings and surface textures. In one approach, the device surface properties are attributable to one or more surface coatings present in a device portion. Hydrophobic coatings may include fluoropolymers (e.g., AQUAPEL® glass treatment), silanes, siloxanes, silicones, or other coatings known in the art. Other coatings include those vapor deposited from a precursor such as henicosyl-1,1,2,2-tetrahydrododecyldimethyltris(dimethylaminosilane); henicosyl-1,1,2,2-tetrahydrododecyltrichlorosilane (C12); heptadecafluoro-1,1,2,2-tetrahydrodecyltrichlorosilane (C10); nonafluoro-1,1,2,2-tetrahydrohexyltris(dimethylamino)silane; 3,3,3,4,4,5,5,6,6-nonafluorohexyltrichlorosilane; tridecafluoro-1,1,2,2-tetrahydrooctyltrichlorosilane (C8); bis(tridecafluoro-1,1,2,2-tetrahydrooctyl)dimethylsiloxymethylchlorosilane; nonafluorohexyltriethoxysilane (C6); dodecyltrichlorosilane (DTS); dimethyldichlorosilane (DDMS); or 10-undecenyltrichlorosilane (V11); pentafluorophenylpropyltrichlorosilane (C5). Hydrophilic coatings include polymers such as polysaccharides, polyethylene glycol, polyamines, and polycarboxylic acids. Hydrophilic surfaces may also be created by oxygen plasma treatment of certain materials.

A coated surface may be formed by depositing a metal oxide onto a surface of the device. Example metal oxides useful for coating surfaces include, but are not limited to, $Al_2O_3$, $TiO_2$, $SiO_2$, or a combination thereof. Other metal oxides useful for surface modifications are known in the art. The metal oxide can be deposited onto a surface by standard deposition techniques, including, but not limited to, atomic layer deposition (ALD), physical vapor deposition (PVD), e.g., sputtering, chemical vapor deposition (CVD), or laser deposition. Other deposition techniques for coating surfaces, e.g., liquid-based deposition, are known in the art. For example, an atomic layer of $Al_2O_3$ can be deposited on a surface by contacting it with trimethylaluminum (TMA) and water.

In another approach, the device surface properties may be attributable to surface texture. For example, a surface may have a nanotexture, e.g., have a surface with nanometer surface features, such as cones or columns, that alters the wettability of the surface. Nanotextured surface may be hydrophilic, hydrophobic, or superhydrophobic, e.g., have a water contact angle greater than 150°. Exemplary superhydrophobic materials include Manganese Oxide Polystyrene ($MnO_2$/PS) nano-composite, Zinc Oxide Polystyrene (ZnO/PS) nano-composite, Precipitated Calcium Carbonate, Carbon nano-tube structures, and a silica nano-coating. Superhydrophobic coatings may also include a low surface energy material (e.g., an inherently hydrophobic material) and a surface roughness (e.g., using laser ablation techniques, plasma etching techniques, or lithographic techniques in which a material is etched through apertures in a patterned mask). Examples of low surface energy materials include fluorocarbon materials, e.g., polytetrafluoroethylene (PTFE), fluorinated ethylene propylene (FEP), ethylene tetrafluoroethylene (ETFE), ethylene chloro-trifluoroethylene (ECTFE), perfluoro-alkoxyalkane (PFA), poly(chloro-trifluoroethylene) (CTFE), perfluoro-alkoxyalkane (PFA), and poly(vinylidene fluoride) (PVDF). Other superhydrophobic surfaces are known in the art.

In some cases, the water contact angle of a hydrophilic or more hydrophilic material or coating is less than or equal to about 90°, e.g., less than 80°, 70°, 60°, 50°, 40°, 30°, 20°, or 10°, e.g., 90°, 85°, 80°,75°,70°, 65°,60°, 55°,50°, 45°, 40°, 35°, 30°, 25°, 20°, 15°, 10°, 9°, 8°, 7°, 6°, 5°, 4°, 3°, 2°, 1°, or 0°.

In some cases, the water contact angle of a hydrophobic or more hydrophobic material or coating is at least 70°, e.g., at least 80°, at least 85°, at least 90°, at least 95°, or at least 100° (e.g., about 100°, 101°, 102°, 103°, 104°, 105°, 106°, 107°, 108°, 109°, 110°, 115°, 120°, 125°, 130°, 135°, 140°, 145°, or about) 150°.

The difference in water contact angles between that of a hydrophilic or more hydrophilic material or coating and a hydrophobic or more hydrophobic material or coating may be 5° to 100°, e.g., 5° to 80°, 5° to 60°, 5° to 50°, 5° to 40°, 5° to 30°, 5° to 20°, 10° to 75°, 15° to 70°, 20° to 65°, 25° to 60°, 30 to 50°, 35° to 45°, e.g., 5°, 6°,7°,8°,9°,10°,15°, 20°, 25°, 30°, 35°, 40°, 45°, 50°, 55°, 60, 65°, 70°, 75°, 80°, 85°, 90°, 95°, or 100°.

The above discussion centers on the water contact angle. It will be understood that liquids employed in the devices and methods of the invention may not be water, or even aqueous. Accordingly, the actual contact angle of a liquid on a surface of the device may differ from the water contact angle. Furthermore, the determination of a water contact angle of a material or coating can be made on that material or coating when not incorporated into a device of the invention.

Particles

The invention includes devices, systems, and kits having particles. For example, particles configured with moieties (e.g., barcodes, nucleic acids, binding molecules (e.g., proteins, peptides, aptamers, antibodies, or antibody fragments), enzymes, substrates, etc.) can be included in a droplet containing an analyte to modify the analyte and/or detect the presence or concentration of the analyte. In some embodiments, particles are synthetic particles (e.g., beads, e.g., gel beads).

For example, a droplet may include one or more analyte moieties, e.g., unique identifiers, such as barcodes. Analyte moieties, e.g., barcodes, may be introduced into droplets previous to, subsequent to, or concurrently with droplet formation. The delivery of the analyte moieties, e.g., barcodes, to a particular droplet allows for the later attribution of the characteristics of an individual sample (e.g., biological particle) to the particular droplet. Analyte moieties, e.g., barcodes, may be delivered, for example on a nucleic acid (e.g., an oligonucleotide), to a droplet via any suitable mechanism. Analyte moieties, e.g., barcoded nucleic acids (e.g., oligonucleotides), can be introduced into a droplet via a particle, such as a microcapsule. In some cases, analyte moieties, e.g., barcoded nucleic acids (e.g., oligonucleotides), can be initially associated with the particle (e.g., microcapsule) and then released upon application of a stimulus which allows the analyte moieties, e.g., nucleic acids (e.g., oligonucleotides), to dissociate or to be released from the particle.

A particle, e.g., a bead, may be porous, non-porous, hollow (e.g., a microcapsule), solid, semi-solid, semi-fluidic, fluidic, and/or a combination thereof. In some instances, a particle, e.g., a bead, may be dissolvable, disruptable, and/or degradable. In some cases, a particle, e.g., a bead, may not be degradable. In some cases, the particle, e.g., a bead, may be a gel bead. A gel bead may be a hydrogel bead. A gel bead may be formed from molecular precursors, such as a polymeric or monomeric species. A semi-solid particle, e.g., a bead, may be a liposomal bead. Solid particles, e.g., beads, may comprise metals including iron oxide, gold, and silver. In some cases, the particle, e.g., the bead, may be a silica bead. In some cases, the particle, e.g., a bead, can be rigid. In other cases, the particle, e.g., a bead, may be flexible and/or compressible.

A particle, e.g., a bead, may comprise natural and/or synthetic materials. For example, a particle, e.g., a bead, can comprise a natural polymer, a synthetic polymer or both natural and synthetic polymers. Examples of natural polymers include proteins and sugars such as deoxyribonucleic acid, rubber, cellulose, starch (e.g., amylose, amylopectin), proteins, enzymes, polysaccharides, silks, polyhydroxyalkanoates, chitosan, dextran, collagen, carrageenan, ispaghula, acacia, agar, gelatin, shellac, sterculia gum, xanthan gum, Corn sugar gum, guar gum, gum karaya, agarose, alginic acid, alginate, or natural polymers thereof. Examples of synthetic polymers include acrylics, nylons, silicones, spandex, viscose rayon, polycarboxylic acids, polyvinyl acetate, polyacrylamide, polyacrylate, polyethylene glycol, polyurethanes, polylactic acid, silica, polystyrene, polyacrylonitrile, polybutadiene, polycarbonate, polyethylene, polyethylene terephthalate, poly(chlorotrifluoroethylene), poly (ethylene oxide), poly(ethylene terephthalate), polyethylene, polyisobutylene, poly(methyl methacrylate), poly(oxymethylene), polyformaldehyde, polypropylene, polystyrene, poly (tetrafluoroethylene), poly(vinyl acetate), poly(vinyl alcohol), poly(vinyl chloride), poly(vinylidene dichloride), poly (vinylidene difluoride), poly(vinyl fluoride) and/or combinations (e.g., co-polymers) thereof. Beads may also be formed from materials other than polymers, including lipids, micelles, ceramics, glass-ceramics, material composites, metals, other inorganic materials, and others.

In some instances, the particle, e.g., the bead, may contain molecular precursors (e.g., monomers or polymers), which may form a polymer network via polymerization of the molecular precursors. In some cases, a precursor may be an already polymerized species capable of undergoing further polymerization via, for example, a chemical cross-linkage. In some cases, a precursor can comprise one or more of an acrylamide or a methacrylamide monomer, oligomer, or polymer. In some cases, the particle, e.g., the bead, may comprise prepolymers, which are oligomers capable of further polymerization. For example, polyurethane beads may be prepared using prepolymers. In some cases, the particle, e.g., the bead, may contain individual polymers that may be further polymerized together. In some cases, particles, e.g., beads, may be generated via polymerization of different precursors, such that they comprise mixed polymers, co-polymers, and/or block co-polymers. In some cases, the particle, e.g., the bead, may comprise covalent or ionic bonds between polymeric precursors (e.g., monomers, oligomers, linear polymers), oligonucleotides, primers, and other entities. In some cases, the covalent bonds can be carbon-carbon bonds or thioether bonds.

Cross-linking may be permanent or reversible, depending upon the particular cross-linker used. Reversible cross-linking may allow for the polymer to linearize or dissociate under appropriate conditions. In some cases, reversible cross-linking may also allow for reversible attachment of a material bound to the surface of a bead. In some cases, a cross-linker may form disulfide linkages. In some cases, the chemical cross-linker forming disulfide linkages may be cystamine or a modified cystamine.

Particles, e.g., beads, may be of uniform size or heterogeneous size. In some cases, the diameter of a particle, e.g., a bead, may be at least about 1 micrometer (μm), 5 μm, 10 μm, 20 μm, 30 μm, 40 μm, 50 μm, 60 μm, 70 μm, 80 μm, 90 μm, 100 μm, 250 μm, 500 μm, 1 mm, or greater. In some cases, a particle, e.g., a bead, may have a diameter of less than about 1 μm, 5 μm, 10 μm, 20 μm, 30 μm, 40 μm, 50 μm, 60 μm, 70 μm, 80 μm, 90 μm, 100 μm, 250 μm, 500 μm, 1 mm, or less. In some cases, a particle, e.g., a bead, may have a diameter in the range of about 40-75 μm, 30-75 μm, 20-75 μm, 40-85 μm, 40-95 μm, 20-100 μm, 10-100 μm, 1-100 μm, 20-250 μm, or 20-500 μm. The size of a particle, e.g., a bead, e.g., a gel bead, used to produce droplets is typically on the order of a cross section of the first channel (width or depth). In some cases, the gel beads are larger than the width and/or depth of the first channel and/or shelf, e.g., at least 1.5×, 2×, 3×, or 4× larger than the width and/or depth of the first channel and/or shelf.

In certain embodiments, particles, e.g., beads, can be provided as a population or plurality of particles, e.g., beads, having a relatively monodisperse size distribution. Where it may be desirable to provide relatively consistent amounts of reagents within droplets, maintaining relatively consistent particle, e.g., bead, characteristics, such as size, can contribute to the overall consistency. In particular, the particles, e.g., beads, described herein may have size distributions that have a coefficient of variation in their cross-sectional dimensions of less than 50%, less than 40%, less than 30%, less than 20%, and in some cases less than 15%, less than 10%, less than 5%, or less.

Particles may be of any suitable shape. Examples of particles, e.g., beads, shapes include, but are not limited to, spherical, non-spherical, oval, oblong, amorphous, circular, cylindrical, and variations thereof.

A particle, e.g., bead, injected or otherwise introduced into a droplet may comprise releasably, cleavably, or reversibly attached analyte moieties (e.g., barcodes). A particle, e.g., bead, injected or otherwise introduced into a droplet may comprise activatable analyte moieties (e.g., barcodes). A particle, e.g., bead, injected or otherwise introduced into a droplet may be a degradable, disruptable, or dissolvable particle, e.g., dissolvable bead.

Particles, e.g., beads, within a channel may flow at a substantially regular flow profile (e.g., at a regular flow rate). Such regular flow profiles can permit a droplet, when formed, to include a single particle (e.g., bead) and a single cell or other biological particle. Such regular flow profiles may permit the droplets to have an dual occupancy (e.g., droplets having at least one bead and at least one cell or other biological particle) greater than 5%, 10%, 20%, 30%, 40%, 50%, 60%, 70%, 80%, 81%, 82%, 83%, 84%, 85%, 86%, 87%, 88%, 89%, 90%, 91%, 92%, 93%, 94%, 95%, 96%, 97% 98%, or 99% of the population. In some embodiments, the droplets have a 1:1 dual occupancy (i.e., droplets having exactly one particle (e.g., bead) and exactly one cell or other biological particle) greater than 5%, 10%, 20%, 30%, 40%, 50%, 60%, 70%, 80%, 81%, 82%, 83%, 84%, 85%, 86%, 87%, 88%, 89%, 90%, 91%, 92%, 93%, 94%, 95%, 96%, 97% 98%, or 99% of the population. Such regular flow profiles and devices that may be used to provide such regular flow profiles are provided, for example, in U.S. Patent Publication No. 2015/0292988, which is entirely incorporated herein by reference.

As discussed above, analyte moieties (e.g., barcodes) can be releasably, cleavably or reversibly attached to the particles, e.g., beads, such that analyte moieties (e.g., barcodes) can be released or be releasable through cleavage of a linkage between the barcode molecule and the particle, e.g., bead, or released through degradation of the particle (e.g., bead) itself, allowing the barcodes to be accessed or be accessible by other reagents, or both. Releasable analyte moieties (e.g., barcodes) may sometimes be referred to as activatable analyte moieties (e.g., activatable barcodes), in that they are available for reaction once released. Thus, for example, an activatable analyte moiety (e.g., activatable barcode) may be activated by releasing the analyte moiety (e.g., barcode) from a particle, e.g., bead (or other suitable type of droplet described herein). Other activatable configurations are also envisioned in the context of the described methods and systems.

In addition to, or as an alternative to the cleavable linkages between the particles, e.g., beads, and the associated antigen detection moieties, such as barcode containing nucleic acids (e.g., oligonucleotides), the particles, e.g., beads may be degradable, disruptable, or dissolvable spontaneously or upon exposure to one or more stimuli (e.g., temperature changes, pH changes, exposure to particular chemical species or phase, exposure to light, reducing agent, etc.). In some cases, a particle, e.g., bead, may be dissolvable, such that material components of the particle, e.g., bead, are degraded or solubilized when exposed to a particular chemical species or an environmental change, such as a change temperature or a change in pH. In some cases, a gel bead can be degraded or dissolved at elevated temperature and/or in basic conditions. In some cases, a particle, e.g., bead, may be thermally degradable such that when the particle, e.g., bead, is exposed to an appropriate change in temperature (e.g., heat), the particle, e.g., bead, degrades. Degradation or dissolution of a particle (e.g., bead) bound to a species (e.g., a nucleic acid, e.g., an oligonucleotide, e.g., barcoded oligonucleotide) may result in release of the species from the particle, e.g., bead. As will be appreciated from the above disclosure, the degradation of a particle, e.g., bead, may refer to the disassociation of a bound or entrained species from a particle, e.g., bead, both with and without structurally degrading the physical particle, e.g., bead, itself. For example, entrained species may be released from particles, e.g., beads, through osmotic pressure differences due to, for example, changing chemical environments. By way of example, alteration of particle, e.g., bead, pore sizes due to osmotic pressure differences can generally occur without structural degradation of the particle, e.g., bead, itself. In some cases, an increase in pore size due to osmotic swelling of a particle, e.g., bead or microcapsule (e.g., liposome), can permit the release of entrained species within the particle. In other cases, osmotic shrinking of a particle may cause the particle, e.g., bead, to better retain an entrained species due to pore size contraction.

A degradable particle, e.g., bead, may be introduced into a droplet, such as a droplet of an emulsion or a well, such that the particle, e.g., bead, degrades within the droplet and any associated species (e.g., nucleic acids, oligonucleotides, or fragments thereof) are released within the droplet when the appropriate stimulus is applied. The free species (e.g., nucleic acid, oligonucleotide, or fragment thereof) may interact with other reagents contained in the droplet. For example, a polyacrylamide bead comprising cystamine and linked, via a disulfide bond, to a barcode sequence, may be combined with a reducing agent within a droplet of a water-in-oil emulsion. Within the droplet, the reducing agent can break the various disulfide bonds, resulting in particle, e.g., bead, degradation and release of the barcode sequence into the aqueous, inner environment of the droplet. In another example, heating of a droplet comprising a particle-, e.g., bead-, bound analyte moiety (e.g., barcode) in basic solution may also result in particle, e.g., bead, degradation and release of the attached barcode sequence into the aqueous, inner environment of the droplet.

Any suitable number of analyte moieties (e.g., molecular tag molecules (e.g., primer, barcoded oligonucleotide, etc.)) can be associated with a particle, e.g., bead, such that, upon release from the particle, the analyte moieties (e.g., molecular tag molecules (e.g., primer, e.g., barcoded oligonucleotide, etc.)) are present in the droplet at a pre-defined concentration. Such pre-defined concentration may be selected to facilitate certain reactions for generating a sequencing library, e.g., amplification, within the droplet. In some cases, the pre-defined concentration of a primer can be limited by the process of producing oligonucleotide-bearing particles, e.g., beads.

Additional reagents may be included as part of the particles (e.g., analyte moieties) and/or in solution or dispersed in the droplet, for example, to activate, mediate, or otherwise participate in a reaction, e.g., between the analyte and analyte moiety.

Biological Samples

A droplet of the present disclosure may include biological particles (e.g., cells) and/or macromolecular constituents thereof (e.g., components of cells (e.g., intracellular or extracellular proteins, nucleic acids, glycans, or lipids) or products of cells (e.g., secretion products)). An analyte from a biological particle, e.g., component or product thereof, may be considered to be a bioanalyte. In some embodiments, a biological particle, e.g., cell, or product thereof is included in a droplet, e.g., with one or more particles (e.g., beads) having an analyte moiety. A biological particle, e.g., cell, and/or components or products thereof can, in some embodiments, be encased inside a gel, such as via polymerization of a droplet containing the biological particle and precursors capable of being polymerized or gelled.

In the case of encapsulated biological particles (e.g., cells), a biological particle may be included in a droplet that contains lysis reagents in order to release the contents (e.g., contents containing one or more analytes (e.g., bioanalytes)) of the biological particles within the droplet. In such cases, the lysis agents can be contacted with the biological particle suspension concurrently with, or immediately prior to the introduction of the biological particles into the droplet formation region, for example, through an additional channel or channels upstream or proximal to a second channel or a third channel that is upstream or proximal to a second droplet formation region. Examples of lysis agents include bioactive reagents, such as lysis enzymes that are used for lysis of different cell types, e.g., gram positive or negative bacteria, plants, yeast, mammalian, etc., such as lysozymes, achromopeptidase, lysostaphin, labiase, kitalase, lyticase, and a variety of other lysis enzymes available from, e.g., Sigma-Aldrich, Inc. (St Louis, MO), as well as other commercially available lysis enzymes. Other lysis agents may additionally or alternatively be contained in a droplet with the biological particles (e.g., cells) to cause the release of the biological particles' contents into the droplets. For example, in some cases, surfactant based lysis solutions may be used to lyse cells, although these may be less desirable for emulsion based systems where the surfactants can interfere with stable emulsions. In some cases, lysis solutions may include non-ionic surfactants such as, for example, TRITON X-100 and TWEEN 20. In some cases, lysis solutions may include ionic surfactants such as, for example, sarcosyl and sodium dodecyl sulfate (SDS). In some embodiments, lysis solutions are hypotonic, thereby lysing cells by osmotic shock. Electroporation, thermal, acoustic or mechanical cellular disruption may also be used in certain cases, e.g., non-emulsion based droplet formation such as encapsulation of biological particles that may be in addition to or in place of droplet formation, where any pore size of the encapsulate is sufficiently small to retain nucleic acid fragments of a desired size, following cellular disruption.

In addition to the lysis agents, other reagents can also be included in droplets with the biological particles, including, for example, DNase and RNase inactivating agents or inhibitors, such as proteinase K, chelating agents, such as EDTA, and other reagents employed in removing or otherwise reducing negative activity or impact of different cell lysate components on subsequent processing of nucleic acids. In addition, in the case of encapsulated biological particles (e.g., cells), the biological particles may be exposed to an appropriate stimulus to release the biological particles or their contents from a microcapsule within a droplet. For example, in some cases, a chemical stimulus may be included in a droplet along with an encapsulated biological particle to allow for degradation of the encapsulating matrix and release of the cell or its contents into the larger droplet. In some cases, this stimulus may be the same as the stimulus described elsewhere herein for release of analyte moieties (e.g., oligonucleotides) from their respective particle (e.g., bead). In alternative aspects, this may be a different and non-overlapping stimulus, in order to allow an encapsulated biological particle to be released into a droplet at a different time from the release of analyte moieties (e.g., oligonucleotides) into the same droplet.

Additional reagents may also be included in droplets with the biological particles, such as endonucleases to fragment a biological particle's DNA, DNA polymerase enzymes and dNTPs used to amplify the biological particle's nucleic acid fragments and to attach the barcode molecular tags to the amplified fragments. Other reagents may also include reverse transcriptase enzymes, including enzymes with terminal transferase activity, primers and oligonucleotides, and switch oligonucleotides (also referred to herein as "switch oligos" or "template switching oligonucleotides") which can be used for template switching. In some cases, template switching can be used to increase the length of a cDNA. In some cases, template switching can be used to append a predefined nucleic acid sequence to the cDNA. In an example of template switching, cDNA can be generated from reverse transcription of a template, e.g., cellular mRNA, where a reverse transcriptase with terminal transferase activity can add additional nucleotides, e.g., polyC, to the cDNA in a template independent manner. Switch oligos can include sequences complementary to the additional nucleotides, e.g., polyG. The additional nucleotides (e.g., polyC) on the cDNA can hybridize to the additional nucleotides (e.g., polyG) on the switch oligo, whereby the switch oligo can be used by the reverse transcriptase as template to further extend the cDNA. Template switching oligonucleotides may comprise a hybridization region and a template region. The hybridization region can comprise any sequence capable of hybridizing to the target. In some cases, as previously described, the hybridization region comprises a series of G bases to complement the overhanging C bases at the 3' end of a cDNA molecule. The series of G bases may comprise 1 G base, 2 G bases, 3 G bases, 4 G bases, 5 G bases or more than 5 G bases. The template sequence can comprise any sequence to be incorporated into the cDNA. In some cases, the template region comprises at least 1 (e.g., at least 2, 3, 4, 5 or more) tag sequences and/or functional sequences. Switch oligos may comprise deoxyribonucleic acids; ribonucleic acids; modified nucleic acids including 2-Aminopurine, 2,6-Diaminopurine (2-Amino-dA), inverted dT, 5-Methyl dC, 2'-deoxyinosine, Super T (5-hydroxybutynl-2'-deoxyuridine), Super G (8-aza-7-deazaguanosine), locked nucleic acids (LNAs), unlocked nucleic acids (UNAs, e.g., UNA-A, UNA-U, UNA-C, UNA-G), Iso-dG, Iso-dC, 2' Fluoro bases (e.g., Fluoro C, Fluoro U, Fluoro A, and Fluoro G), or any combination.

In some cases, the length of a switch oligo may be 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250 nucleotides or longer.

In some cases, the length of a switch oligo may be at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249 or 250 nucleotides or longer.

In some cases, the length of a switch oligo may be at most 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249 or 250 nucleotides.

Once the contents of the cells are released into their respective droplets, the macromolecular components (e.g., macromolecular constituents of biological particles, such as RNA, DNA, or proteins) contained therein may be further processed within the droplets.

As described above, the macromolecular components (e.g., bioanalytes) of individual biological particles (e.g., cells) can be provided with unique identifiers (e.g., barcodes) such that upon characterization of those macromolecular components, at which point components from a heterogeneous population of cells may have been mixed and are interspersed or solubilized in a common liquid, any given component (e.g., bioanalyte) may be traced to the biological particle (e.g., cell) from which it was obtained. The ability to attribute characteristics to individual biological particles or groups of biological particles is provided by the assignment of unique identifiers specifically to an individual biological particle or groups of biological particles. Unique identifiers, for example, in the form of nucleic acid barcodes, can be assigned or associated with individual biological particles (e.g., cells) or populations of biological particles (e.g., cells), in order to tag or label the biological particle's macromolecular components (and as a result, its characteristics) with the unique identifiers. These unique identifiers can then be used to attribute the biological particle's components and characteristics to an individual biological particle or group of biological particles. This can be performed by forming droplets including the individual biological particle or groups of biological particles with the unique identifiers (via particles, e.g., beads), as described in the systems and methods herein.

In some aspects, the unique identifiers are provided in the form of oligonucleotides that comprise nucleic acid barcode sequences that may be attached to or otherwise associated with the nucleic acid contents of individual biological particle, or to other components of the biological particle, and particularly to fragments of those nucleic acids. The oligonucleotides are partitioned such that as between oligonucleotides in a given droplet, the nucleic acid barcode sequences contained therein are the same, but as between different droplets, the oligonucleotides can, and do have differing barcode sequences, or at least represent a large number of different barcode sequences across all of the droplets in a given analysis. In some aspects, only one nucleic acid barcode sequence can be associated with a given droplet, although in some cases, two or more different barcode sequences may be present.

The nucleic acid barcode sequences can include from 6 to about 20 or more nucleotides within the sequence of the oligonucleotides. In some cases, the length of a barcode sequence may be 6, 7, 8, 9, 10, 11, 12, 13, 14, 15, 16, 17, 18, 19, 20 nucleotides or longer. In some cases, the length of a barcode sequence may be at least 6, 7, 8, 9, 10, 11, 12, 13, 14, 15, 16, 17, 18, 19, 20 nucleotides or longer. In some cases, the length of a barcode sequence may be at most 6, 7, 8, 9, 10, 11, 12, 13, 14, 15, 16, 17, 18, 19, 20 nucleotides or shorter. These nucleotides may be completely contiguous, i.e., in a single stretch of adjacent nucleotides, or they may be separated into two or more separate subsequences that are separated by 1 or more nucleotides. In some cases, separated barcode subsequences can be from about 4 to about 16 nucleotides in length. In some cases, the barcode subsequence may be 4, 5, 6, 7, 8, 9, 10, 11, 12, 13, 14, 15, 16 nucleotides or longer. In some cases, the barcode subsequence may be at least 4, 5, 6, 7, 8, 9, 10, 11, 12, 13, 14, 15, 16 nucleotides or longer. In some cases, the barcode subsequence may be at most 4, 5, 6, 7, 8, 9, 10, 11, 12, 13, 14, 15, 16 nucleotides or shorter.

Analyte moieties (e.g., oligonucleotides) in droplets can also include other functional sequences useful in processing of nucleic acids from biological particles contained in the droplet. These sequences include, for example, targeted or random/universal amplification primer sequences for amplifying the genomic DNA from the individual biological particles within the droplets while attaching the associated barcode sequences, sequencing primers or primer recognition sites, hybridization or probing sequences, e.g., for identification of presence of the sequences or for pulling down barcoded nucleic acids, or any of a number of other potential functional sequences.

Other mechanisms of forming droplets containing oligonucleotides may also be employed, including, e.g., coalescence of two or more droplets, where one droplet contains oligonucleotides, or microdispensing of oligonucleotides into droplets, e.g., droplets within microfluidic systems.

In an example, particles (e.g., beads) are provided that each include large numbers of the above described barcoded oligonucleotides releasably attached to the beads, where all of the oligonucleotides attached to a particular bead will include the same nucleic acid barcode sequence, but where a large number of diverse barcode sequences are represented across the population of beads used. In some embodiments, hydrogel beads, e.g., beads having polyacrylamide polymer matrices, are used as a solid support and delivery vehicle for the oligonucleotides into the droplets, as they are capable of carrying large numbers of oligonucleotide molecules, and may be configured to release those oligonucleotides upon exposure to a particular stimulus, as described elsewhere herein. In some cases, the population of beads will provide a diverse barcode sequence library that includes at least about 1,000 different barcode sequences, at least about 5,000 different barcode sequences, at least about 10,000 different barcode sequences, at least about 50,000 different barcode sequences, at least about 100,000 different barcode sequences, at least about 1,000,000 different barcode sequences, at least about 5,000,000 different barcode sequences, or at least about 10,000,000 different barcode sequences, or more. Additionally, each bead can be provided with large numbers of oligonucleotide molecules attached. In particular, the number of molecules of oligonucleotides including the barcode sequence on an individual bead can be at least about 1,000 oligonucleotide molecules, at least about 5,000 oligonucleotide molecules, at least about 10,000 oligonucleotide molecules, at least about 50,000 oligonucleotide molecules, at least about 100,000 oligonucleotide molecules, at least about 500,000 oligonucleotides, at least about 1,000,000 oligonucleotide molecules, at least about 5,000,000 oligonucleotide molecules, at least about 10,000,000 oligonucleotide molecules, at least about 50,000,000 oligonucleotide molecules, at least about 100,000,000 oligonucleotide molecules, and in some cases at least about 1 billion oligonucleotide molecules, or more.

Moreover, when the population of beads are included in droplets, the resulting population of droplets can also include a diverse barcode library that includes at least about 1,000 different barcode sequences, at least about 5,000 different barcode sequences, at least about 10,000 different barcode sequences, at least at least about 50,000 different barcode sequences, at least about 100,000 different barcode sequences, at least about 1,000,000 different barcode sequences, at least about 5,000,000 different barcode sequences, or at least about 10,000,000 different barcode sequences. Additionally, each droplet of the population can include at least about 1,000 oligonucleotide molecules, at least about 5,000 oligonucleotide molecules, at least about 10,000 oligonucleotide molecules, at least about 50,000 oligonucleotide molecules, at least about 100,000 oligonucleotide molecules, at least about 500,000 oligonucleotides, at least about 1,000,000 oligonucleotide molecules, at least about 5,000,000 oligonucleotide molecules, at least about 10,000,000 oligonucleotide molecules, at least about 50,000,000 oligonucleotide molecules, at least about 100,000,000 oligonucleotide molecules, and in some cases at least about 1 billion oligonucleotide molecules.

In some cases, it may be desirable to incorporate multiple different barcodes within a given droplet, either attached to a single or multiple particles, e.g., beads, within the droplet. For example, in some cases, mixed, but known barcode sequences set may provide greater assurance of identification in the subsequent processing, for example, by providing a stronger address or attribution of the barcodes to a given droplet, as a duplicate or independent confirmation of the output from a given droplet.

Oligonucleotides may be releasable from the particles (e.g., beads) upon the application of a particular stimulus. In some cases, the stimulus may be a photo-stimulus, e.g., through cleavage of a photo-labile linkage that releases the oligonucleotides. In other cases, a thermal stimulus may be used, where increase in temperature of the particle, e.g., bead, environment will result in cleavage of a linkage or other release of the oligonucleotides form the particles, e.g., beads. In still other cases, a chemical stimulus is used that cleaves a linkage of the oligonucleotides to the beads, or otherwise results in release of the oligonucleotides from the particles, e.g., beads. In one case, such compositions include the polyacrylamide matrices described above for encapsulation of biological particles, and may be degraded for release of the attached oligonucleotides through exposure to a reducing agent, such as dithiothreitol (DTT).

The droplets described herein may contain either one or more biological particles (e.g., cells), either one or more barcode carrying particles, e.g., beads, or both at least a biological particle and at least a barcode carrying particle, e.g., bead. In some instances, a droplet may be unoccupied and contain neither biological particles nor barcode-carrying particles, e.g., beads. As noted previously, by controlling the flow characteristics of each of the liquids combining at the droplet formation region(s), as well as controlling the geometry of the droplet formation region(s), droplet formation can be optimized to achieve a desired occupancy level of particles, e.g., beads, biological particles, or both, within the droplets that are generated.

Kits and Systems

Devices of the invention may be combined with various external components, e.g., pumps, reservoirs, or controllers, reagents, e.g., analyte moieties, liquids, particles (e.g., beads), and/or sample in the form of kits and systems.

Methods

The methods described herein include ordering particles in a liquid in a device including a first channel having a first inlet and a first outlet and a first source of acoustic energy that is operatively coupled to the first channel. Actuating the first source of acoustic energy of the device propagates an acoustic wave, e.g., a traveling or standing acoustic wave, having one or more nodes in the first channel. Particles in a liquid in the first channel order according to the one or more nodes of the acoustic wave in the first channel. The particles in the liquid may be any of the particles as described herein, e.g., a cell or a gel bead.

The methods described herein include producing droplets that contain a particle in a device including a first channel having a first inlet and a first outlet, a first source of acoustic energy that is operatively coupled to the first channel, and a droplet formation region in fluid communication with the first inlet. Actuating the first source of acoustic energy of the device propagates an acoustic wave having one or more nodes in the first channel. Particles in a liquid in the first channel order according to the one or more nodes of the acoustic wave in the first channel, and the liquid with ordered particles flows through the droplet formation region to produce droplets that preferentially contain a specified number of particles. The frequency of the acoustic wave generated by actuating the source of acoustic energy controls the spacing between the nodes of the acoustic wave and thus the spacing of particles in the liquid, and may by varied according to the rate of droplet formation, e.g., a specified number of particles is contained in each droplet as the liquid containing ordered particles flows through the droplet formation region. In particular, the wavelength or speed of the acoustic wave may be changed to change the number of particles that is delivered from a given channel of a device, e.g., a first channel.

The methods described herein may allow for the production of one or more droplets of a uniform and predictable size containing a specified number of particles. Droplets produced using methods of the invention may contain any number of particles, e.g., 1, 2, 3, or more. The particles to be incorporated into droplets may be a biological particle, e.g., a cell, or a non-biological particle, e.g., a bead. For example, a droplet may contain one of a single type of particle, e.g. a droplet may contain a cell or may contain a gel bead. Alternatively, a droplet may contain more than one particle, e.g., two particles, with each particle being a different type of particle. For example, a droplet may contain two particles, with one particle being biological and the other being non-biological.

The methods described herein may produce droplets of a first liquid in a second liquid where the first liquid includes portions from two (or more) sources of liquid, e.g., reservoirs. The first and second reservoirs are in fluid communication with the first and second inlet, e.g., distal ends, respectively, of first and second channels. The portion of the first liquid in the first reservoir may include one type of particle, e.g., a gel bead or cell, and the portion of the first liquid in the second reservoir may include one type of particle, e.g., a gel bead or cell. Actuation of first and second sources of acoustic energy creates acoustic waves in the first and second channels, ordering the particles in the first and second portions of the first liquid. In some embodiments, the droplets that are formed by the first and second portions of the first liquid in the droplet formation region include a specified number of particles from the first portion of the first liquid that are preferentially associated with a specified number of particles from the second portion of the first liquid. As a non-limiting example, droplets may be formed from a first liquid in a second liquid, where a first portion of the first liquid is contained in a first channel of a device and includes a gel bead and a second portion of the first liquid is contained in a second channel of a device and includes a cell, or a lysate thereof. The sources of acoustic energy are actuated, and the frequency of the acoustic wave in each of the first and second channels is such that at the droplet formation region, one gel bead and one cell, or lysate thereof, are combined in a single droplet. In some cases, the first and second channel can intersect upstream of a droplet formation region, and the respective particles of each channel may be paired, then carried to the droplet formation region. Devices for forming droplets containing particles in the methods described herein can include additional channels, with each additional channel operatively coupled to source of acoustic energy, that cross a first channel or a second channel, e.g., 3 channels, 4 channels, or more, that can carry ordered particles and form droplets containing a specified number of particles, e.g., greater than 2.

Droplets may be formed by allowing a first liquid to flow into a second liquid in a droplet formation region, where droplets spontaneously form as described herein. The droplets may include an aqueous liquid dispersed phase within a non-aqueous continuous phase, such as an oil phase. In some cases, droplet formation may occur in the absence of externally driven movement of the continuous phase, e.g., a second liquid, e.g., an oil. As discussed above, the continuous phase may nonetheless be externally driven, even though it is not required for droplet formation. Emulsion systems for creating stable droplets in non-aqueous (e.g., oil) continuous phases are described in detail in, for example, U.S. Pat. No. 9,012,390, which is entirely incorporated herein by reference for all purposes. Alternatively or in addition, the droplets may include, for example, micro-vesicles that have an outer barrier surrounding an inner liquid center or core. In some cases, the droplets may include a porous matrix that is capable of entraining and/or retaining materials within its matrix. The droplets can be collected in a substantially stationary volume of liquid, e.g., with the buoyancy of the formed droplets moving them out of the path of nascent droplets (up or down depending on the relative density of the droplets and continuous phase). Alternatively or in addition, the formed droplets can be moved out of the path of nascent droplets actively, e.g., using a gentle flow of the continuous phase, e.g., a liquid stream or gently stirred liquid.

The methods described herein to generate droplets, e.g., of uniform and predictable sizes, and with high throughput, may be used to greatly increase the efficiency of single cell applications and/or other applications receiving droplet-based input. Such single cell applications and other applications may often be capable of processing a certain range of droplet sizes. The methods may be employed to generate droplets for use as microscale chemical reactors, where the volumes of the chemical reactants are small (~pLs).

The methods disclosed herein may produce emulsions, generally, i.e., droplet of a dispersed phases in a continuous phase. For example, droplets may include a first liquid, and the other liquid may be a second liquid. The first liquid may be substantially immiscible with the second liquid. In some instances, the first liquid may be an aqueous liquid or may be substantially miscible with water. Droplets produced according to the methods disclosed herein may combine multiple liquids. For example, a droplet may combine a first and third liquids. The first liquid may be substantially miscible with the third liquid. The second liquid may be an oil, as described herein.

A variety of applications require the evaluation of the presence and quantification of different biological particle or organism types within a population of biological particles, including, for example, microbiome analysis and characterization, environmental testing, food safety testing, epidemiological analysis, e.g., in tracing contamination or the like.

Allocating particles, e.g., beads (e.g., microcapsules carrying barcoded oligonucleotides) or biological particles (e.g., cells) to discrete droplets may generally be accomplished by introducing a flowing stream of particles, e.g., beads, in an aqueous liquid into a flowing stream or non-flowing reservoir of a non-aqueous liquid, such that droplets are generated. For example, the occupancy of the resulting droplets may be controlled by an acoustic wave, e.g., a traveling or standing acoustic wave, in the particle carrying channel that orders the particles along the one or more nodes of the acoustic wave. The frequency of the acoustic wave, and thus the frequency of the nodes, may be aligned with the rate of droplet formation through the droplet formation region. In some instances, the occupancy of the resulting droplets (e.g., number of particles, e.g., beads, per droplet) can be controlled by providing the aqueous stream at a certain concentration or frequency of particles, e.g., beads. Alternatively or in addition, the occupancy of the resulting droplets can also be controlled by adjusting one or more geometric features at the point of droplet formation, such as a width of a fluidic channel carrying the particles, e.g., beads, relative to a diameter of a given particles, e.g., beads.

Where single particle-, e.g., bead-, containing droplets are desired, the relative flow rates of the liquids can be selected such that, on average, the droplets contain fewer than one particle, e.g., bead, per droplet in order to ensure that those droplets that are occupied are primarily singly occupied. In some embodiments, the relative flow rates of the liquids can be selected such that a majority of droplets are occupied, for example, allowing for only a small percentage of unoccupied droplets. The flows and channel architectures can be controlled as to ensure a desired number of singly occupied droplets, less than a certain level of unoccupied droplets and/or less than a certain level of multiply occupied droplets. The methods described herein can be operated such that a majority of occupied droplets include no more than one biological particle per occupied droplet. In some cases, the droplet formation process is conducted such that fewer than 25% of the occupied droplets contain more than one biological particle (e.g., multiply occupied droplets), and in many cases, fewer than 20% of the occupied droplets have more than one biological particle. In some cases, fewer than 10% or even fewer than 5% of the occupied droplets include more than one biological particle per droplet.

It may be desirable to avoid the creation of excessive numbers of empty droplets, for example, from a cost perspective and/or efficiency perspective. However, while this may be accomplished by providing sufficient numbers of particles, e.g., beads, into the droplet formation region, the Poisson distribution may expectedly increase the number of droplets that may include multiple biological particles. As such, at most about 95%, 90%, 85%, 80%, 75%, 70%, 65%, 60%, 55%, 50%, 45%, 40%, 35%, 30%, 25%, 20%, 15%, 10%, 5% or less of the generated droplets can be unoccupied. In some cases, the flow of one or more of the particles, or liquids directed into the droplet formation region can be conducted such that, in many cases, no more than about 50% of the generated droplets, no more than about 25% of the generated droplets, or no more than about 10% of the generated droplets are unoccupied. These flows can be controlled so as to present non-Poisson distribution of singly occupied droplets while providing lower levels of unoccupied droplets. The above noted ranges of unoccupied droplets can be achieved while still providing any of the single occupancy rates described above. For example, in many cases, the use of the systems and methods described herein creates resulting droplets that have multiple occupancy rates of less than about 25%, less than about 20%, less than about 15%, less than about 10%, and in many cases, less than about 5%, while having unoccupied droplets of less than about 50%, less than about 40%, less than about 30%, less than about 20%, less than about 10%, less than about 5%, or less.

The flow of the first fluid may be such that the droplets contain a single particle, e.g., bead. In certain embodiments, the yield of droplets containing a single particle is at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%.

As will be appreciated, the above-described occupancy rates are also applicable to droplets that include both biological particles (e.g., cells) and beads. The occupied droplets (e.g., at least about 10%, 20%, 30%, 40%, 50%, 60%, 70%, 80%, 90%, 95%, or 99% of the occupied droplets) can include both a bead and a biological particle. Particles, e.g., beads, within one or more channels may be ordered by acoustic waves generated by sources of acoustic energy to such that the particles have a regular and consistent spacing, e.g., $\lambda/2$, to provide for a droplet containing a single particle (e.g., bead) and a single cell or other biological particle. Alternatively or in addition, particles in one or more channels may flow at a substantially regular flow profile (e.g., at a regular flow rate) to provide a droplet, when formed, with a single particle (e.g., bead) and a single cell or other biological particle. Such consistent particle spacing and/or regular flow profiles may permit the droplets to have a dual occupancy (e.g., droplets having at least one bead and at least one cell or biological particle) greater than 5%, 10%, 20%, 30%, 40%, 50%, 60%, 70%, 80%, 81%, 82%, 83%, 84%, 85%, 86%, 87%, 88%, 89%, 90%, 91%, 92%, 93%, 94%, 95%, 96%, 97% 98%, or 99%. In some embodiments, the droplets have a 1:1 dual occupancy (i.e., droplets having exactly one particle (e.g., bead) and exactly one cell or biological particle) greater than 5%, 10%, 20%, 30%, 40%, 50%, 60%, 70%, 80%, 81%, 82%, 83%, 84%, 85%, 86%, 87%, 88%, 89%, 90%, 91%, 92%, 93%, 94%, 95%, 96%, 97% 98%, or 99%. Such regular flow profiles and devices that may be used to provide such regular flow profiles are provided, for example, in U.S. Patent Publication No. 2015/0292988, which is entirely incorporated herein by reference.

In some cases, additional particles may be used to deliver additional reagents to a droplet. In such cases, it may be advantageous to introduce different particles (e.g., beads) into a common channel (e.g., proximal to or upstream from a droplet formation region) or droplet formation intersection from different bead sources (e.g., containing different associated reagents) through different channel inlets into such common channel or droplet formation region. In such cases, the flow and/or frequency of each of the different particle, e.g., bead, sources into the channel or fluidic connections may be controlled to provide for the desired ratio of particles, e.g., beads, from each source, while optionally ensuring the desired pairing or combination of such particles, e.g., beads, are formed into a droplet with the desired number of biological particles.

The droplets described herein may comprise small volumes, for example, less than about 10 microliters (μL), 5 μL, 1 μL, 900 picoliters (μL), 800 μL, 700 μL, 600 μL, 500 μL, 400 μL, 300 μL, 200 μL, 100 μL, 50 μL, 20 μL, 10 μL, 1 μL, 500 nanoliters (nL), 100 nL, 50 nL, or less. For example, the droplets may have overall volumes that are less than about 1000 μL, 900 μL, 800 μL, 700 μL, 600 μL, 500 μL, 400 μL, 300 μL, 200 μL, 100 μL, 50 μL, 20 μL, 10 μL, 1 μL, or less. Where the droplets further comprise particles (e.g., beads or microcapsules), it will be appreciated that the sample liquid volume within the droplets may be less than about 90% of the above described volumes, less than about 80%, less than about 70%, less than about 60%, less than about 50%, less than about 40%, less than about 30%, less than about 20%, or less than about 10% the above described volumes (e.g., of a partitioning liquid), e.g., from 1% to 99%, from 5% to 95%, from 10% to 90%, from 20% to 80%, from 30% to 70%, or from 40% to 60%, e.g., from 1% to 5%, 5% to 10%, 10% to 15%, 15% to 20%, 20% to 25%, 25% to 30%, 30% to 35%, 35% to 40%, 40% to 45%, 45% to 50%, 50% to 55%, 55% to 60%, 60% to 65%, 65% to 70%, 70% to 75%, 75% to 80%, 80% to 85%, 85% to 90%, 90% to 95%, or 95% to 100% of the above described volumes.

Any suitable number of droplets can be generated. For example, in a method described herein, a plurality of droplets may be generated that comprises at least about 1,000 droplets, at least about 5,000 droplets, at least about 10,000 droplets, at least about 50,000 droplets, at least about 100,000 droplets, at least about 500,000 droplets, at least about 1,000,000 droplets, at least about 5,000,000 droplets at least about 10,000,000 droplets, at least about 50,000,000 droplets, at least about 100,000,000 droplets, at least about 500,000,000 droplets, at least about 1,000,000,000 droplets, or more. Moreover, the plurality of droplets may comprise both unoccupied droplets (e.g., empty droplets) and occupied droplets.

The fluid to be dispersed into droplets may be transported from a reservoir to the droplet formation region. Alternatively, the fluid to be dispersed into droplets is formed in situ by combining two or more fluids in the device. For example, the fluid to be dispersed may be formed by combining one fluid containing one or more reagents with one or more other fluids containing one or more reagents. In these embodiments, the mixing of the fluid streams may result in a chemical reaction. For example, when a particle is employed, a fluid having reagents that disintegrates the particle may be combined with the particle, e.g., immediately upstream of the droplet generating region. In these embodiments, the particles may be cells, which can be combined with lysing reagents, such as surfactants. When particles, e.g., beads, are employed, the particles, e.g., beads, may be dissolved or chemically degraded, e.g., by a change in pH (acid or base), redox potential (e.g., addition of an oxidizing or reducing agent), enzymatic activity, change in salt or ion concentration, or other mechanism.

The first fluid is transported through the first channel at a flow rate sufficient to produce droplets in the droplet formation region. Faster flow rates of the first fluid generally increase the rate of droplet production; however, at a high enough rate, the first fluid will form a jet, which may not break up into droplets. Typically, the flow rate of the first fluid though the first channel may be between about 0.01 μL/min to about 100 μL/min, e.g., 0.1 to 50 μL/min, 0.1 to 10 μL/min, or 1 to 5 μL/min. In some instances, the flow rate of the first liquid may be between about 0.04 μL/min and about 40 μL/min. In some instances, the flow rate of the first liquid may be between about 0.01 μL/min and about 100 μL/min. Alternatively, the flow rate of the first liquid may be less than about 0.01 μL/min. Alternatively, the flow rate of the first liquid may be greater than about 40 μL/min, e.g., 45 μL/min, 50 μL/min, 55 μL/min, 60 μL/min, 65 μL/min, 70 μL/min, 75 μL/min, 80 μL/min, 85 μL/min, 90 μL/min, 95 μL/min, 100 μL/min, 110 μL/min, 120 μL/min, 130 μL/min, 140 μL/min, 150 μL/min, or greater. At lower flow rates, such as flow rates of about less than or equal to 10 μL/min, the droplet radius may not be dependent on the flow rate of first liquid. Alternatively or in addition, for any of the abovementioned flow rates, the droplet radius may be independent of the flow rate of the first liquid.

The typical droplet formation rate for a single channel in a device of the invention is between 0.1 Hz to 10,000 Hz, e.g., 1 to 1000 Hz or 1 to 500 Hz. The use of multiple first channels can increase the rate of droplet formation by increasing the number of locations of formation.

As discussed above, droplet formation may occur in the absence of externally driven movement of the continuous phase. In such embodiments, the continuous phase flows in response to displacement by the advancing stream of the first fluid or other forces. Channels may be present in the droplet formation region, e.g., including a shelf region, to allow more rapid transport of the continuous phase around the first fluid. This increase in transport of the continuous phase can increase the rate of droplet formation. Alternatively, the continuous phase may be actively transported. For example, the continuous phase may be actively transported into the droplet formation region, e.g., including a shelf region, to increase the rate of droplet formation; continuous phase may be actively transported to form a sheath flow around the first fluid as it exits the distal end; or the continuous phase may be actively transported to move droplets away from the point of formation.

Additional factors that affect the rate of droplet formation include the viscosity of the first fluid and of the continuous phase, where increasing the viscosity of either fluid reduces the rate of droplet formation. In certain embodiments, the viscosity of the first fluid and/or continuous is between 0.5 cP to 10 cP. Furthermore, lower interfacial tension results in slower droplet formation. In certain embodiments, the interfacial tension is between 0.1 and 100 mN/m, e.g., 1 to 100 mN/m or 2 mN/m to 60 mN/m. The depth of the shelf region can also be used to control the rate of droplet formation, with a shallower depth resulting in a faster rate of formation.

The methods may be used to produce droplets in range of 1 μm to 500 μm in diameter, e.g., 1 to 250 μm, 5 to 200 μm, 5 to 15[0 μm, or 12 to 125 μm. Factors that affect the size of the droplets include the rate of formation, the cross-sectional dimension of the distal end of the first channel, the depth of the shelf, and fluid properties and dynamic effects, such as the interfacial tension, viscosity, and flow rate.

The first liquid may be aqueous, and the second liquid may be an oil (or vice versa). Examples of oils include perfluorinated oils, mineral oil, and silicone oils. For example, a fluorinated oil may include a fluorosurfactant for stabilizing the resulting droplets, for example, inhibiting subsequent coalescence of the resulting droplets. Examples of particularly useful liquids and fluorosurfactants are described, for example, in U.S. Pat. No. 9,012,390, which is entirely incorporated herein by reference for all purposes. Specific examples include hydrofluoroethers, such as HFE 7500, 7300, 7200, or 7100. Suitable liquids are those described in US 2015/0224466 and US 62/522,292, the liquids of which are hereby incorporated by reference. In some cases, liquids include additional components such as a particle, e.g., a cell or a gel bead. As discussed above, the first fluid or continuous phase may include reagents for carrying out various reactions, such as nucleic acid amplification, lysis, or bead dissolution. The first liquid or continuous phase may include additional components that stabilize or otherwise affect the droplets or a component inside the droplet. Such additional components include surfactants, antioxidants, preservatives, buffering agents, antibiotic agents, salts, chaotropic agents, enzymes, nanoparticles, and sugars.

Devices, systems, compositions, and methods of the present disclosure may be used for various applications, such as, for example, processing a single analyte (e.g., bioanalytes, e.g., RNA, DNA, or protein) or multiple analytes (e.g., bioanalytes, e.g., DNA and RNA, DNA and protein, RNA and protein, or RNA, DNA and protein) from a single cell. For example, a biological particle (e.g., a cell or virus) can be formed in a droplet, and one or more analytes (e.g., bioanalytes) from the biological particle (e.g., cell) can be modified or detected (e.g., bound, labeled, or otherwise modified by an analyte moiety) for subsequent processing. The multiple analytes may be from the single cell. This process may enable, for example, proteomic, transcriptomic, and/or genomic analysis of the cell or population thereof (e.g., simultaneous proteomic, transcriptomic, and/or genomic analysis of the cell or population thereof).

Methods of modifying analytes include providing a plurality of particles (e.g., beads) in a liquid carrier (e.g., an aqueous carrier); providing a sample containing an analyte (e.g., as part of a cell, or component or product thereof) in a sample liquid; and using the device to combine the liquids and form an analyte droplet containing one or more particles and one or more analytes (e.g., as part of one or more cells, or components or products thereof). Such sequestration of one or more particles with analyte (e.g., bioanalyte associated with a cell) in a droplet enables labeling of discrete portions of large, heterologous samples (e.g., single cells within a heterologous population). Once labeled or otherwise modified, droplets can be combined (e.g., by breaking an emulsion), and the resulting liquid can be analyzed to determine a variety of properties associated with each of numerous single cells.

In particular embodiments, the invention features methods of producing droplets using a device having a particle channel and a sample channel that intersect proximal to a droplet formation region. Particles having an analyte moiety in a liquid carrier flow proximal-to-distal (e.g., towards the droplet formation region) through the particle channel and a sample liquid containing an analyte flows proximal-to-distal (e.g., towards the droplet formation region) through the sample channel until the two liquids meet and combine at the intersection of the sample channel and the particle channel, upstream (and/or proximal to) the droplet formation region. In some embodiments, the two liquids are miscible (e.g., they both contain solutes in water or aqueous buffer). The combination of the two liquids can occur at a controlled relative rate, such that the liquid has a desired volumetric ratio of particle liquid to sample liquid, a desired numeric ratio of particles to cells, or a combination thereof (e.g., one particle per cell per 50 pL). As the liquid flows through the droplet formation region into a partitioning liquid (e.g., a liquid which is immiscible with the liquid, such as an oil), droplets form. These droplets may continue to flow through one or more channels. Alternatively or in addition, the droplets may accumulate (e.g., as a substantially stationary population) in a droplet collection region. In some cases, the accumulation of a population of droplets may occur by a gentle flow of a fluid within the droplet collection region, e.g., to move the formed droplets out of the path of the nascent droplets.

Devices may feature any combination of elements described herein. For example, various droplet formation regions can be employed in the design of a device. In some embodiments, droplets are formed at a droplet formation region having a shelf region, where the liquid expands in at least one dimension as it passes through the droplet formation region. Any shelf region described herein can be useful in the methods of droplet formation provided herein. Additionally or alternatively, the droplet formation region may have a step at or distal to an inlet of the droplet formation region (e.g., within the droplet formation region or distal to the droplet formation region). In some embodiments, droplets are formed without externally driven flow of a continuous phase (e.g., by one or more crossing flows of liquid at the droplet formation region). Alternatively, droplets are formed in the presence of an externally driven flow of a continuous phase.

A device useful for droplet formation may feature multiple droplet formation regions (e.g., in or out of (e.g., as independent, parallel circuits) fluid communication with one another. For example, such a device may have 2-100, 3-50, 4-40, 5-30, 6-24, 8-18, or 9-12, e.g., 2-6, 6-12, 12-18, 18-24, 24-36, 36-48, or 48-96, e.g., 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, or more droplet formation regions configured to produce droplets).

Source reservoirs can store liquids prior to and during droplet formation. In some embodiments, a device useful in droplet formation includes one or more particle reservoirs connected proximally to one or more particle channels. Particle suspensions can be stored in particle reservoirs prior to droplet formation. Particle reservoirs can be configured to store particles containing an analyte moiety. For example, particle reservoirs can include, e.g., a coating to prevent adsorption or binding (e.g., specific or non-specific binding) of particles or analyte moieties. Additionally or alternatively, particle reservoirs can be configured to minimize degradation of analyte moieties (e.g., by containing nuclease, e.g., DNAse or RNAse) or the particle matrix itself, accordingly.

Additionally or alternatively, a device includes one or more sample reservoirs connected proximally to one or more sample channels. Samples containing cells and/or other reagents can be stored in sample reservoirs prior to droplet formation. Sample reservoirs can be configured to reduce degradation of sample components, e.g., by including nuclease (e.g., DNAse or RNAse).

Methods of the invention include administering a sample and/or particles to the device, for example, (a) by pipetting a sample liquid, or a component or concentrate thereof, into a sample reservoir and/or (b) by pipetting a liquid carrier (e.g., an aqueous carrier) and/or particles into a particle reservoir. In some embodiments, the method involves first pipetting the liquid carrier (e.g., an aqueous carrier) and/or particles into the particle reservoir prior to pipetting the sample liquid, or a component or concentrate thereof, into the sample reservoir.

The sample reservoir and/or particle reservoir may be incubated in conditions suitable to preserve or promote activity of their contents until the initiation or commencement of droplet formation.

Formation of bioanalyte droplets, as provided herein, can be used for various applications. In particular, by forming bioanalyte droplets using the methods, devices, systems, and kits herein, a user can perform standard downstream processing methods to barcode heterogeneous populations of cells or perform single-cell nucleic acid sequencing.

In methods of barcoding a population of cells, an aqueous sample having a population of cells is combined with bioanalyte particles having a nucleic acid primer sequence and a barcode in an aqueous carrier at an intersection of the sample channel and the particle channel to form a reaction liquid. Upon passing through the droplet formation region, the reaction liquid meets a partitioning liquid (e.g., a partitioning oil) under droplet-forming conditions to form a plurality of reaction droplets, each reaction droplet having one or more of the particles and one or more cells in the reaction liquid. The reaction droplets are incubated under conditions sufficient to allow for barcoding of the nucleic acid of the cells in the reaction droplets. In some embodiments, the conditions sufficient for barcoding are thermally optimized for nucleic acid replication, transcription, and/or amplification. For example, reaction droplets can be incubated at temperatures configured to enable reverse transcription of RNA produced by a cell in a droplet into DNA, using reverse transcriptase. Additionally or alternatively, reaction droplets may be cycled through a series of temperatures to promote amplification, e.g., as in a polymerase chain reaction (PCR). Accordingly, in some embodiments, one or more nucleotide amplification reagents (e.g., PCR reagents) are included in the reaction droplets (e.g., primers, nucleotides, and/or polymerase). Any one or more reagents for nucleic acid replication, transcription, and/or amplification can be provided to the reaction droplet by the aqueous sample, the liquid carrier, or both. In some embodiments, one or more of the reagents for nucleic acid replication, transcription, and/or amplification are in the aqueous sample.

Also provided herein are methods of single-cell nucleic acid sequencing, in which a heterologous population of cells can be characterized by their individual gene expression, e.g., relative to other cells of the population. Methods of barcoding cells discussed above and known in the art can be part of the methods of single-cell nucleic acid sequencing provided herein. After barcoding, nucleic acid transcripts that have been barcoded are sequenced, and sequences can be processed, analyzed, and stored according to known methods. In some embodiments, these methods enable the generation of a genome library containing gene expression data for any single cell within a heterologous population.

Alternatively, the ability to sequester a single cell in a reaction droplet provided by methods herein enables applications beyond genome characterization. For example, a reaction droplet containing a single cell and variety of analyte moieties capable of binding different proteins can allow a single cell to be detectably labeled to provide relative protein expression data. In some embodiments, analyte moieties are antigen-binding molecules (e.g., antibodies or fragments thereof), wherein each antibody clone is detectably labeled (e.g., with a fluorescent marker having a distinct emission wavelength). Binding of antibodies to proteins can occur within the reaction droplet, and cells can be subsequently analyzed for bound antibodies according to known methods to generate a library of protein expression. Other methods known in the art can be employed to characterize cells within heterologous populations. In one example, following the formation or droplets, subsequent operations that can be performed can include formation of amplification products, purification (e.g., via solid phase reversible immobilization (SPRI)), further processing (e.g., shearing, ligation of functional sequences, and subsequent amplification (e.g., via PCR)). These operations may occur in bulk (e.g., outside the droplet). An exemplary use for droplets formed using methods of the invention is in performing nucleic acid amplification, e.g., polymerase chain reaction (PCR), where the reagents necessary to carry out the amplification are contained within the first fluid. In the case where a droplet is a droplet in an emulsion, the emulsion can be broken and the contents of the droplet pooled for additional operations. Additional reagents that may be included in a droplet along with the barcode bearing bead may include oligonucleotides to block ribosomal RNA (rRNA) and nucleases to digest genomic DNA from cells. Alternatively, rRNA removal agents may be applied during additional processing operations. The configuration of the constructs generated by such a method can help minimize (or avoid) sequencing of poly-T sequence during sequencing and/or sequence the 5' end of a polynucleotide sequence. The amplification products, for example first amplification products and/or second amplification products, may be subject to sequencing for sequence analysis. In some cases, amplification may be performed using the Partial Hairpin Amplification for Sequencing (PHASE) method.

Methods of Device Manufacture

The microfluidic devices of the present disclosure may be fabricated in any of a variety of conventional ways. For example, in some cases the devices comprise layered structures, where a first layer includes a planar surface into which is disposed a series of channels or grooves that correspond to the channel network in the finished device. A second layer includes a planar surface on one side, and a series of reservoirs defined on the opposing surface, where the reservoirs communicate as passages through to the planar layer, such that when the planar surface of the second layer is mated with the planar surface of the first layer, the reservoirs defined in the second layer are positioned in liquid communication with the termini of the channels on the first layer. Alternatively, both the reservoirs and the connected channels may be fabricated into a single part, where the reservoirs are provided upon a first surface of the structure, with the apertures of the reservoirs extending through to the opposing surface of the structure. The channel network is fabricated as a series of grooves and features in this second surface. A thin laminating layer is then provided over the second surface to seal, and provide the final wall of the channel network, and the bottom surface of the reservoirs.

These layered structures may be fabricated in whole or in part from polymeric materials, such as polyethylene or polyethylene derivatives, such as cyclic olefin copolymers (COC), polymethylmethacrylate (PMMA), polydimethylsiloxane (PDMS), polycarbonate, polystyrene, polypropylene, polyvinyl chloride, polytetrafluoroethylene, polyoxymethylene, polyether ether ketone, polycarbonate, polystyrene, or the like, or they may be fabricated in whole or in part from inorganic materials, such as silicon, or other silica based materials, e.g., glass, quartz, fused silica, borosilicate glass, metals, ceramics, and combinations thereof. Polymeric device components may be fabricated using any of a number of processes including soft lithography, embossing techniques, micromachining, e.g., laser machining, or in some aspects injection molding of the layer components that include the defined channels as well as other structures, e.g., reservoirs, integrated functional components, etc. In some aspects, the structure comprising the reservoirs and channels may be fabricated using, e.g., injection molding techniques to produce polymeric structures. In such cases, a laminating layer may be adhered to the molded structured part through readily available methods, including thermal lamination, solvent based lamination, sonic welding, or the like.

As will be appreciated, structures comprised of inorganic materials also may be fabricated using known techniques. For example, channels and other structures may be micro-machined into surfaces or etched into the surfaces using standard photolithographic techniques. In some aspects, the microfluidic devices or components thereof may be fabricated using three-dimensional printing techniques to fabricate the channel or other structures of the devices and/or their discrete components.

Methods for Surface Modifications

The invention features methods for producing a microfluidic device that has a surface modification, e.g., a surface with a modified water contact angle. The methods may be employed to modify the surface of a device such that a liquid can "wet" the surface by altering the contact angle the liquid makes with the surface. An exemplary use of the methods of the invention is in creating a device having differentially coated surfaces to optimize droplet formation.

Devices to be modified with surface coating agents may be primed, e.g., pre-treated, before coating processes occur. In one embodiment, the device has a channel that is in fluid communication with a droplet formation region. In particular, the droplet formation region is configured to allow a liquid exiting the channel to expand in at least one dimension. A surface of the droplet formation region is contacted by at least one reagent that has an affinity for the primed surface to produce a surface having a first water contact angle of greater than about 90°, e.g., a hydrophobic or fluorophillic surface. In certain embodiments, the first contact angle is greater than the water contact angle of the primed surface. In other embodiments, the first contact angle is greater than the water contact angle of the channel surface. Thus, the method allows for the differential coating of surfaces within the microfluidic device. In some embodiments, the shelf region has a wettability that differs from the that of the first channel.

A surface may be primed by depositing a metal oxide onto it. Example metal oxides useful for priming surfaces include, but are not limited to, $Al_2O_3$, $TiO_2$, $SiO_2$, or a combination thereof. Other metal oxides useful for surface modifications are known in the art. The metal oxide can be applied to the surface by standard deposition techniques, including, but not limited to, atomic layer deposition (ALD), physical vapor deposition (PVD), e.g., sputtering, chemical vapor deposition (CVD), or laser deposition. Other deposition techniques for coating surfaces, e.g., liquid-based deposition, are known in the art. For example, an atomic layer of $Al_2O_3$ can be prepared on a surface by depositing trimethylaluminum (TMA) and water.

In some cases, the coating agent may create a surface that has a water contact angle greater than 90°, e.g., hydrophobic or fluorophillic, or may create a surface with a water contact angle of less than 90°, e.g., hydrophilic. For example, a fluorophillic surface may be created by flowing fluorosilane (e.g., $H_3FSi$) through a primed device surface, e.g., a surface coated in a metal oxide. The priming of the surfaces of the device enhances the adhesion of the coating agents to the surface by providing appropriate surface functional groups. In some cases, the coating agent used to coat the primed surface may be a liquid reagent. For example, when a liquid coating agent is used to coat a surface, the coating agent may be directly introduced to the droplet formation region by a feed channel in fluid communication with the droplet formation region. In order to keep the coating agent localized to the droplet formation region, e.g., prevent ingress of the coating agent to another portion of the device, e.g., the channel, the portion of the device that is not to be coated can be substantially blocked by a substance that does not allow the coating agent to pass. For example, in order to prevent ingress of a liquid coating agent into the channel, the channel may be filled with a blocking liquid that is substantially immiscible with the coating agent. The blocking liquid may be actively transported through the portion of the device not to be coated, or the blocking liquid may be stationary. Alternatively, the channel may be filled with a pressurized gas such that the pressure prevents ingress of the coating agent into the channel. The coating agent may also be applied to the regions of interest external to the main device. For example, the device may incorporate an additional reservoir and at least one feed channel that connects to the region of interest such that no coating agent is passed through the device.

EXAMPLES

Examples 1 and 2 describe the production of acoustic waves in devices, systems, and methods of the invention and how the structural features of the generated acoustic waves may order particles along the length of a channel to provide for droplets containing a particle. Examples 3-24 show various droplet formation regions that can be used in devices, systems, and methods of the invention.

Example 1

An example scheme on the effect of an acoustic wave on particles in a channel is shown in FIG. 1. The particles, shown as circles, order along the nodes created where the amplitude of the acoustic wave is zero. The spacing between the nodes, and thus the spacing between the particles is represented as $\lambda/2$, where A is the wavelength of the acoustic wave.

Example 2

Figure 2:
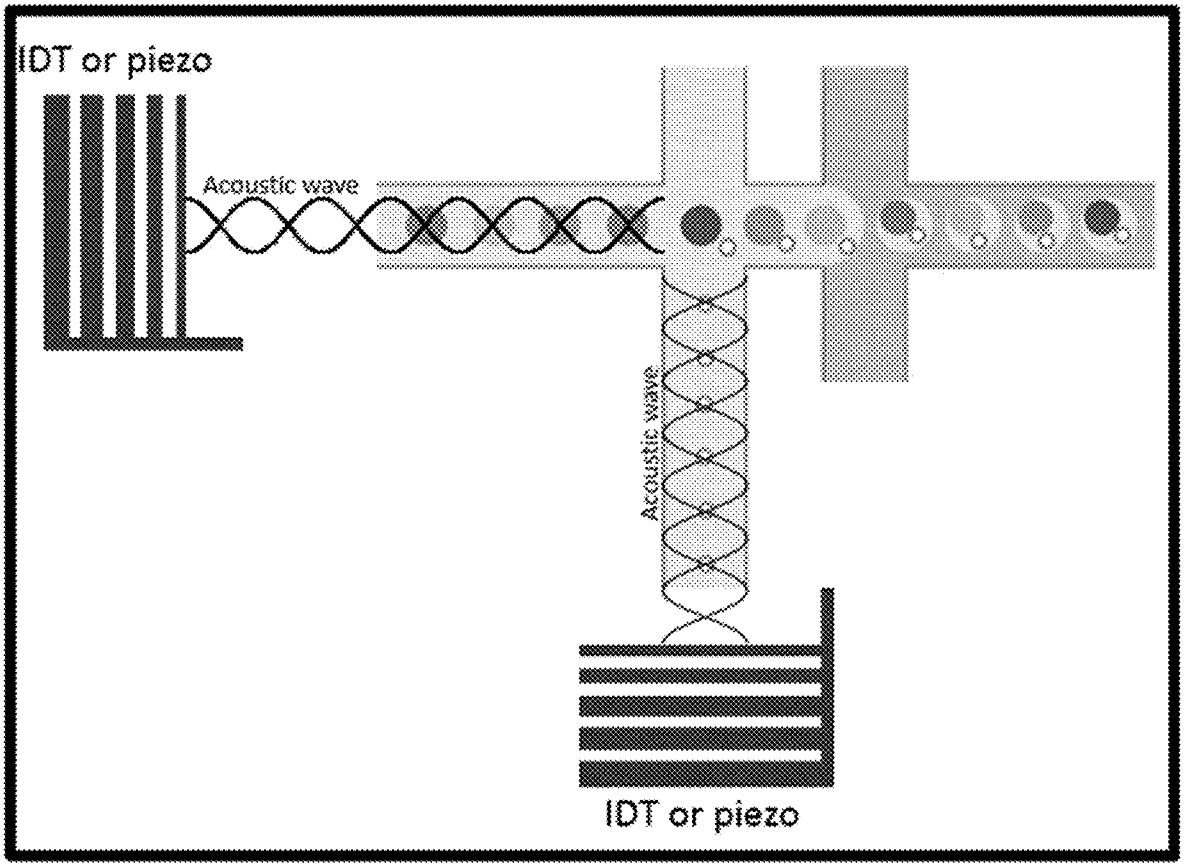
FIG. 2 is a schematic of a droplet forming device incorporating two sources of acoustic energy to order particles in a liquid along the nodes formed by standing acoustic waves.

FIG. 2 presents a schematic of an embodiment of a device and method of the invention where two sources of acoustic energy are used to control the occupancy of a droplet formed. In FIG. 2, the device includes a first channel, a second channel that intersects the first channel between the proximal and distal ends of the first channel, and a droplet formation region in fluid communication with the first distal end. The device includes a source of acoustic energy, such as an interdigitated transducer (IDT) or a piezoelectric material, that is operatively coupled to each channel such that an acoustic wave is produced in each channel.

In FIG. 2, the liquid in the first channel (depicted horizontally) contains one type of particle, represented by the shaded circles, and the liquid in the second channel (depicted vertically) contains a different type of particle, represented by white circles. In each of the first and second channels, the acoustic waves (shown in black) have nodes according to which the particles in each channel are ordered. When the liquids meet at the intersection of the first and second channels, one particle from the first channel is associated with the one particle from the second channel. The associated particles are then transported to a droplet formation region. The resulting droplets formed in the droplet formation region include the associated particles.

Example 3

Figure 3:
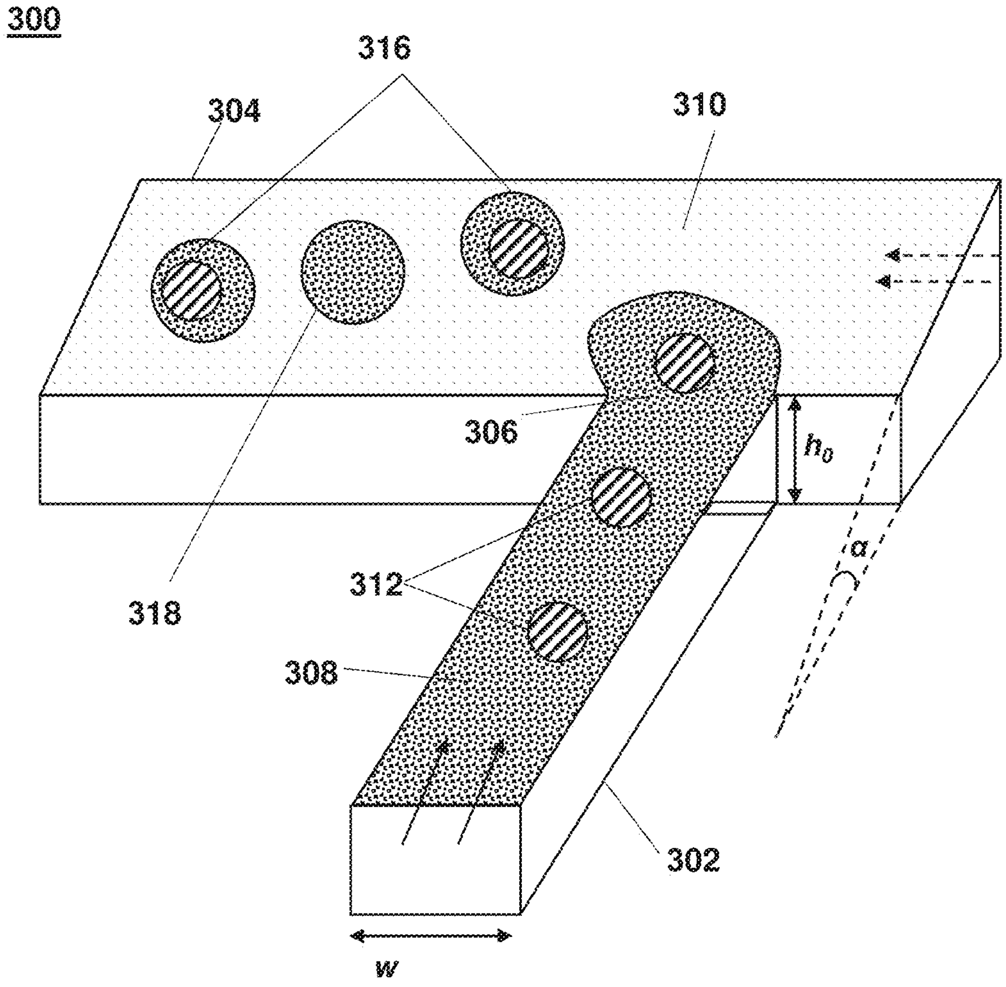
FIG. 3 shows an example of a microfluidic device for the introduction of particles, e.g., beads, into discrete droplets.

FIG. 3 shows an example of a microfluidic device for the controlled inclusion of particles, e.g., beads, into discrete droplets. A device 300 can include a channel 302 communicating at a fluidic connection 306 (or intersection) with a reservoir 304. The reservoir 304 can be a chamber. Any reference to "reservoir," as used herein, can also refer to a "chamber." In operation, an aqueous liquid 308 that includes suspended beads 312 may be transported along the channel 302 into the fluidic connection 306 to meet a second liquid 310 that is immiscible with the aqueous liquid 308 in the reservoir 304 to create droplets 336, 338 of the aqueous liquid 308 flowing into the reservoir 304. At the fluidic connection 306 where the aqueous liquid 308 and the second liquid 310 meet, droplets can form based on factors such as the hydrodynamic forces at the fluidic connection 306, flow rates of the two liquids 308, 310, liquid properties, and certain geometric parameters (e.g., w, $h_0$, $\alpha$, etc.) of the device 300. A plurality of droplets can be collected in the reservoir 304 by continuously injecting the aqueous liquid 308 from the channel 302 through the fluidic connection 306.

In some instances, the second liquid 310 may not be subjected to and/or directed to any flow in or out of the reservoir 304. For example, the second liquid 310 may be substantially stationary in the reservoir 304. In some instances, the second liquid 310 may be subjected to flow within the reservoir 304, but not in or out of the reservoir 304, such as via application of pressure to the reservoir 304 and/or as affected by the incoming flow of the aqueous liquid 308 at the fluidic connection 306. Alternatively, the second liquid 310 may be subjected and/or directed to flow in or out of the reservoir 304. For example, the reservoir 304 can be a channel directing the second liquid 310 from upstream to downstream, transporting the generated droplets. Alternatively or in addition, the second liquid 310 in reservoir 304 may be used to sweep formed droplets away from the path of the nascent droplets.

While FIG. 3 illustrates the reservoir 304 having a substantially linear inclination (e.g., creating the expansion angle, $\alpha$) relative to the channel 302, the inclination may be non-linear. The expansion angle may be an angle between the immediate tangent of a sloping inclination and the channel 302. In an example, the reservoir 304 may have a dome-like (e.g., hemispherical) shape. The reservoir 304 may have any other shape.

Example 4

Figure 4:
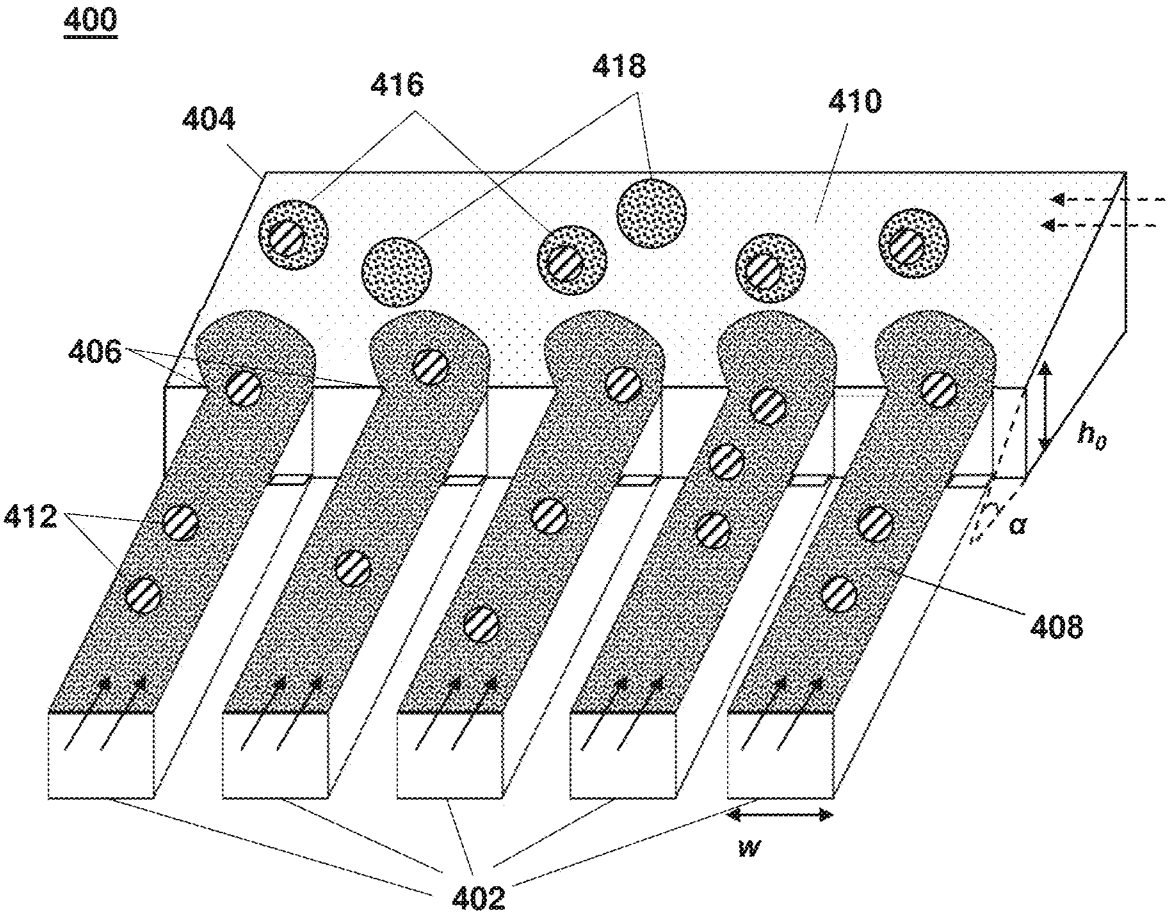
FIG. 4 shows an example of a microfluidic device for increased droplet formation throughput.

FIG. 4 shows an example of a microfluidic device for increased droplet formation throughput. A device 400 can comprise a plurality of channels 404 and a reservoir 404. Each of the plurality of channels 404 may be in fluid communication with the reservoir 404. The device 400 can comprise a plurality of fluidic connections 406 between the plurality of channels 404 and the reservoir 404. Each fluidic connection can be a point of droplet formation. The channel 302 from the device 300 in FIG. 3 and any description to the components thereof may correspond to a given channel of the plurality of channels 402 in device 400 and any description to the corresponding components thereof. The reservoir 304 from the device 300 and any description to the components thereof may correspond to the reservoir 404 from the device 400 and any description to the corresponding components thereof.

Each channel of the plurality of channels 402 may comprise an aqueous liquid 408 that includes suspended particles, e.g., beads, 412. The reservoir 404 may comprise a second liquid 410 that is immiscible with the aqueous liquid 408. In some instances, the second liquid 410 may not be subjected to and/or directed to any flow in or out of the reservoir 404. For example, the second liquid 410 may be substantially stationary in the reservoir 404. Alternatively or in addition, the formed droplets can be moved out of the path of nascent droplets using a gentle flow of the second liquid 410 in the reservoir 404. In some instances, the second liquid 410 may be subjected to flow within the reservoir 404, but not in or out of the reservoir 404, such as via application of pressure to the reservoir 404 and/or as affected by the incoming flow of the aqueous liquid 408 at the fluidic connections. Alternatively, the second liquid 410 may be subjected and/or directed to flow in or out of the reservoir 404. For example, the reservoir 404 can be a channel directing the second liquid 410 from upstream to downstream, transporting the generated droplets. Alternatively or in addition, the second liquid 410 in reservoir 404 may be used to sweep formed droplets away from the path of the nascent droplets.

In operation, the aqueous liquid 408 that includes suspended particles, e.g., beads, 412 may be transported along the plurality of channels 404 into the plurality of fluidic connections 406 to meet the second liquid 410 in the reservoir 404 to create droplets 416, 418. A droplet may form from each channel at each corresponding fluidic connection with the reservoir 404. At the fluidic connection where the aqueous liquid 408 and the second liquid 410 meet, droplets can form based on factors such as the hydrodynamic forces at the fluidic connection, flow rates of the two liquids 408, 410, liquid properties, and certain geometric parameters (e.g., w, $h_0$, a, etc.) of the device 400, as described elsewhere herein. A plurality of droplets can be collected in the reservoir 404 by continuously injecting the aqueous liquid 408 from the plurality of channels 402 through the plurality of fluidic connections 406. The geometric parameters, w, $h_0$, and a, may or may not be uniform for each of the channels in the plurality of channels 402. For example, each channel may have the same or different widths at or near its respective fluidic connection with the reservoir 404. For example, each channel may have the same or different height at or near its respective fluidic connection with the reservoir 404. In another example, the reservoir 404 may have the same or different expansion angle at the different fluidic connections with the plurality of channels 404. When the geometric parameters are uniform, beneficially, droplet size may also be controlled to be uniform even with the increased throughput. In some instances, when it is desirable to have a different distribution of droplet sizes, the geometric parameters for the plurality of channels 402 may be varied accordingly.

Example 5

Figure 5:
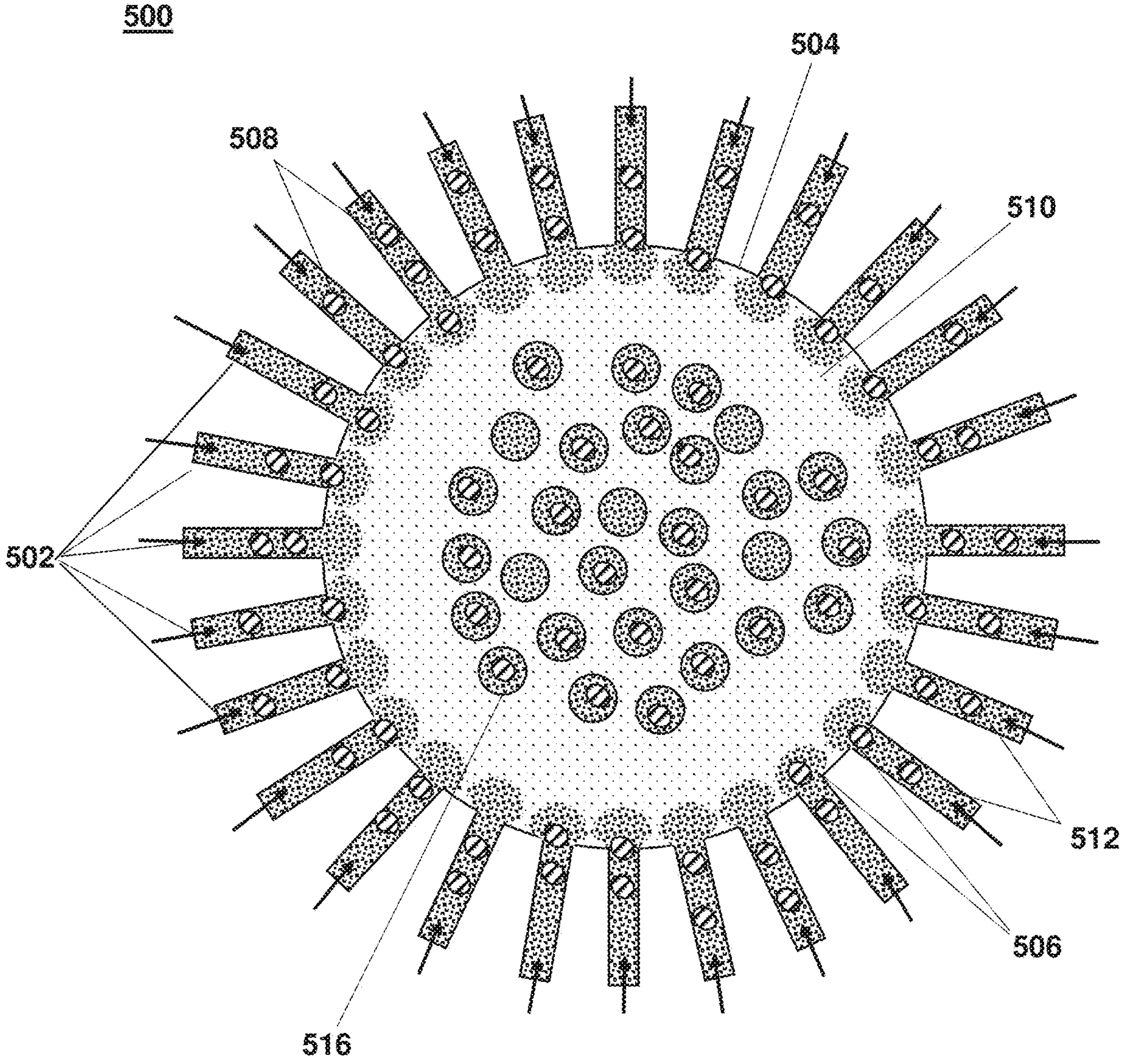
FIG. 5 shows another example of a microfluidic device for increased droplet formation throughput.

FIG. 5 shows another example of a microfluidic device for increased droplet formation throughput. A microfluidic device 500 can comprise a plurality of channels 502 arranged generally circularly around the perimeter of a reservoir 504. Each of the plurality of channels 502 may be in liquid communication with the reservoir 504. The device 500 can comprise a plurality of fluidic connections 506 between the plurality of channels 502 and the reservoir 504. Each fluidic connection can be a point of droplet formation. The channel 102 from the device 100 in FIG. 1 and any description to the components thereof may correspond to a given channel of the plurality of channels 502 in device 500 and any description to the corresponding components thereof. The reservoir 504 from the device 500 and any description to the components thereof may correspond to the reservoir 504 from the device 500 and any description to the corresponding components thereof.

Each channel of the plurality of channels 502 may comprise an aqueous liquid 508 that includes suspended particles, e.g., beads, 512. The reservoir 504 may comprise a second liquid 510 that is immiscible with the aqueous liquid 508. In some instances, the second liquid 510 may not be subjected to and/or directed to any flow in or out of the reservoir 504. For example, the second liquid 510 may be substantially stationary in the reservoir 504. In some instances, the second liquid 510 may be subjected to flow within the reservoir 504, but not in or out of the reservoir 504, such as via application of pressure to the reservoir 504 and/or as affected by the incoming flow of the aqueous liquid 508 at the fluidic connections. Alternatively, the second liquid 510 may be subjected and/or directed to flow in or out of the reservoir 504. For example, the reservoir 504 can be a channel directing the second liquid 510 from upstream to downstream, transporting the generated droplets. Alternatively or in addition, the second liquid 510 in reservoir 504 may be used to sweep formed droplets away from the path of the nascent droplets.

In operation, the aqueous liquid 508 that includes suspended particles, e.g., beads, 512 may be transported along the plurality of channels 502 into the plurality of fluidic connections 506 to meet the second liquid 510 in the reservoir 504 to create a plurality of droplets 516. A droplet may form from each channel at each corresponding fluidic connection with the reservoir 504. At the fluidic connection where the aqueous liquid 508 and the second liquid 510 meet, droplets can form based on factors such as the hydrodynamic forces at the fluidic connection, flow rates of the two liquids 508, 510, liquid properties, and certain geometric parameters (e.g., widths and heights of the channels 502, expansion angle of the reservoir 504, etc.) of the channel, as described elsewhere herein. A plurality of droplets can be collected in the reservoir 504 by continuously injecting the aqueous liquid 508 from the plurality of channels 502 through the plurality of fluidic connections 506.

Example 6

Figure 6:
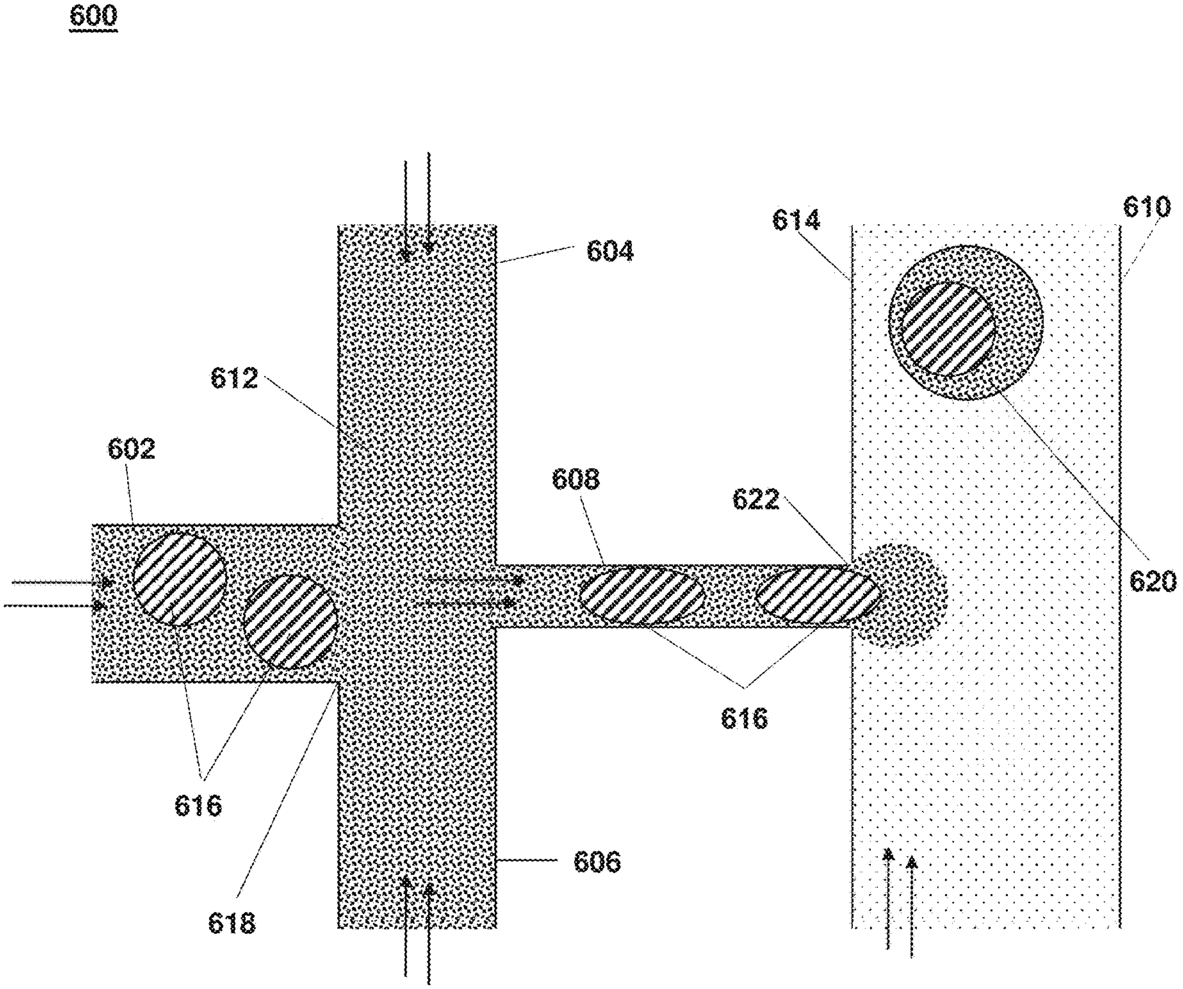
FIG. 6 shows another example of a microfluidic device for the introduction of particles, e.g., beads, into discrete droplets.

FIG. 6 shows another example of a microfluidic device for the introduction of beads into discrete droplets. A device 400 can include a first channel 602, a second channel 604, a third channel 606, a fourth channel 608, and a reservoir 610. The first channel 602, second channel 604, third channel 606, and fourth channel 608 can communicate at a first intersection 618. The fourth channel 606 and the reservoir 610 can communicate at a fluidic connection 622. In some instances, the fourth channel 608 and components thereof can correspond to the channel 302 in the device 300 in FIG. 3 and components thereof. In some instances, the reservoir 610 and components thereof can correspond to the reservoir 304 in the device 300 and components thereof.

In operation, an aqueous liquid 612 that includes suspended particles, e.g., beads, 616 may be transported along the first channel 602 into the intersection 618 at a first frequency to meet another source of the aqueous liquid 612 flowing along the second channel 604 and the third channel 606 towards the intersection 618 at a second frequency. In some instances, the aqueous liquid 612 in the second channel 604 and the third channel 606 may comprise one or more reagents. At the intersection, the combined aqueous liquid 612 carrying the suspended particles, e.g., beads, 616 (and/or the reagents) can be directed into the fourth channel 608. In some instances, a cross-section width or diameter of the fourth channel 608 can be chosen to be less than a cross-section width or diameter of the particles, e.g., beads, 616. In such cases, the particles, e.g., beads, 616 can deform and travel along the fourth channel 608 as deformed particles, e.g., beads, 620 towards the fluidic connection 622. At the fluidic connection 622, the aqueous liquid 612 can meet a second liquid 614 that is immiscible with the aqueous liquid 612 in the reservoir 610 to create droplets 620 of the aqueous liquid 612 flowing into the reservoir 610. Upon leaving the fourth channel 608, the deformed particles, e.g., beads, 620 may revert to their original shape in the droplets 620. At the fluidic connection 622 where the aqueous liquid 612 and the second liquid 614 meet, droplets can form based on factors such as the hydrodynamic forces at the fluidic connection 622, flow rates of the two liquids 612, 614, liquid properties, and certain geometric parameters (e.g., w, $h_0$, a, etc.) of the channel, as described elsewhere herein. A plurality of droplets can be collected in the reservoir 610 by continuously injecting the aqueous liquid 612 from the fourth channel 608 through the fluidic connection 622.

A discrete droplet generated may include a particle, e.g., a bead, (e.g., as in droplets 620). Alternatively, a discrete droplet generated may include more than one particle, e.g., bead. Alternatively, a discrete droplet generated may not include any particles, e.g., beads. In some instances, a discrete droplet generated may contain one or more biological particles, e.g., cells (not shown in FIG. 6).

In some instances, the second liquid 614 may not be subjected to and/or directed to any flow in or out of the reservoir 610. For example, the second liquid 614 may be substantially stationary in the reservoir 610. In some instances, the second liquid 614 may be subjected to flow within the reservoir 610, but not in or out of the reservoir 610, such as via application of pressure to the reservoir 610 and/or as affected by the incoming flow of the aqueous liquid 612 at the fluidic connection 622. In some instances, the second liquid 614 may be gently stirred in the reservoir 610. Alternatively, the second liquid 614 may be subjected and/or directed to flow in or out of the reservoir 610. For example, the reservoir 610 can be a channel directing the second liquid 614 from upstream to downstream, transporting the generated droplets. Alternatively or in addition, the second liquid 614 in reservoir 610 may be used to sweep formed droplets away from the path of the nascent droplets.

Example 7

Figure 7A:
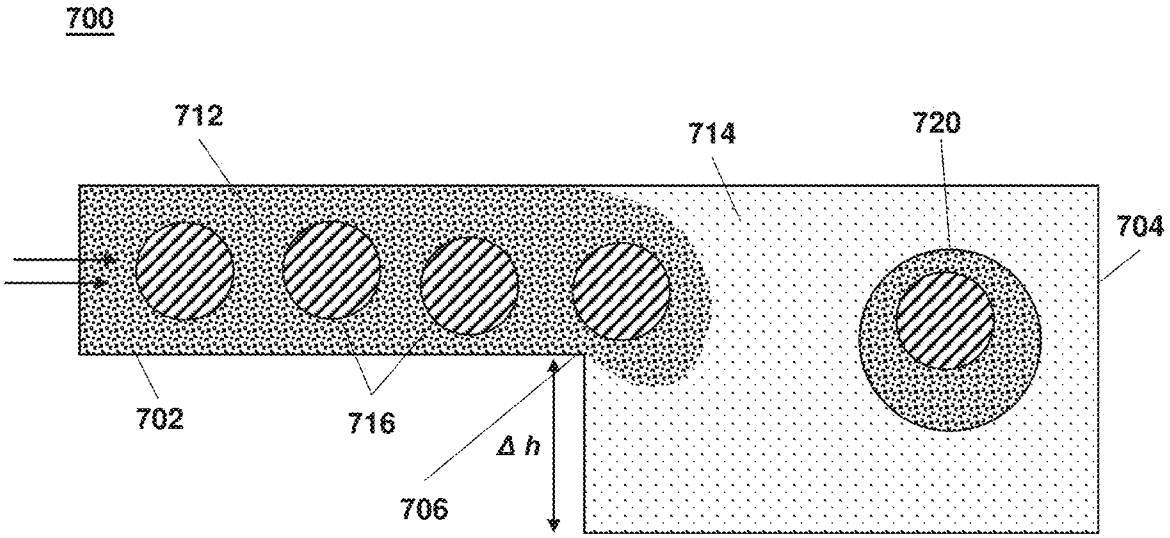
FIGS. 7A-7B show cross-section (FIG. 7A) and perspective (FIG. 7B) views an embodiment according to the invention of a microfluidic device with a geometric feature for droplet formation.
Figure 7B:
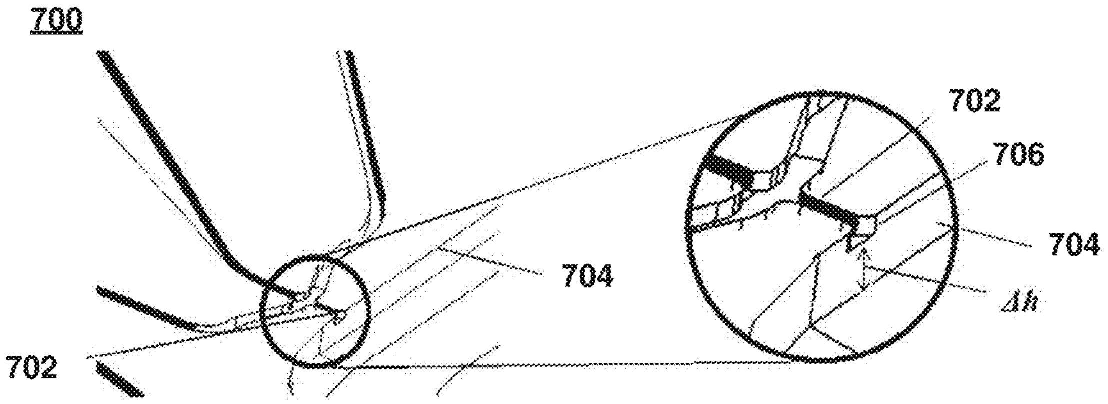

FIG. 7A shows a cross-section view of another example of a microfluidic device with a geometric feature for droplet formation. A device 700 can include a channel 702 communicating at a fluidic connection 706 (or intersection) with a reservoir 704. In some instances, the device 700 and one or more of its components can correspond to the device 100 and one or more of its components. FIG. 7B shows a perspective view of the device 700 of FIG. 7A.

An aqueous liquid 712 comprising a plurality of particles 716 may be transported along the channel 702 into the fluidic connection 706 to meet a second liquid 714 (e.g., oil, etc.) that is immiscible with the aqueous liquid 712 in the reservoir 704 to create droplets 720 of the aqueous liquid 712 flowing into the reservoir 704. At the fluidic connection 706 where the aqueous liquid 712 and the second liquid 714 meet, droplets can form based on factors such as the hydrodynamic forces at the fluidic connection 706, relative flow rates of the two liquids 712, 714, liquid properties, and certain geometric parameters (e.g., Δh, etc.) of the device 700. A plurality of droplets can be collected in the reservoir 704 by continuously injecting the aqueous liquid 712 from the channel 702 at the fluidic connection 706.

While FIGS. 7A and 7B illustrate the height difference, Δh, being abrupt at the fluidic connection 706 (e.g., a step increase), the height difference may increase gradually (e.g., from about 0 μm to a maximum height difference). Alternatively, the height difference may decrease gradually (e.g., taper) from a maximum height difference. A gradual increase or decrease in height difference, as used herein, may refer to a continuous incremental increase or decrease in height difference, wherein an angle between any one differential segment of a height profile and an immediately adjacent differential segment of the height profile is greater than 90°. For example, at the fluidic connection 706, a bottom wall of the channel and a bottom wall of the reservoir can meet at an angle greater than 90°. Alternatively or in addition, a top wall (e.g., ceiling) of the channel and a top wall (e.g., ceiling) of the reservoir can meet an angle greater than 90°. A gradual increase or decrease may be linear or non-linear (e.g., exponential, sinusoidal, etc.). Alternatively or in addition, the height difference may variably increase and/or decrease linearly or non-linearly.

Example 8

Figure 8A:
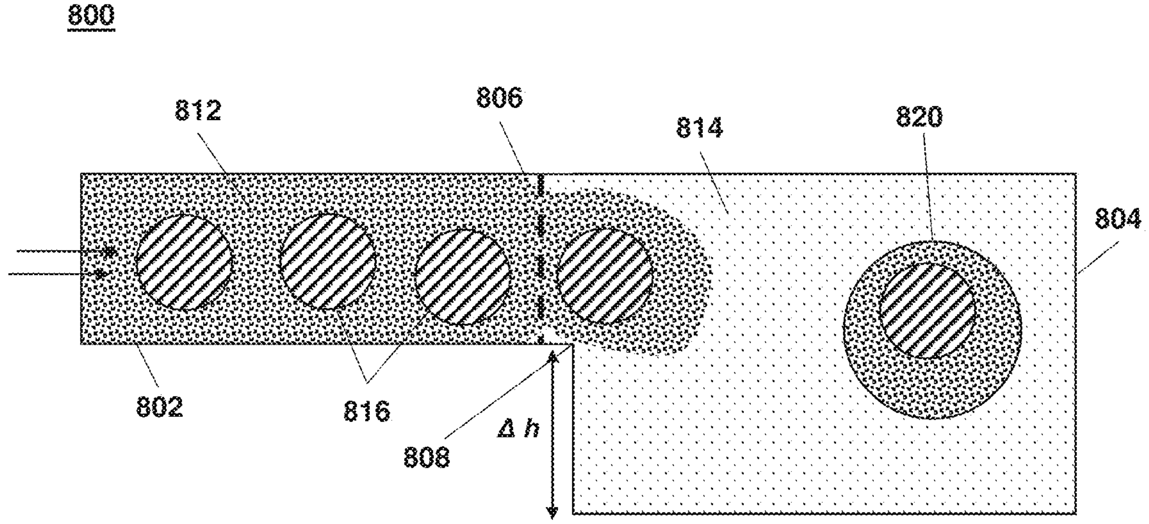
FIGS. 8A-8B show a cross-section view and a top view, respectively, of another example of a microfluidic device with a geometric feature for droplet formation.
Figure 8B:
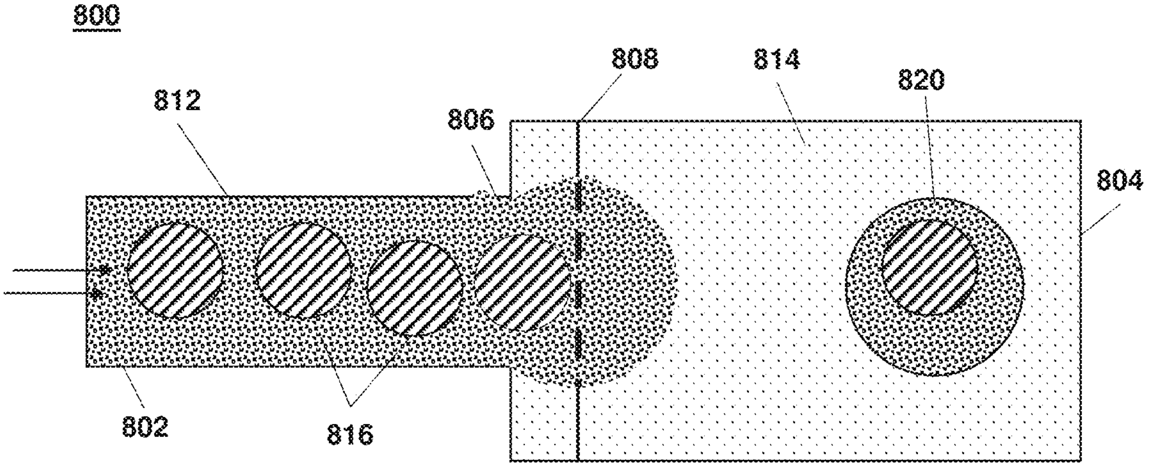

FIGS. 8A and 8B show a cross-section view and a top view, respectively, of another example of a microfluidic device with a geometric feature for droplet formation. A device 800 can include a channel 802 communicating at a fluidic connection 806 (or intersection) with a reservoir 804. In some instances, the device 800 and one or more of its components can correspond to the device 700 and one or more of its components.

An aqueous liquid 812 comprising a plurality of particles 816 may be transported along the channel 802 into the fluidic connection 806 to meet a second liquid 814 (e.g., oil, etc.) that is immiscible with the aqueous liquid 812 in the reservoir 804 to create droplets 820 of the aqueous liquid 812 flowing into the reservoir 804. At the fluidic connection 806 where the aqueous liquid 812 and the second liquid 814 meet, droplets can form based on factors such as the hydrodynamic forces at the fluidic connection 806, relative flow rates of the two liquids 812, 814, liquid properties, and certain geometric parameters (e.g., Δh, ledge, etc.) of the channel 802. A plurality of droplets can be collected in the reservoir 804 by continuously injecting the aqueous liquid 812 from the channel 802 at the fluidic connection 806.

The aqueous liquid may comprise particles. The particles 816 (e.g., beads) can be introduced into the channel 802 from a separate channel (not shown in FIG. 8). In some instances, the particles 616 can be introduced into the channel 802 from a plurality of different channels, and the frequency controlled accordingly. In some instances, different particles may be introduced via separate channels. For example, a first separate channel can introduce beads and a second separate channel can introduce biological particles into the channel 802. The first separate channel introducing the beads may be upstream or downstream of the second separate channel introducing the biological particles.

While FIGS. 8A and 8B illustrate one ledge (e.g., step) in the reservoir 804, as can be appreciated, there may be a plurality of ledges in the reservoir 804, for example, each having a different cross-section height. For example, where there is a plurality of ledges, the respective cross-section height can increase with each consecutive ledge. Alternatively, the respective cross-section height can decrease and/or increase in other patterns or profiles (e.g., increase then decrease then increase again, increase then increase then increase, etc.).

While FIGS. 8A and 8B illustrate the height difference, Δh, being abrupt at the ledge 808 (e.g., a step increase), the height difference may increase gradually (e.g., from about 0 μm to a maximum height difference). In some instances, the height difference may decrease gradually (e.g., taper) from a maximum height difference. In some instances, the height difference may variably increase and/or decrease linearly or non-linearly. The same may apply to a height difference, if any, between the first cross-section and the second cross-section.

Example 9

Figure 9A:
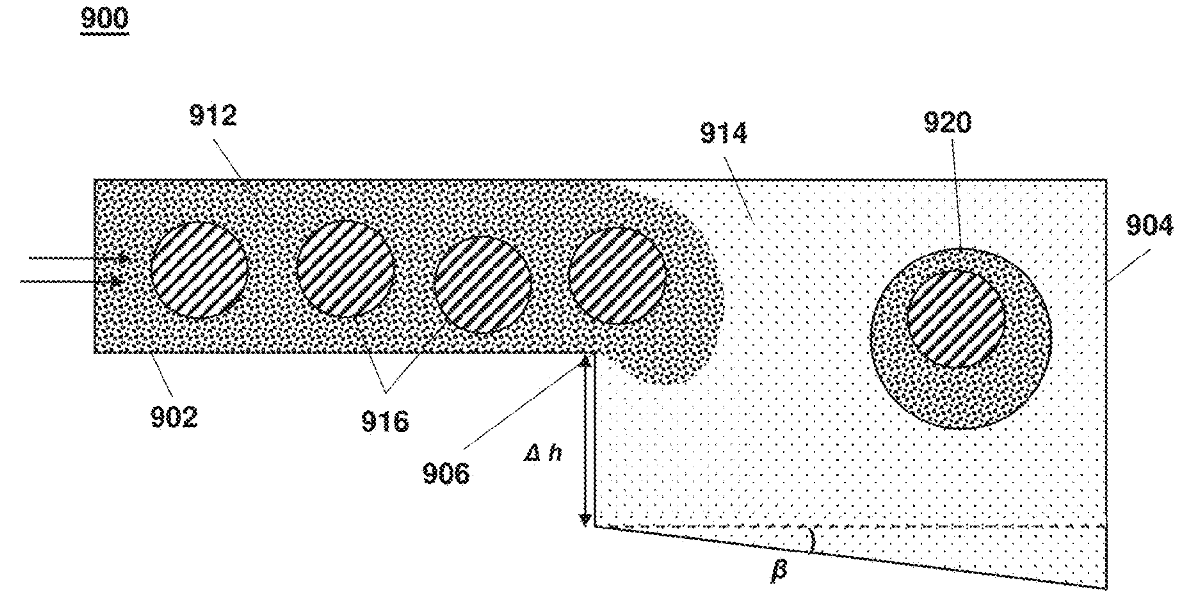
FIGS. 9A-9B show a cross-section view and a top view, respectively, of another example of a microfluidic device with a geometric feature for droplet formation.
Figure 9B:
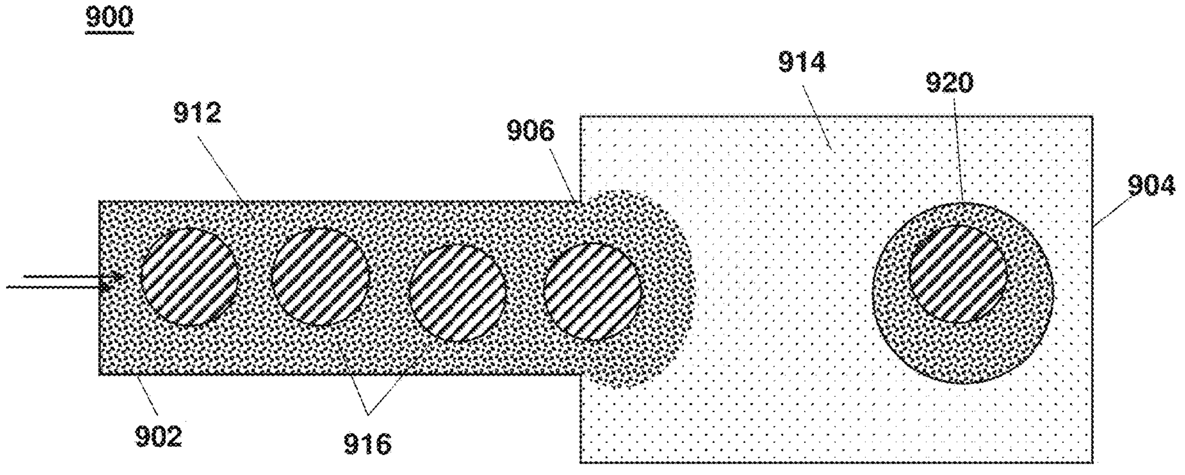

FIGS. 9A and 9B show a cross-section view and a top view, respectively, of another example of a microfluidic device with a geometric feature for droplet formation. A device 900 can include a channel 902 communicating at a fluidic connection 906 (or intersection) with a reservoir 904. In some instances, the device 900 and one or more of its components can correspond to the device 800 and one or more of its components.

An aqueous liquid 912 comprising a plurality of particles 916 may be transported along the channel 902 into the fluidic connection 906 to meet a second liquid 914 (e.g., oil, etc.) that is immiscible with the aqueous liquid 912 in the reservoir 904 to create droplets 920 of the aqueous liquid 912 flowing into the reservoir 904. At the fluidic connection 906 where the aqueous liquid 912 and the second liquid 914 meet, droplets can form based on factors such as the hydrodynamic forces at the fluidic connection 906, relative flow rates of the two liquids 912, 914, liquid properties, and certain geometric parameters (e.g., Δh, etc.) of the device 900. A plurality of droplets can be collected in the reservoir 904 by continuously injecting the aqueous liquid 912 from the channel 902 at the fluidic connection 906.

In some instances, the second liquid 914 may not be subjected to and/or directed to any flow in or out of the reservoir 904. For example, the second liquid 914 may be substantially stationary in the reservoir 904. In some instances, the second liquid 914 may be subjected to flow within the reservoir 904, but not in or out of the reservoir 904, such as via application of pressure to the reservoir 904 and/or as affected by the incoming flow of the aqueous liquid 912 at the fluidic connection 906. Alternatively, the second liquid 914 may be subjected and/or directed to flow in or out of the reservoir 904. For example, the reservoir 904 can be a channel directing the second liquid 914 from upstream to downstream, transporting the generated droplets. Alternatively or in addition, the second liquid 914 in reservoir 904 may be used to sweep formed droplets away from the path of the nascent droplets.

The device 900 at or near the fluidic connection 906 may have certain geometric features that at least partly determine the sizes and/or shapes of the droplets formed by the device 900. The channel 902 can have a first cross-section height, $h_1$, and the reservoir 904 can have a second cross-section height, $h_2$. The first cross-section height, $h_1$, may be different from the second cross-section height $h_2$ such that at or near the fluidic connection 906, there is a height difference of $\Delta h$. The second cross-section height, $h_2$, may be greater than the first cross-section height, $h_1$. The reservoir may thereafter gradually increase in cross-section height, for example, the more distant it is from the fluidic connection 906. In some instances, the cross-section height of the reservoir may increase in accordance with expansion angle, $\beta$, at or near the fluidic connection 906. The height difference, $\Delta h$, and/or expansion angle, $\beta$, can allow the tongue (portion of the aqueous liquid 912 leaving channel 902 at fluidic connection 906 and entering the reservoir 904 before droplet formation) to increase in depth and facilitate decrease in curvature of the intermediately formed droplet. For example, droplet size may decrease with increasing height difference and/or increasing expansion angle.

While FIGS. 9A and 9B illustrate the height difference, $\Delta h$, being abrupt at the fluidic connection 906, the height difference may increase gradually (e.g., from about 0 μm to a maximum height difference). In some instances, the height difference may decrease gradually (e.g., taper) from a maximum height difference. In some instances, the height difference may variably increase and/or decrease linearly or non-linearly. While FIGS. 9A and 9B illustrate the expanding reservoir cross-section height as linear (e.g., constant expansion angle, $\beta$), the cross-section height may expand non-linearly. For example, the reservoir may be defined at least partially by a dome-like (e.g., hemispherical) shape having variable expansion angles. The cross-section height may expand in any shape.

Example 10

Figure 10A:
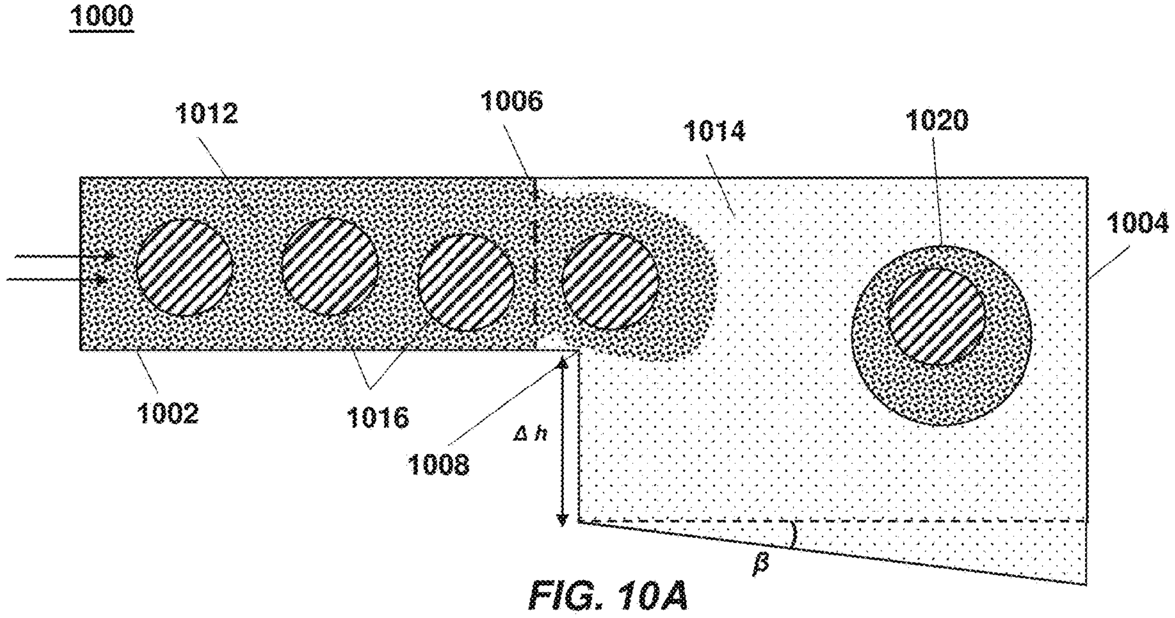
FIGS. 10A-10B show a cross-section view and a top view, respectively, of another example of a microfluidic device with a geometric feature for droplet formation.
Figure 10B:
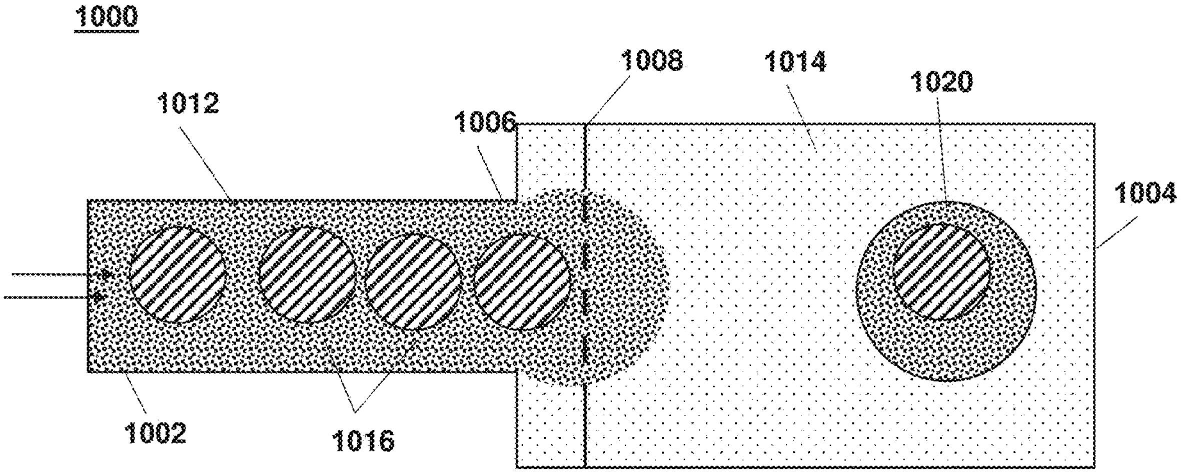

FIGS. 10A and 10B show a cross-section view and a top view, respectively, of another example of a microfluidic device with a geometric feature for droplet formation. A device 1000 can include a channel 1002 communicating at a fluidic connection 1006 (or intersection) with a reservoir 1004. In some instances, the device 1000 and one or more of its components can correspond to the device 900 and one or more of its components and/or correspond to the device 800 and one or more of its components.

An aqueous liquid 1012 comprising a plurality of particles 1016 may be transported along the channel 1002 into the fluidic connection 1006 to meet a second liquid 1014 (e.g., oil, etc.) that is immiscible with the aqueous liquid 1012 in the reservoir 1004 to create droplets 1020 of the aqueous liquid 1012 flowing into the reservoir 1004. At the fluidic connection 1006 where the aqueous liquid 1012 and the second liquid 1014 meet, droplets can form based on factors such as the hydrodynamic forces at the fluidic connection 1006, relative flow rates of the two liquids 1012, 1014, liquid properties, and certain geometric parameters (e.g., $\Delta h$, etc.) of the device 1000. A plurality of droplets can be collected in the reservoir 1004 by continuously injecting the aqueous liquid 1012 from the channel 1002 at the fluidic connection 1006.

A discrete droplet generated may comprise one or more particles of the plurality of particles 1016. As described elsewhere herein, a particle may be any particle, such as a bead, cell bead, gel bead, biological particle, macromolecular constituents of biological particle, or other particles. Alternatively, a discrete droplet generated may not include any particles.

In some instances, the second liquid 1014 may not be subjected to and/or directed to any flow in or out of the reservoir 1004. For example, the second liquid 1014 may be substantially stationary in the reservoir 1004. In some instances, the second liquid 1014 may be subjected to flow within the reservoir 1004, but not in or out of the reservoir 1004, such as via application of pressure to the reservoir 1004 and/or as affected by the incoming flow of the aqueous liquid 1012 at the fluidic connection 1006. Alternatively, the second liquid 1014 may be subjected and/or directed to flow in or out of the reservoir 1004. For example, the reservoir 1004 can be a channel directing the second liquid 1014 from upstream to downstream, transporting the generated droplets. Alternatively or in addition, the second liquid 1014 in reservoir 1004 may be used to sweep formed droplets away from the path of the nascent droplets.

While FIGS. 10A and 10B illustrate one ledge (e.g., step) in the reservoir 1004, as can be appreciated, there may be a plurality of ledges in the reservoir 1004, for example, each having a different cross-section height. For example, where there is a plurality of ledges, the respective cross-section height can increase with each consecutive ledge. Alternatively, the respective cross-section height can decrease and/or increase in other patterns or profiles (e.g., increase then decrease then increase again, increase then increase then increase, etc.).

While FIGS. 10A and 10B illustrate the height difference, $\Delta h$, being abrupt at the ledge 1008, the height difference may increase gradually (e.g., from about 0 μm to a maximum height difference). In some instances, the height difference may decrease gradually (e.g., taper) from a maximum height difference. In some instances, the height difference may variably increase and/or decrease linearly or non-linearly. While FIGS. 10A and 10B illustrate the expanding reservoir cross-section height as linear (e.g., constant expansion angle), the cross-section height may expand non-linearly. For example, the reservoir may be defined at least partially by a dome-like (e.g., hemispherical) shape having variable expansion angles. The cross-section height may expand in any shape.

Example 11

Figure 11A:
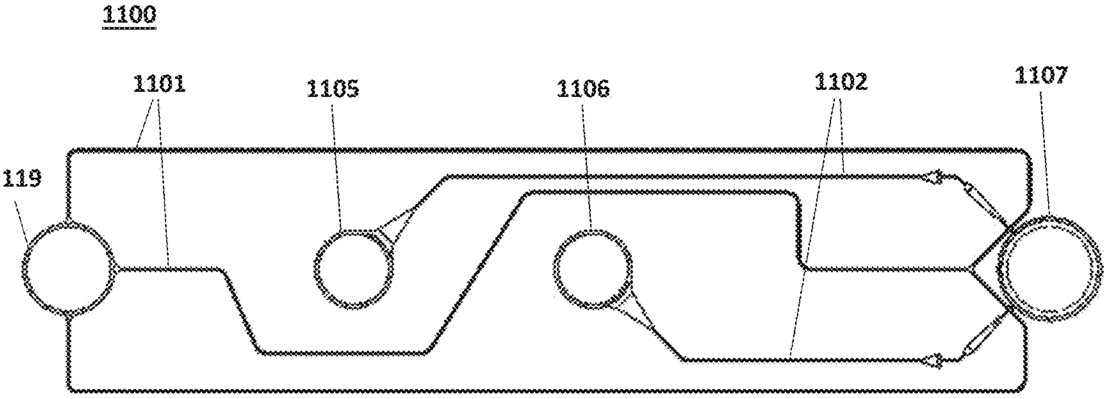
FIGS. 11A-11B are views of another device of the invention.
Figure 11B:
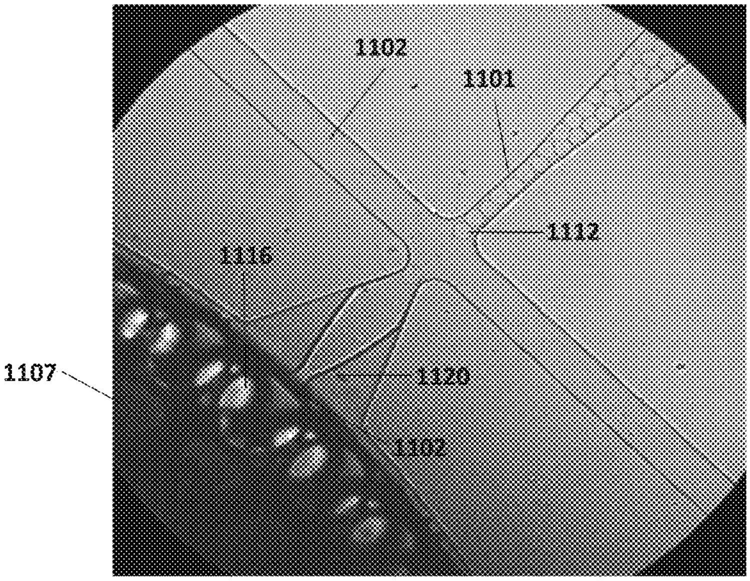

An example of a device according to the invention is shown in FIGS. 11A-11B. The device 1100 includes four fluid reservoirs, 1104, 1105, 1106, and 1107, respectively. Reservoir 1104 houses one liquid; reservoirs 1105 and 1106 house another liquid, and reservoir 1107 houses continuous phase in the step region 1108. This device 1100 include two first channels 1102 connected to reservoir 1105 and reservoir 1106 and connected to a shelf region 1120 adjacent a step region 1108. As shown, multiple channels 1101 from reservoir 1104 deliver additional liquid to the first channels 1102. The liquids from reservoir 1104 and reservoir 1105 or 1106 combine in the first channel 1102 forming the first liquid that is dispersed into the continuous phase as droplets. In certain embodiments, the liquid in reservoir 1105 and/or reservoir 1106 includes a particle, such as a gel bead. FIG. 11B shows a view of the first channel 1102 containing gel beads intersected by a second channel 1101 adjacent to a shelf region 1120 leading to a step region 1108, which contains multiple droplets 1116.

Example 12

Figure 12A:
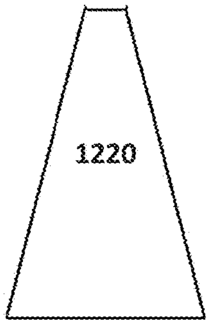
FIGS. 12A-12E are views of droplet formation regions including shelf regions.
Figure 12B:
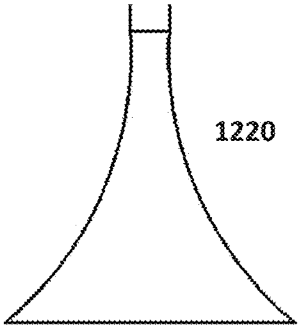
Figure 12C:
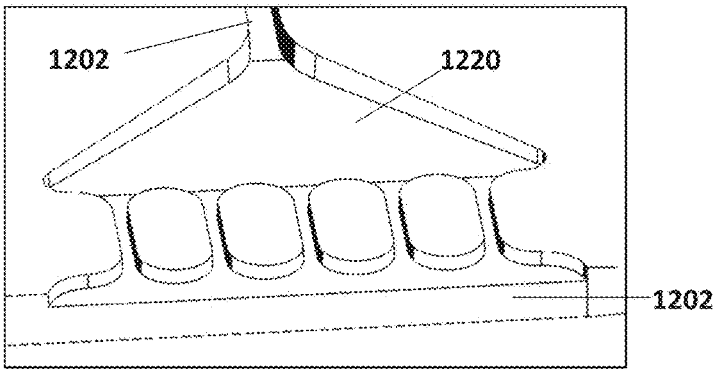
Figure 12D:
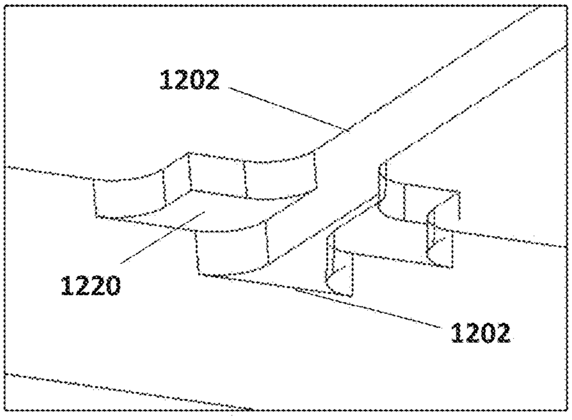
Figure 12E:
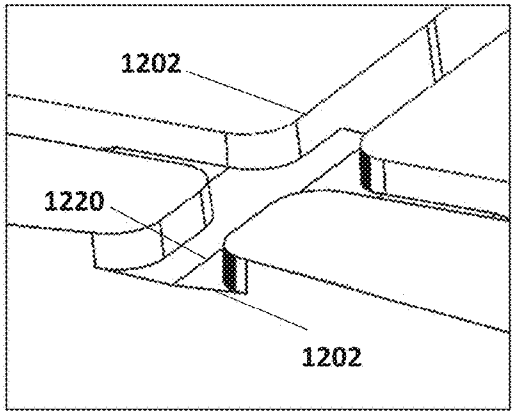
Figure 13A:
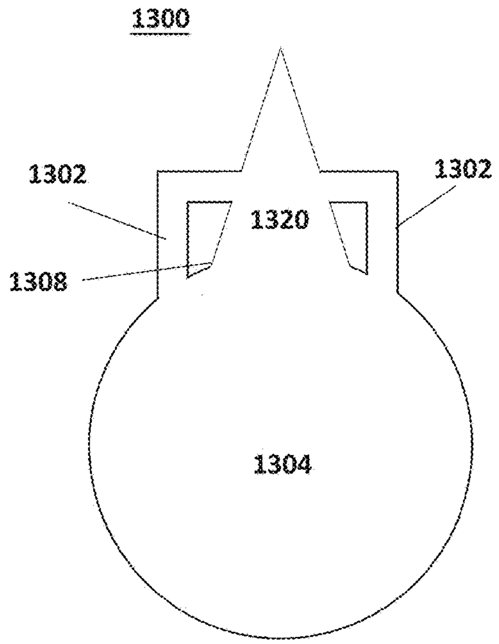
FIGS. 13A-13D are views of droplet formation regions including shelf regions including additional channels to deliver continuous phase.
Figure 13B:
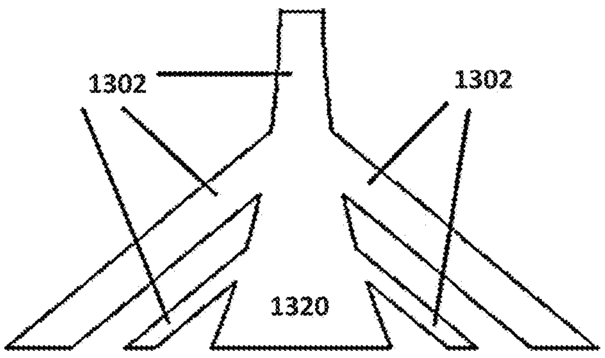
Figure 13C:
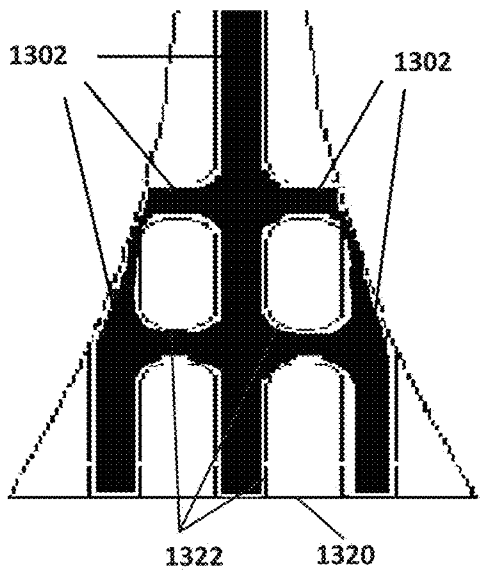
Figure 13D:
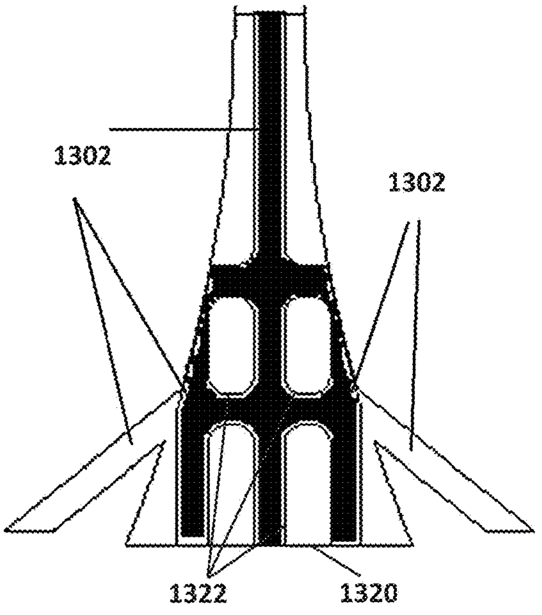

Variations on shelf regions 1220 are shown in FIGS. 12A-12E. As shown in FIGS. 12A-12B, the width of the shelf region 1220 can increase from the distal end of a first channel 1202 towards the step region 1208, linearly as in 12A or non-linearly as in 12B. As shown in FIG. 12C, multiple first channels 1202 can branch from a single feed channel 1202 and introduce fluid into interconnected shelf regions 1220. As shown in FIG. 12D, the depth of the first channel 1202 may be greater than the depth of the shelf region 1220 and cut a path through the shelf region 1220. As shown in FIG. 12E, the first channel 1202 and shelf region 1220 may contain a grooved bottom surface. This device 1200 also includes a second channel 1202 that intersects the first channel 1202 proximal to its distal end.

Example 13

Continuous phase delivery channels 1302, shown in FIGS. 13A-13D, are variations on shelf regions 1320 including channels 1302 for delivery (passive or active) of continuous phase behind a nascent droplet. In one example in FIG. 13A, the device 1300 includes two channels 1302 that connect the reservoir 1104 of the step region 1308 to either side of the shelf region 1320. In another example in FIG. 13B, four channels 1302 provide continuous phase to the shelf region 1320. These channels 1302 can be connected to the reservoir 1304 of the step region 1308 or to a separate source of continuous phase. In a further example in FIG. 13C, the shelf region 1320 includes one or more channels 1302 (white) below the depth of the first channel 1302 (black) that connect to the reservoir 1304 of the step region 1308. The shelf region 1320 contains islands 1322 in black. In another example FIG. 13D, the shelf region 1320 of FIG. 13C includes two additional channels 1302 for delivery of continuous phase on either side of the shelf region 1320.

Example 14

Figure 14:
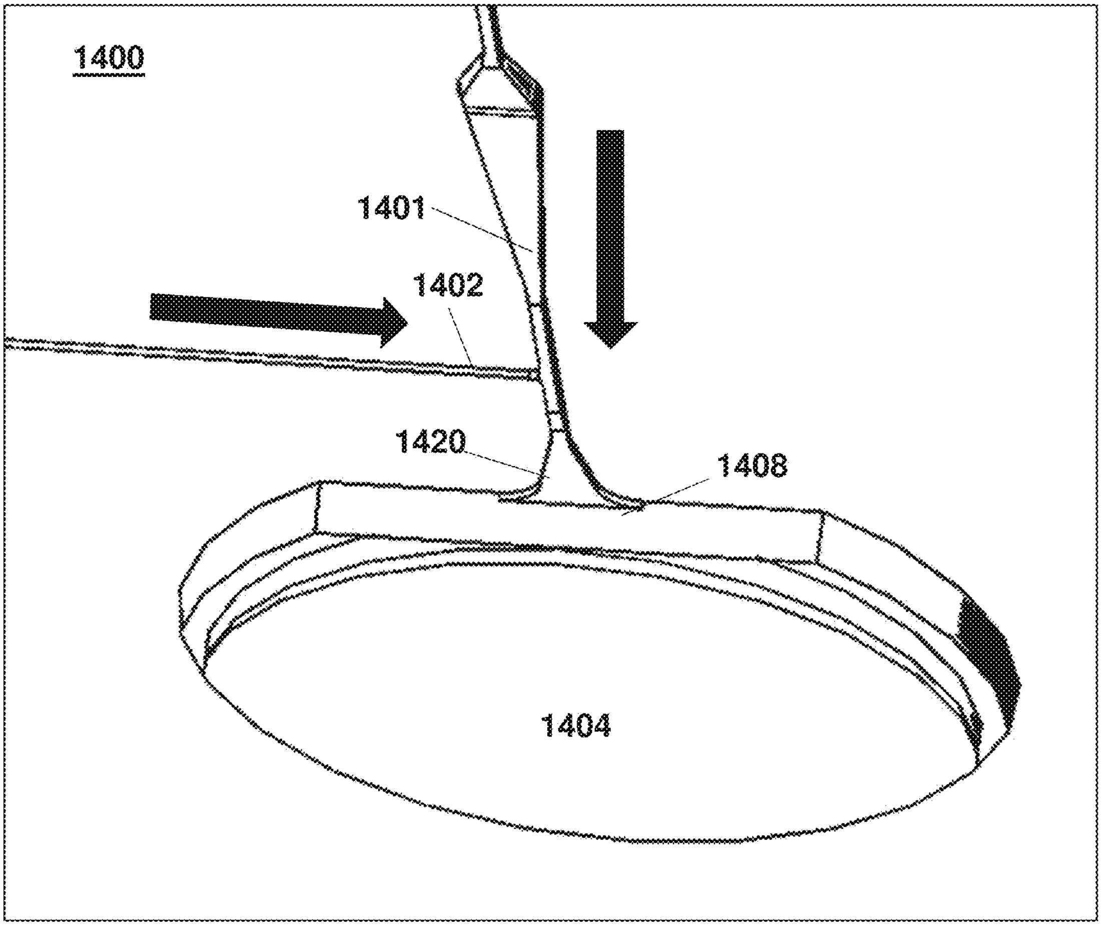
FIG. 14 is another device according to the invention having a pair of intersecting channels that lead to a droplet formation region and collection reservoir.

An embodiment of a device according to the invention is shown in FIG. 14. This device 1400 includes two channels 1401, 1402 that intersect upstream of a droplet formation region. The droplet formation region includes both a shelf region 1420 and a step region 1408 disposed between the distal end of the first channel 1401 and the step region 1408 that lead to a collection reservoir 1404. The black and white arrows show the flow of liquids through each of first channel 1401 and second channel 1402, respectively. In certain embodiments, the liquid flowing through the first channel 1401 or second channel 1402 includes a particle, such as a gel bead. As shown in the FIG. 14, the width of the shelf region 1420 can increase from the distal end of a first channel 1401 towards the step region 1408; in particular, the width of the shelf region 1420 in FIG. 14 increases non-linearly. In this embodiment, the shelf region extends from the edge of a reservoir to allow droplet formation away from the edge. Such a geometry allows droplets to move away from the droplet formation region due to differential density between the continuous and dispersed phase.

Example 15

Figure 15A:
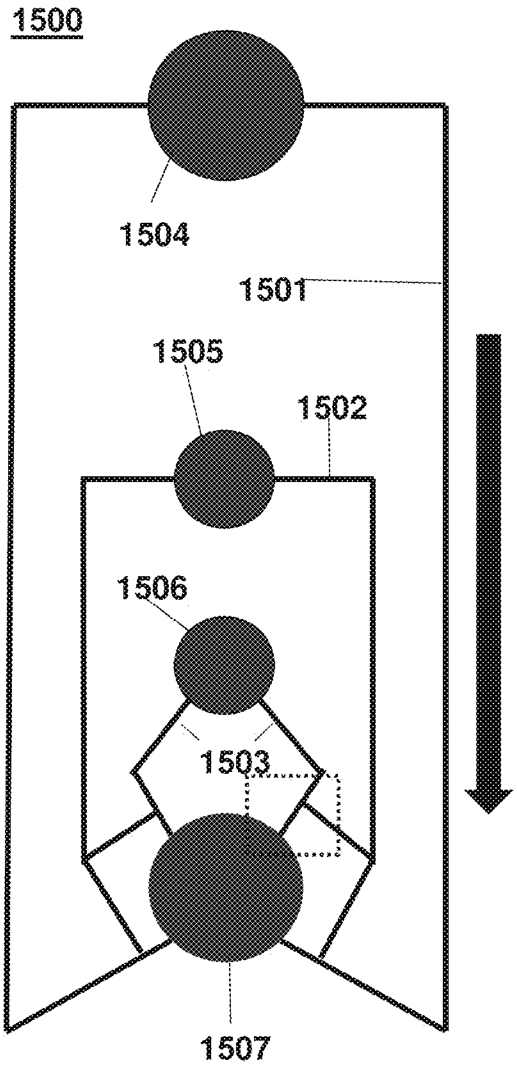
FIGS. 15A-15B are views of a device of the invention.
Figure 15B:
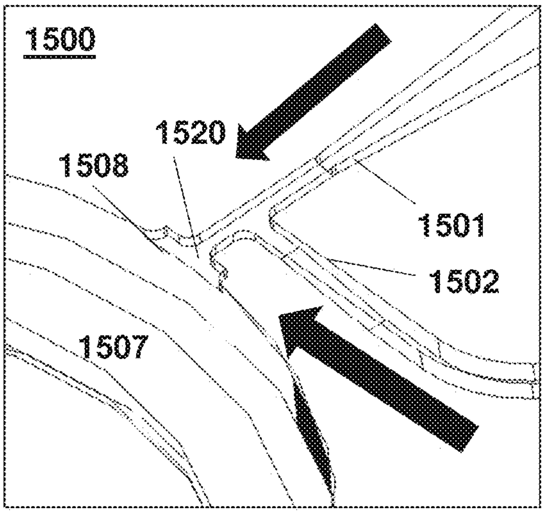

An embodiment of a device according to the invention for multiplexed droplet formation is shown in FIGS. 15A-15B. This device 1500 includes four fluid reservoirs, 1504, 1505, 1506, and 1507, and the overall direction of flow within the device 1500 is shown by the black arrow in FIG. 15A. Reservoir 1504 and reservoir 1506 house one liquid; reservoir 1505 houses another liquid, and reservoir 1507 houses continuous phase and is a collection reservoir. Fluid channels 1501, 1503 directly connect reservoir 1504 and reservoir 1506, respectively, to reservoir 1507; thus, there are four droplet formation region in this device 1500. Each droplet formation region has a shelf region 1520 and a step region 1508. This device 1500 further has two channels 1502 from the reservoir 1505 where each of these channels splits into two separate channels at their distal ends. Each of the branches of the split channel intersects the first channels 1501 or 1503 upstream of their connection to the collection reservoir 1507. As shown in the zoomed in view of the dotted line box in FIG. 15B, second channel 1502, with its flow indicated by the white arrow, has its distal end intersecting a channel 1503 from reservoir 1505, with the flow of the channel indicated by the black arrow, upstream of the droplet formation region. The liquid from reservoir 1504 and reservoir 1506, separately, are introduced into channels 1501, 1503 and flow towards the collection reservoir 1507. The liquid from the second reservoir 1505 combines with the fluid from reservoir 1504 or reservoir 1506, and the combined fluid is dispersed into the droplet formation region and to the continuous phase. In certain embodiments, the liquid flowing through the first channel 1501 or 1503 or second channel 1502 includes a particle, such as a gel bead.

Example 16

Figure 16A:
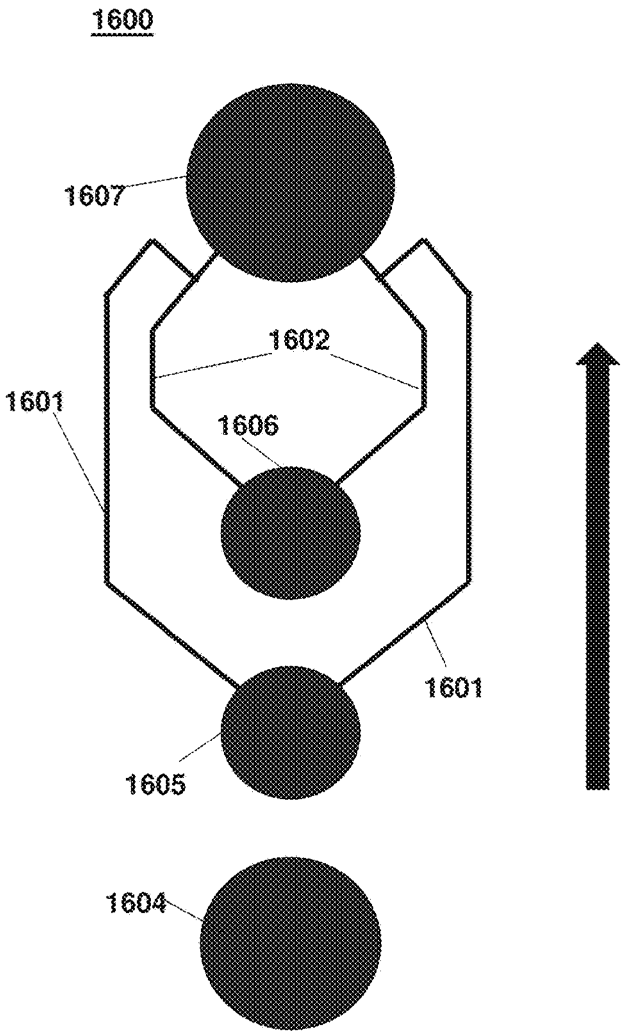
FIGS. 16A-16B are views of devices according to the invention.
Figure 16B:
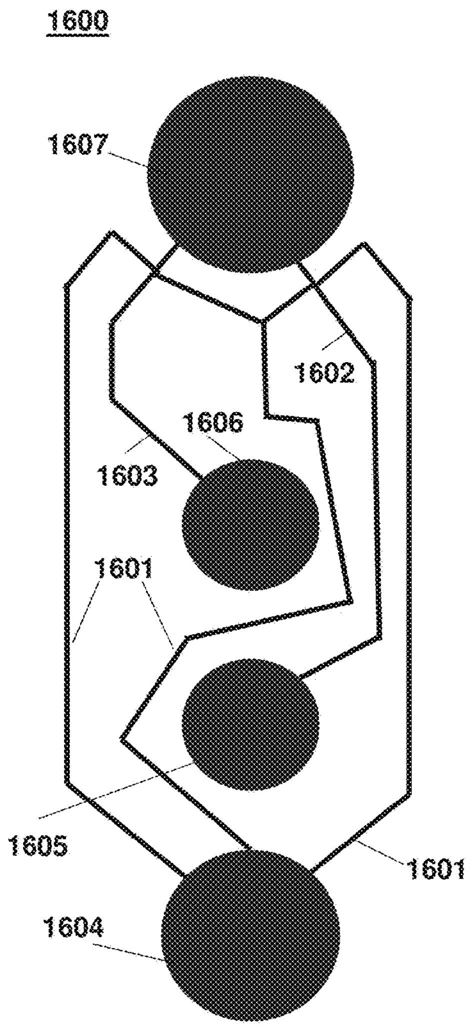

Examples of devices according to the invention that include two droplet formation regions are shown in FIGS. 16A-16B. The device 1600 of FIG. 16A includes three reservoirs, 1605, 1606, and 1607, and the device 1600 of FIG. 16B includes four reservoirs, 1604, 1605, 1606, and 1607. For the device 1600 of FIG. 16A, reservoir 1605 houses a portion of the first fluid, reservoir 1606 houses a different portion of the first fluid, and reservoir 1607 houses continuous phase and is a collection reservoir. In the device 1600 of FIG. 16B, reservoir 1604 houses a portion of the first fluid, reservoir 1605 and reservoir 1606 house different portions of the first fluid, and reservoir 1607 houses continuous phase and is a collection reservoir. In both devices 1600, there are two droplet formation regions. For the device 1600 of FIG. 16A, the connections to the collection reservoir 1607 are from the reservoir 1606, and the distal ends of the channels 1601 from reservoir 1605 intersect the channels 1602 from reservoir 1606 upstream of the droplet formation region. The liquids from reservoir 1605 and reservoir 1606 combine in the channels 1602 from reservoir 1606, forming the first liquid that is dispersed into the continuous phase in the collection reservoir 1607 as droplets. In certain embodiments, the liquid in reservoir 1605 and/or reservoir 1606 includes a particle, such as a gel bead.

In the device 1600 of FIG. 16B, each of reservoir 1605 and reservoir 1606 are connected to the collection reservoir 1607. Reservoir 1604 has three channels 1601, two of which have distal ends that intersect each of the channels 1602, 1603 from reservoir 1604 and reservoir 1606, respectively, upstream of the droplet formation region. The third channel 1601 from reservoir 1604 splits into two separate distal ends, with one end intersecting the channel 1602 from reservoir 1605 and the other distal end intersecting the channel 1603 from reservoir 1606, both upstream of droplet formation regions. The liquid from reservoir 1604 combines with the liquids from reservoir 1605 and reservoir 1606 in the channels 1602 from reservoir 1605 and reservoir 1606, forming the first liquid that is dispersed into the continuous phase in the collection reservoir 1607 as droplets. In certain embodiments, the liquid in reservoir 1604, reservoir 1605, and/or reservoir 1606 includes a particle, such as a gel bead.

Example 17

Figure 17:
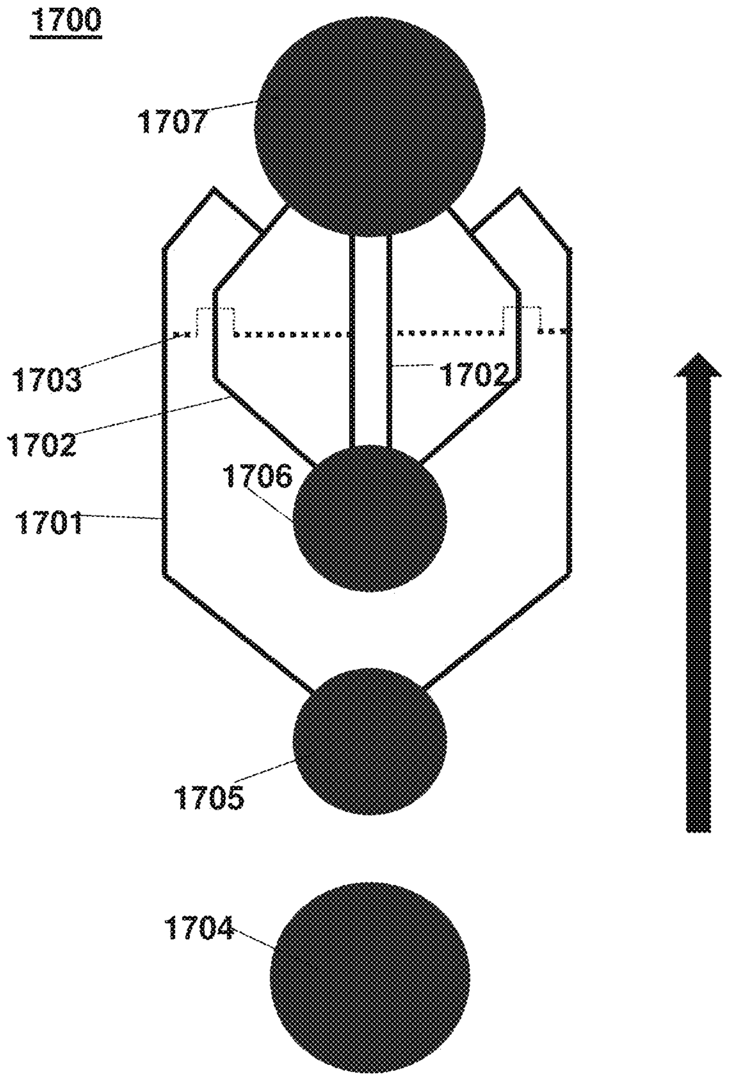
FIG. 17 is a view of a device according to the invention with four reservoirs.

An embodiment of a device according to the invention that has four droplet formation regions is shown in FIG. 17. The device 1700 of FIG. 17 includes four reservoirs, 1704, 1705, 1706, and 1707; the reservoir labeled 1704 is unused in this embodiment. In the device 1700 of FIG. 17, reservoir 1705 houses a portion of the first fluid, reservoir 1706 houses a different portion of the first fluid, and reservoir 1707 houses continuous phase and is a collection reservoir. Reservoir 1706 has four channels 1702 that connect to the collection reservoir 1707 at four droplet formation regions. The channels 1702 from originating at reservoir 1706 include two outer channels 1702 and two inner channels 1702. Reservoir 1705 has two channels 1701 that intersect the two outer channels 1702 from reservoir 1706 upstream of the droplet formation regions. Channels 1701 and the inner channels 1702 are connected by two channels 1703 that traverse, but do not intersect, the fluid paths of the two outer channels 1702. These connecting channels 1703 from channels 1701 pass over the outer channels 1702 and intersect the inner channels 1702 upstream of the droplet formation regions. The liquids from reservoir 1705 and reservoir 1706 combine in the channels 1702, forming the first liquid that is dispersed into the continuous phase in the collection reservoir 1707 as droplets. In certain embodiments, the liquid in reservoir 1705 and/or reservoir 1706 includes a particle, such as a gel bead.

Example 18

Figure 18A:
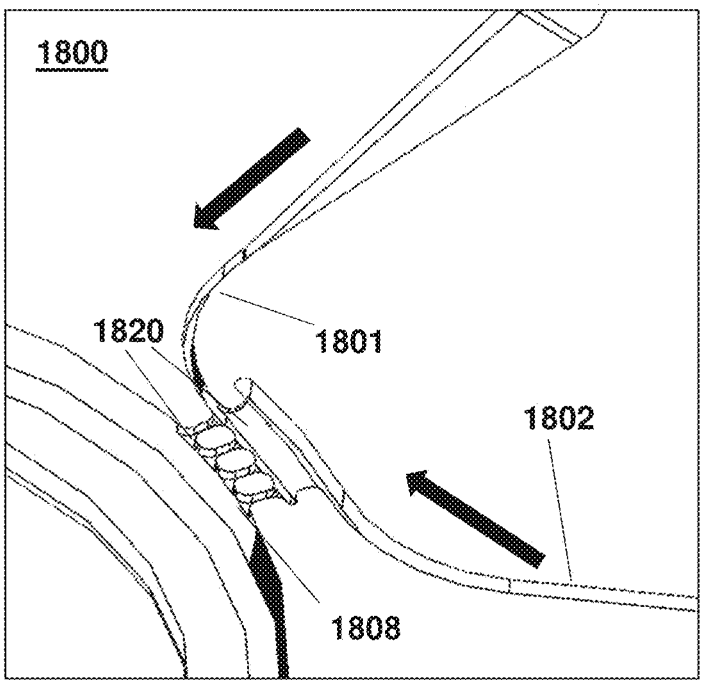
FIGS. 18A-18B are views of an embodiment according to the invention.
Figure 18B:
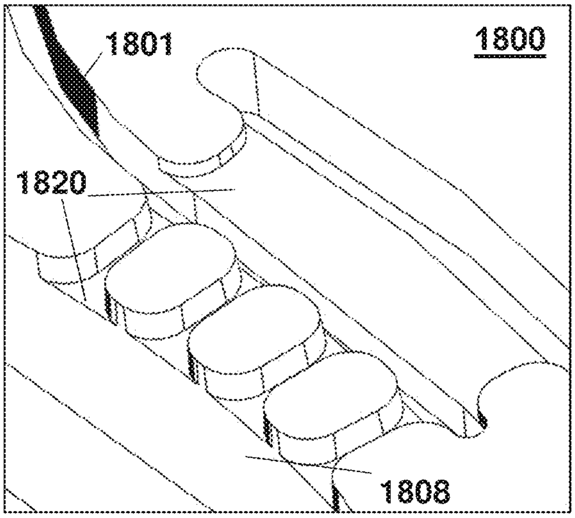

An embodiment of a device according to the invention that has a plurality of droplet formation regions is shown in FIGS. 18A-18B (FIG. 18B is a zoomed in view of FIG. 18A), with the droplet formation region including a shelf region 1820 and a step region 1808. This device 1800 includes two channels 1801, 1802 that meet at the shelf region 1820. As shown, after the two channels 1801, 1802 meet at the shelf region 1820, the combination of liquids is divided, in this example, by four shelf regions. In certain embodiments, the liquid with flow indicated by the black arrow includes a particle, such as a gel bead, and the liquid flow from the other channel, indicated by the white arrow, can move the particles into the shelf regions such that each particle can be introduced into a droplet.

Example 19

Figure 19A:
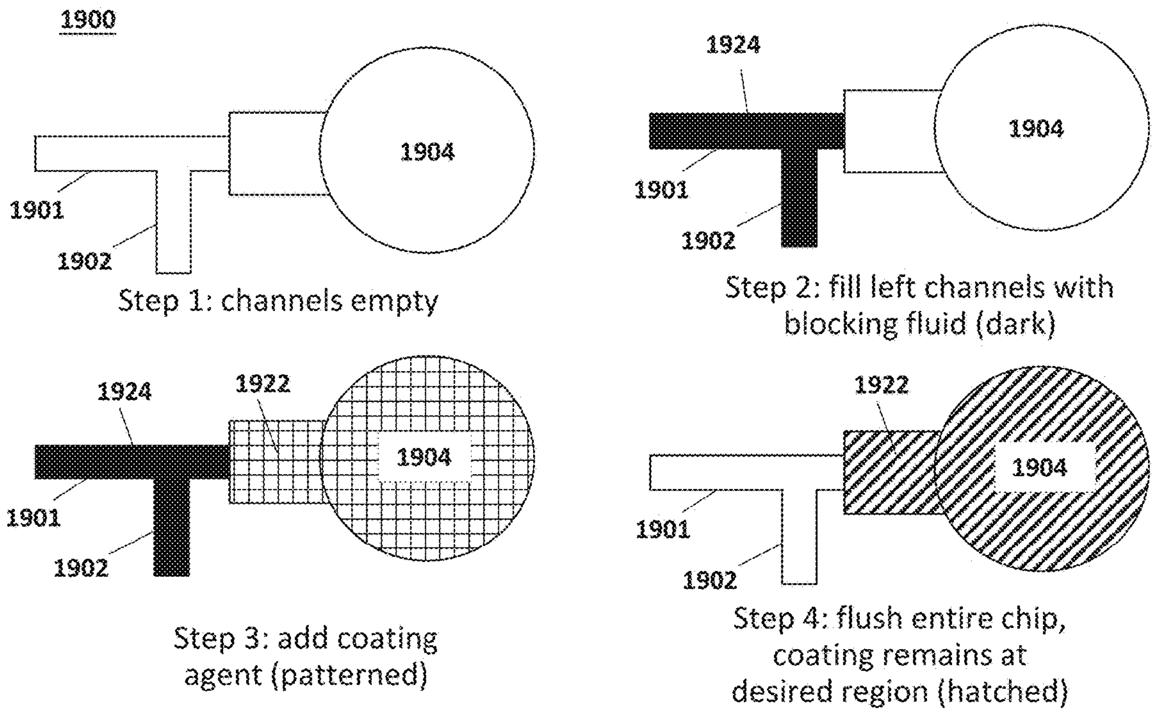
FIGS. 19A-19B are schematic representations of a method according to the invention for applying a differential coating to a surface of a device of the invention.
Figure 19B:
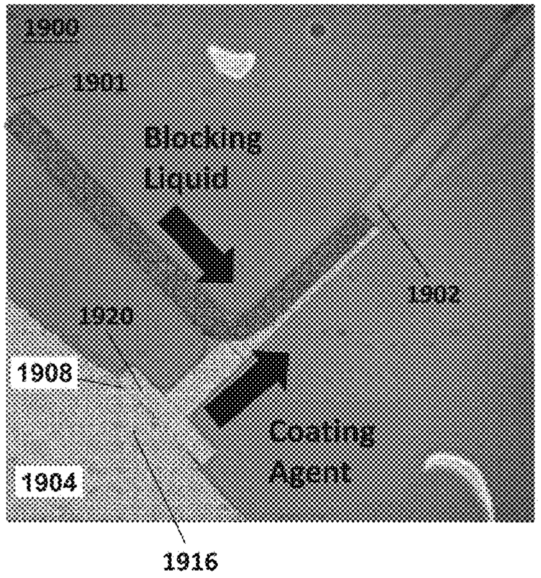

An embodiment of a method of modifying the surface of a device using a coating agent is shown in FIGS. 19A-19B. In this example, the surface of the droplet formation region of the device 1900, e.g., the rectangular area connected to the circular shaped collection reservoir 1904, is coated with a coating agent 1922 to modify its surface properties. To localize the coating agent to only the regions of interest, the first channel 1901 and second channel 1902 of the device 1900 are filled with a blocking liquid 1924 (Step 2 of FIG. 19A) such that the coating agent 1922 cannot contact the channels 1901, 1902. The device 1900 is then filled with the coating agent 1922 to fill the droplet formation region and the collection reservoir 1904 (Step 3 of FIG. 19A). After the coating process is complete, the device 1900 is flushed (Step 4 of FIG. 19A) to remove both the blocking liquid 1924 from the channels and the coating agent 1922 from the droplet formation region and the collection reservoir 1904. This leaves behind a layer of the coating agent 1922 only in the regions where it is desired. This is further exemplified in the micrograph of FIG. 19B, the blocking liquid (dark gray) fills the first channel 1901 and second channel 1902, preventing ingress of the coating agent 1922 (white) into either the first channel 1901 or the second channel 1902 while completely coating the droplet formation region and the collection reservoir 1904. In this example, the first channel 1901 is also acting as a feed channel for the blocking liquid 1924, shown by the arrow for flow direction in FIG. 19B.

Example 20

Figure 20A:
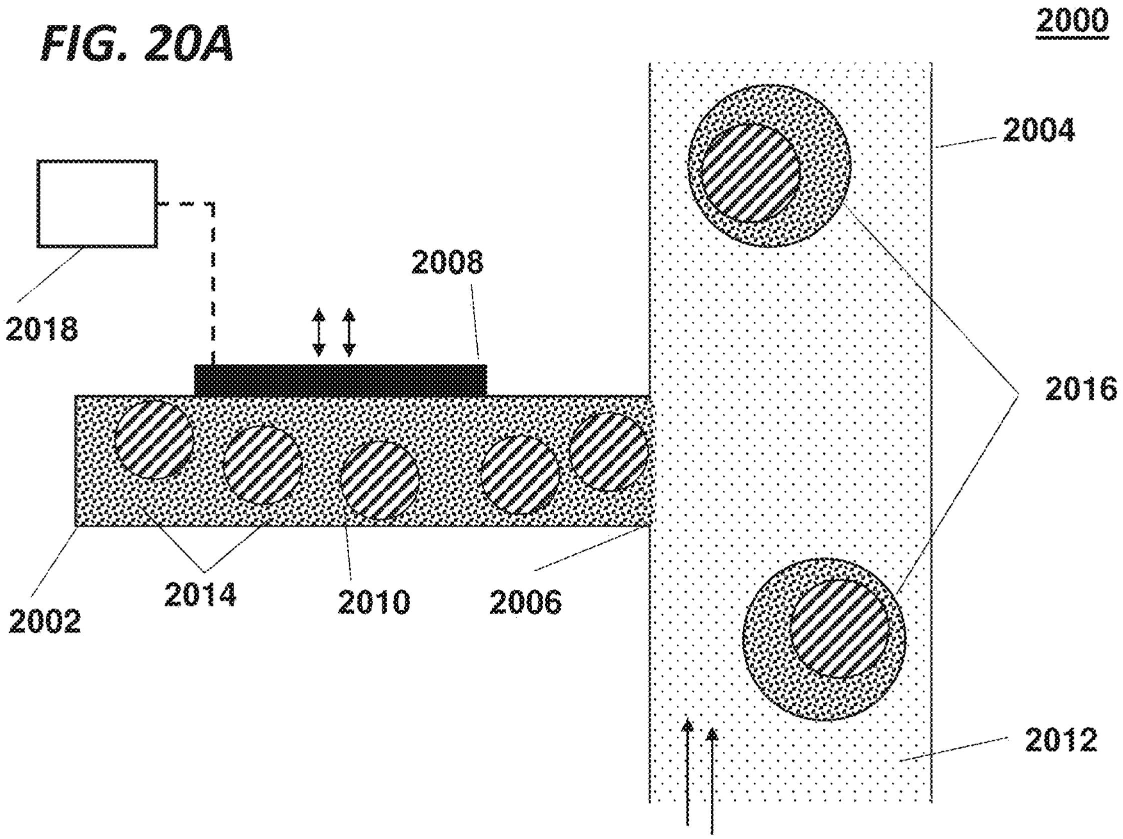
FIGS. 20A-20B are cross-sectional views of a microfluidic device including a piezoelectric element for droplet formation.
Figure 20B:
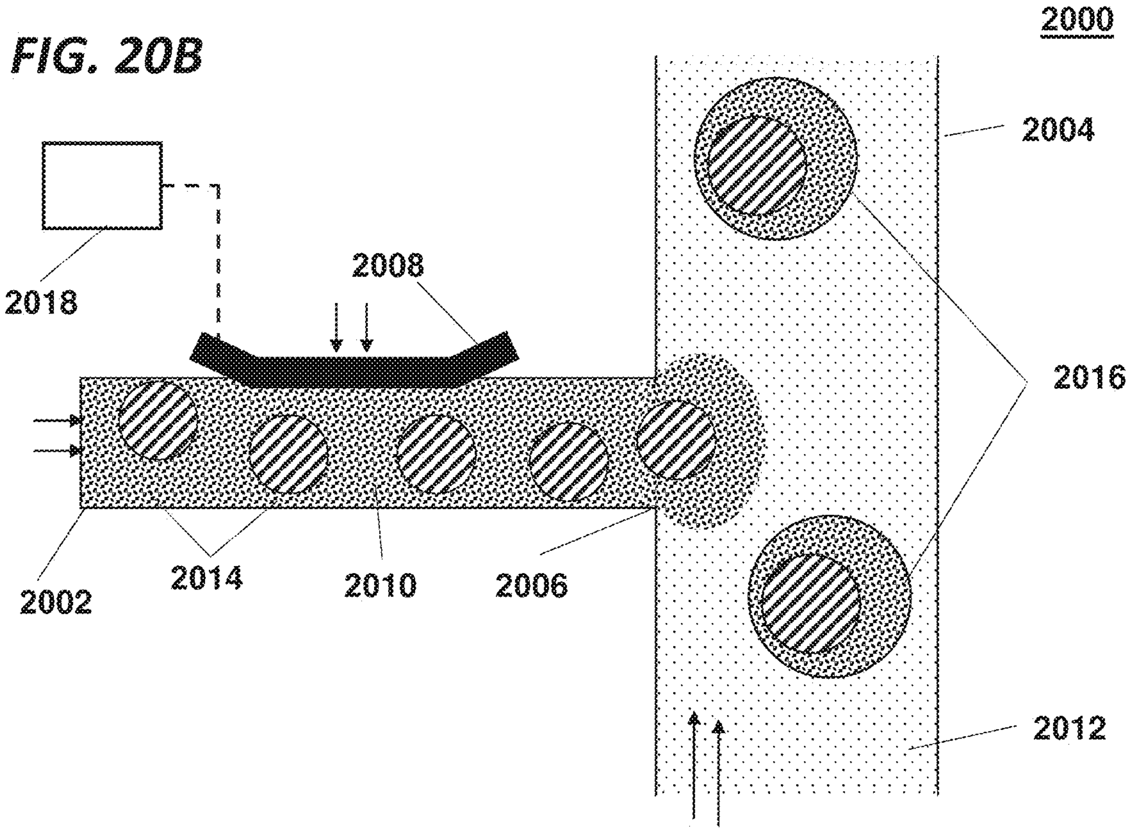

FIGS. 20A-20B show an embodiment of a device according to the invention that includes a piezoelectric element for droplet formation. A device 2000 includes a first channel 2002, a second channel 2004, and a piezoelectric element 2008. The first channel 2002 and the second channel 2004 are in fluid communication at a channel junction 2006. In some instances, the first channel 2002 and components thereof can correspond to the channel 102 in the device 100 in FIG. 1 and components thereof.

In this example, the first channel 2002 carries a first fluid 2010 (e.g., aqueous) and the second channel 2004 can carries second fluid 2012 (e.g., oil) that is immiscible with the first fluid 2010. The two fluids 2010, 2012 come in contact with one another at the junction 2006. In some instances, the first fluid 2010 in the first channel 2002 includes suspended particles 2014. The particles 2014 may be beads, biological particles, cells, cell beads, or any combination thereof (e.g., a combination of beads and cells or a combination of beads and cell beads, etc.). The piezoelectric element 2008 is operatively coupled to the first channel 2002 such that at least part of the first channel 2002 is capable of moving or deforming in response to movement of the piezoelectric element 2008. In some instances, the piezoelectric element 2008 is part of the first channel 2002, such as one or more walls of the first channel 2002. The piezoelectric element 2008 can be a piezoelectric plate. The piezoelectric element 2008 is responsive to electrical signals received from the controller 2018 and moves between at least a first state (as in FIG. 20A) and a second state (as in FIG. 20B). In the first state, the first fluid 2010 and the second fluid 2012 remain separated at or near the junction 2006 via an immiscible barrier. In the second state, the first fluid 2010 is directed towards the junction 2006 into the second fluid 2012 to create droplets 2016.

In some instances, the piezoelectric element 2008 is in the first state (shown in FIG. 20A) when no electrical charge, e.g., electric voltage, is applied. The first state can be an equilibrium state. When an electrical charge is applied to the piezoelectric element 2008, the piezoelectric element 2008 may bend backwards (not shown in FIG. 20A or 20B), pulling a part of the first channel 2002 outwards and drawing in more of the first fluid 2010 into the first channel 2002 such as from a reservoir of the first fluid 2010. When the electrical charge is altered, the piezoelectric element may bend in the other direction (e.g., inwards towards the contents of the channel 2002) (shown in FIG. 20B) pushing a part of the first channel 2002 inwards and propelling (e.g., at least partly via displacement) a volume of the first fluid 2010 into the second channel 2004, thereby generating a droplet of the first fluid 2010 in the second fluid 2012. After the droplet is propelled, the piezoelectric element 2008 may return to the first state (shown in FIG. 20A). The cycle can be repeated to generate more droplets. In some instances, each cycle may generate a plurality of droplets (e.g., a volume of the first fluid 2010 propelled breaks off as it enters the second fluid 2012 to form a plurality of discrete droplets). A plurality of droplets 2016 can be collected in the second channel 2004 for continued transportation to a different location (e.g., reservoir), direct harvesting, and/or storage.

Example 21

Figure 21:
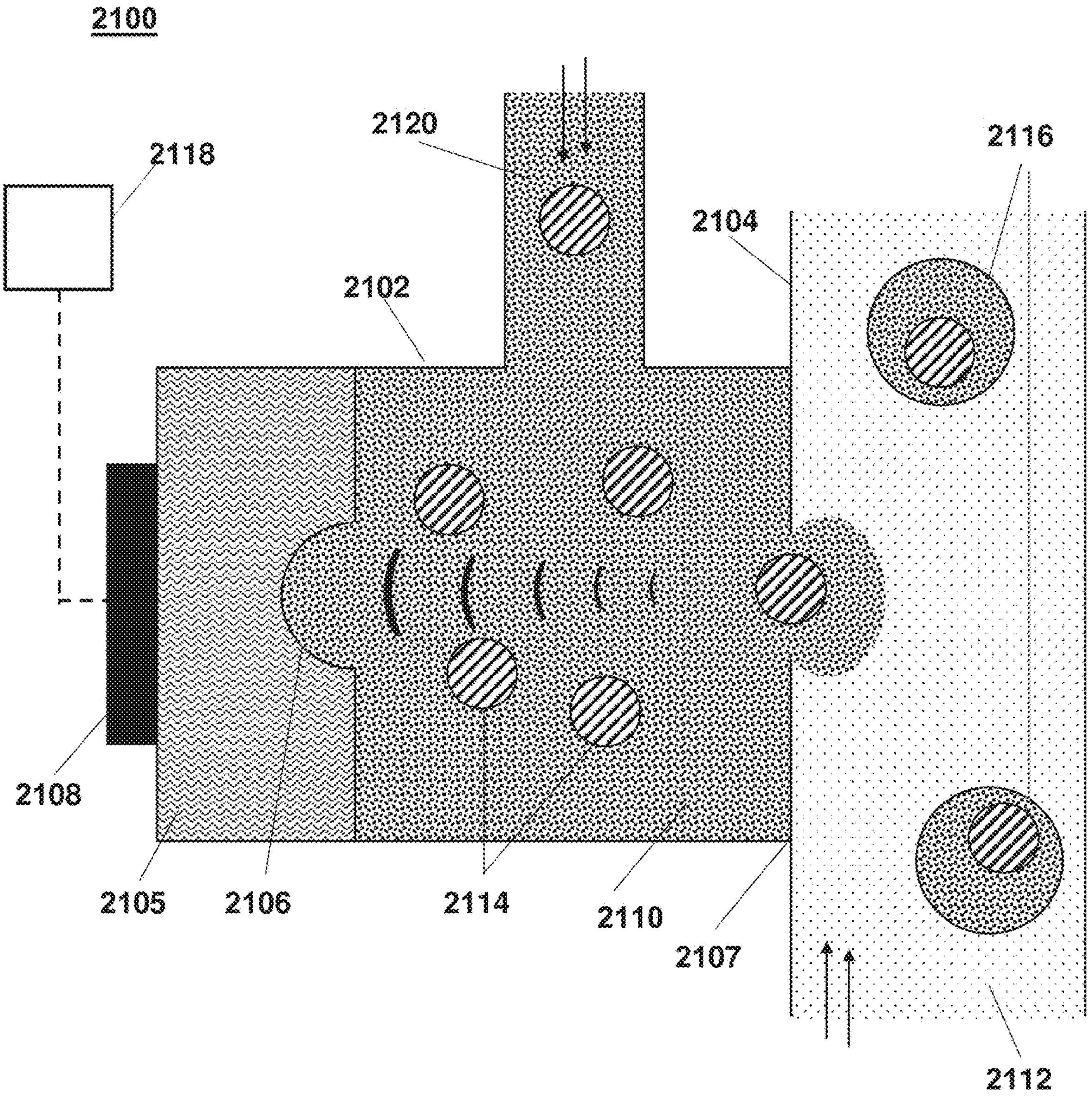
FIG. 21 is a scheme of a microfluidic device including a piezoelectric element for droplet formation.

FIG. 21 shows an embodiment of a device according to the invention that uses a piezoelectric, e.g., a piezoacoustic element, for droplet formation. A device 2100 includes a first channel 2102, a second channel 2104, a piezoelectric element 2108, and a buffer substrate 2105. The first channel 2102 and the second channel 2104 communicate at a channel junction 2107. In some instances, the first channel 2102 and components thereof can correspond to the channel 102 in the channel structure 100 in FIG. 1 and components thereof.

The first channel 2102 carries a first fluid 2110 (e.g., aqueous), and the second channel 2104 carries a second fluid 2112 (e.g., oil) that is immiscible with the first fluid 2110. In some instances, the first fluid 2110 in the first channel 2102 includes suspended particles 2114. The particles 2114 may be beads, biological particles, cells, cell beads, or any combination thereof (e.g., a combination of beads and cells or a combination of beads and cell beads, etc.). The piezoelectric element 2108 is operatively coupled to a buffer substrate 2105 (e.g., glass). The buffer substrate 2105 includes an acoustic lens 2106. In some instances, the acoustic lens 2106 is a substantially spherical cavity, e.g., a partially spherical cavity, e.g., hemispherical. In other instances, the acoustic lens 2106 is a different shape and/or includes one or more other objects for focusing acoustic waves. The buffer substrate 2105 and/or the acoustic lens 2106 can be in contact with the first fluid 2110 in the first channel 2102. Alternatively, the piezoelectric element 2108 is operatively coupled to a part (e.g., wall) of the first channel 2102 without an intermediary buffer substrate. The piezoelectric element 2108 is in electrical communication with a controller 2118. The piezoelectric element 2108 is responsive to a pulse of electric voltage driven at a particular frequent transmitted by the controller 2118. In some instances, the piezoelectric element 2108 and its properties can correspond to the piezoelectric element 2008 and its properties in FIGS. 20A-20B.

Before electric voltage is applied, the first fluid 2110 and the second fluid 2112 are separated at or near the junction 2107 via an immiscible barrier. When the electric voltage is applied to the piezoelectric element 2108, it generates acoustic waves that propagate in the buffer substrate 2105, from the first end to the second end. The acoustic lens 2106 at the second end of the buffer substrate 2105 focuses the sound waves towards the immiscible interface between the two fluids 2110, 2112. The acoustic lens 2106 may be located such that the immiscible interface is located at the focal plane of the converging beam of the acoustic waves. The pressure of the acoustic waves may cause a volume of the first fluid 2110 to be propelled into the second fluid 2112, thereby generating a droplet of the first fluid 2110 in the second fluid 2112. In some instances, each propelling may generate a plurality of droplets (e.g., a volume of the first fluid 2110 propelled breaks off as it enters the second fluid 2112 to form a plurality of discrete droplets). After ejection of the droplet, the immiscible interface can return to its original state. Subsequent bursts of electric voltage to the piezoelectric element 2108 can be repeated to generate more droplets 2116. A plurality of droplets 2116 can be collected in the second channel 2104 for continued transportation to a different location (e.g., reservoir), direct harvesting, and/or storage.

Example 22

Figure 22:
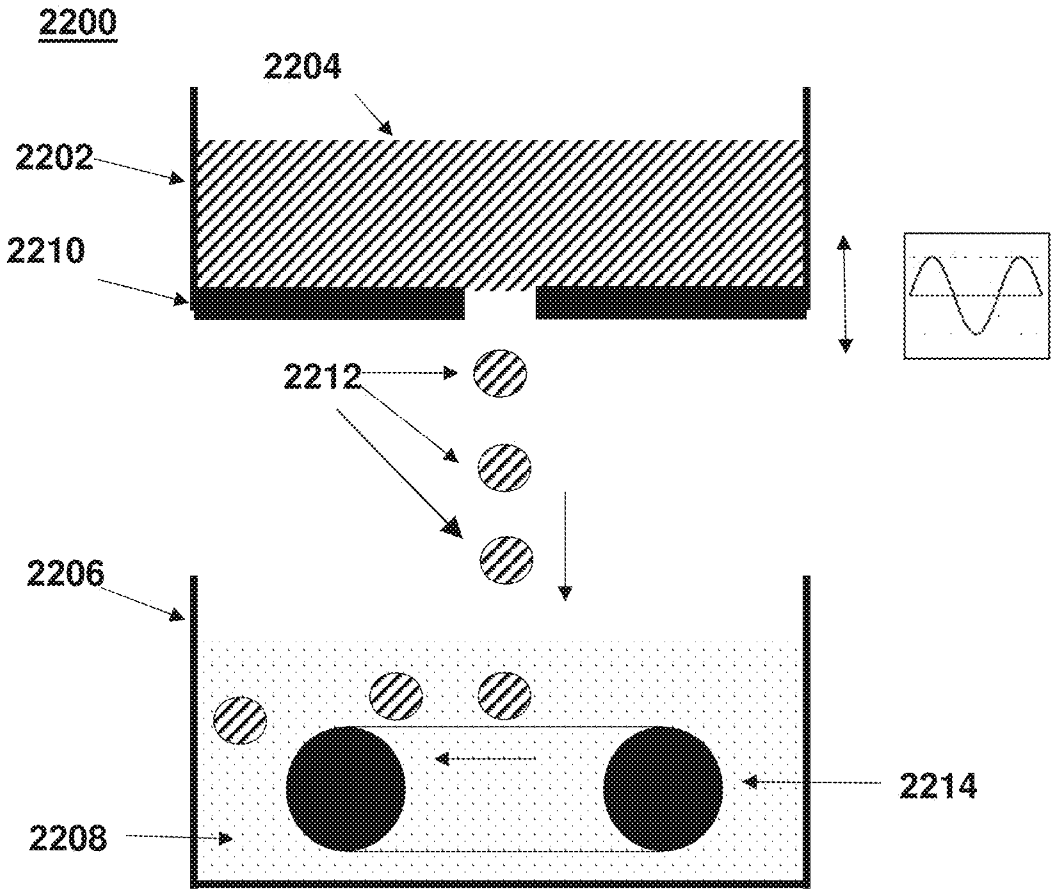
FIG. 22 is a scheme of a microfluidic device including a piezoelectric element for droplet formation. The droplets are collected in a circulating bath after formation.

FIG. 22 shows an embodiment of a device according to the invention that includes a piezoelectric element for droplet formation. The device 2200 includes a reservoir 2202 for holding first fluid 2204 and a collection reservoir 2206 for holding second fluid 2208, such as an oil. In one wall of the reservoir 2202 is a piezoelectric element 2210 operatively coupled to an aperture.

Upon actuation of the piezoelectric element 2210, the first fluid 2204 exits the aperture and forms a droplet 2212 that is collected in collection reservoir 2206. Collection reservoir 2206 includes a mechanism 2214 for circulating second fluid 2208 and moving formed droplets 2212 through the second fluid 2208. The signal applied to the piezoelectric element 2210 may be a sinusoidal signal as indicated in the inset photo.

Example 23

Figure 23:
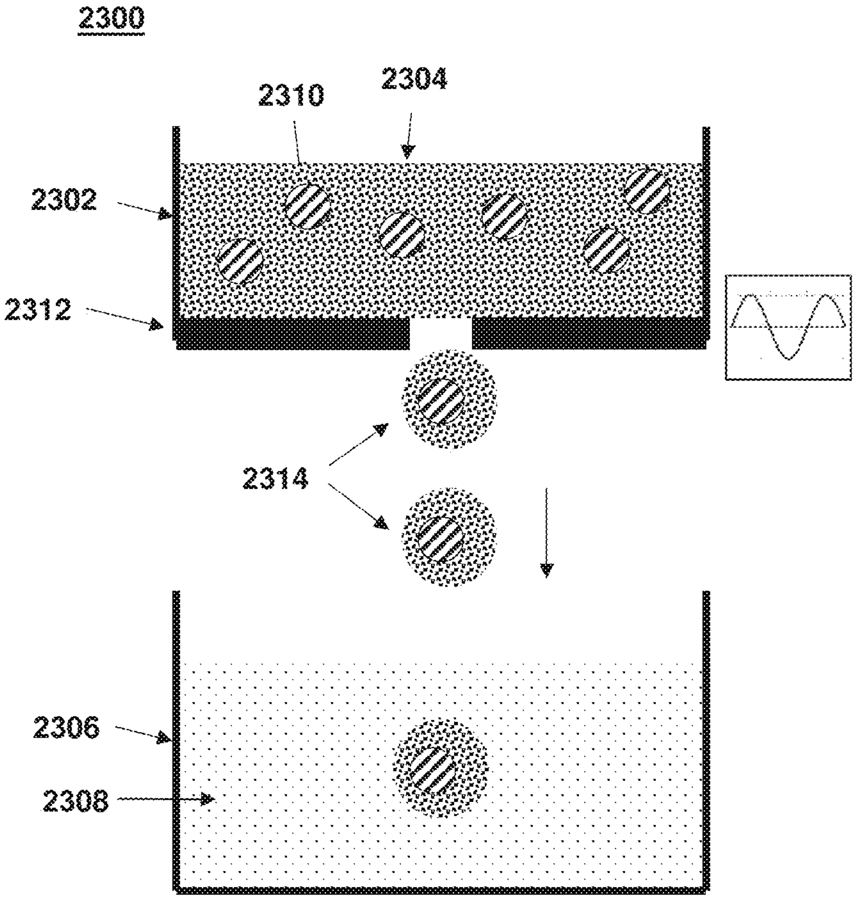
FIG. 23 is a scheme of a microfluidic device including a piezoelectric element for droplet formation including a particle. The droplets contain a particle and are collected in a bath after formation.

FIG. 23 shows an embodiment of a device according to the invention that includes a piezoelectric element for droplet formation. The device 2300 includes a reservoir 2302 for holding first fluid 2304 and a collection reservoir 2306 for holding second fluid 2308, such as an oil. The first fluid 2304 may contain particles 2310. In one wall of the reservoir 2302 is a piezoelectric element 2312 operatively couple to an aperture.

Upon operation of the piezoelectric element 2312 the first fluid 2304 and the particles 2310 exit the aperture and form a droplet 2314 containing the particle 2310. The droplet 2314 is collected in the second fluid 2308 held in the collection reservoir 2306. The second fluid 2308 may or may not be circulated. The signal applied to the piezoelectric element 2312 may be a sinusoidal signal as indicated in the inset photo.

Example 24

Figure 24:
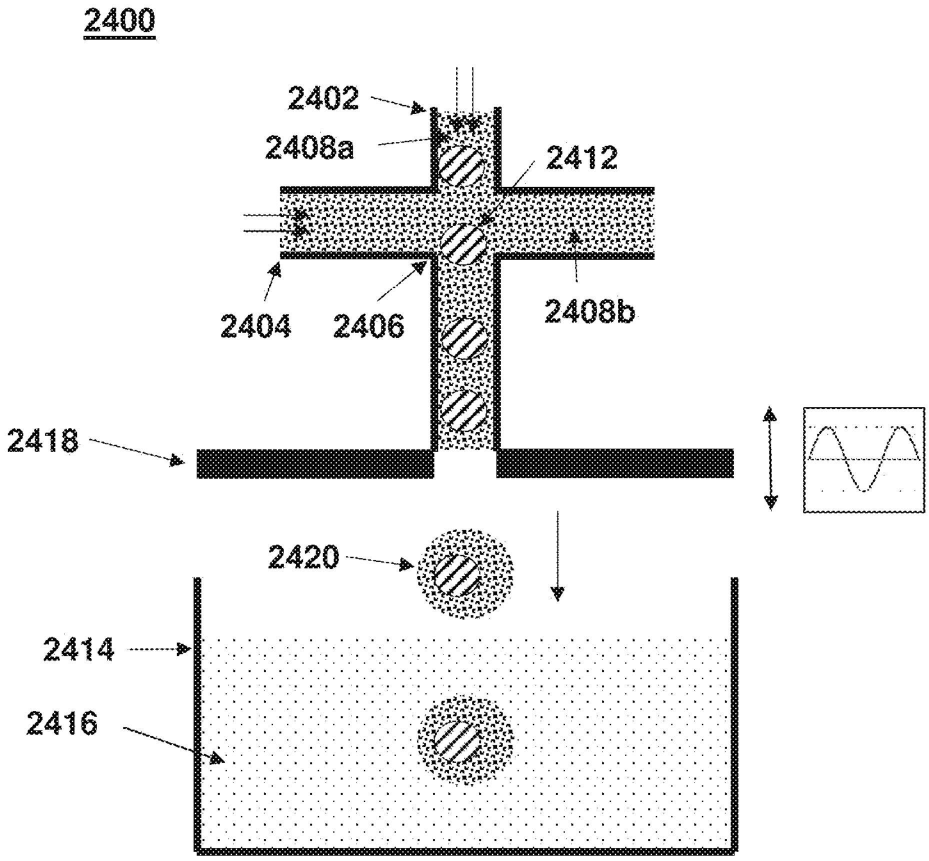
FIG. 24 is a scheme of a microfluidic device including a piezoelectric element for droplet formation. The droplets contain a particle and are collected in a bath after formation.

FIG. 24 shows an embodiment of a device according to the invention that includes a piezoelectric element for droplet formation. The device 2400 includes a first channel 2402 and a second channel 2404 that meet at junction 2406. The first channel 2402 carries a portion of first fluid 2408*a*, and the second channel 2404 carries another portion of first fluid 2408*b*. One of the portions of the first fluid 2408*a* or 2408*b* further includes a particle 2412. The device includes a collection reservoir 2414 for holding second fluid 2416, such as an oil. The distal end of the first channel includes a piezoelectric element 2418 operatively couple to an aperture.

The portion of first fluid 2408*a* flowing through the first channel 2402, e.g., carrying particles 2412, combines with the portion of the first fluid 2408*b* flowing through second channel 2404 to form the first fluid, and the first fluid continues to the distal end of the first channel 2402. Upon actuation of the piezoelectric element 2418 at the distal end of the first channel 2402, the first fluid and particles 2412 form a droplet 2420 containing a particle 2412. The droplet 2420 is collected in the second fluid 2416 in the collection reservoir 2414. The second fluid 2416 may or may not be circulated. The signal applied to the piezoelectric element 2418 may be a sinusoidal signal as indicated in the inset photo.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

Other embodiments are in the claims.

The invention claimed is:

1. A device for ordering particles in a liquid, comprising:

a) a first channel having a first inlet and a first outlet; and b) a first source of acoustic energy operatively coupled to the first channel to produce an acoustic wave having a first plurality of evenly spaced nodes disposed longitudinally in the first channel to generate evenly spaced first particles in a first liquid in the first channel in the direction of flow;

c) a first pump configured to transport the first particles in the first channel;

d) a second channel having a second inlet and a second outlet, wherein the second channel has an intersection with the first channel between the first inlet and the first outlet;

e) a second source of acoustic energy operatively coupled to the second channel to produce an acoustic wave having a second plurality of evenly spaced nodes disposed longitudinally in the second channel to generate evenly spaced second particles in a second liquid in the second channel in the direction of flow;

f) a second pump configured to transport the second particles in the second channel; and g) a third channel, wherein the third channel has an intersection with the first channel between (i) the intersection of the second channel and (ii) the first channel outlet.

2. The device of claim 1, further comprising a source of first particles in fluid communication with the first inlet.

3. The device of claim 1, wherein the first source of acoustic energy comprises an interdigitated transducer or a piezoelectric material.

4. The device of claim 1, further comprising a source of second particles in fluid communication with the second channel.

5. The device of claim 1, wherein the first source of acoustic energy comprises a standing acoustic wave actuator.

6. The device of claim 1, wherein the second source of acoustic energy comprises an interdigitated transducer or a piezoelectric material.

7. The device of claim 1:

i) wherein the device further comprises a collection region in fluid communication with the first outlet; or ii) wherein a droplet formation region comprises the intersection of the third channel the first channel, and wherein the droplet formation region is configured to form droplets comprising a first particle from the first liquid in the first channel and a second particle from the second liquid in the second channel, wherein the droplet formation region is in fluid communication with the first outlet.

8. A method of ordering particles in a liquid, comprising:

a) providing the device of claim 1;

b) actuating the first source of acoustic energy of the device to propagate the acoustic wave having the first plurality of nodes in the first channel and actuating the second source of acoustic energy of the device to propagate the acoustic wave having the second plurality of nodes in the second channel;

c) allowing first particles in the first liquid in the first channel to order according to the first plurality of nodes and allowing second particles in the second liquid in the second channel to order according to the second plurality of nodes; and d) pumping the ordered particles in the first channel with the first pump and pumping the ordered particles in the second channel with the second pump.

9. The method of claim 8, wherein:

i) the first source of acoustic energy comprises an interdigitated transducer or a piezoelectric material; or ii) the device further comprises a collection region in fluid communication with the first outlet.

10. The method of claim 8, wherein the particle comprises a cell, a bead, or a combination thereof.

11. A method of producing droplets comprising a particle, comprising:

a) providing a device comprising:

i) a first channel having a first inlet and a first outlet;

ii) a first source of acoustic energy operatively coupled to the first channel;

iii) a droplet formation region in fluid communication with the first outlet;

iv) a first pump configured to transport the ordered particles in the first channel;

v) a second channel having a second inlet and a second outlet, wherein the second channel intersects the first channel between the first inlet and the first outlet;

vi) a second source of acoustic energy operatively coupled to the second channel; and vii) a second pump configured to transport the ordered particles in the second channel;

b) actuating the first source of acoustic energy of the device to propagate an acoustic wave having a first plurality of evenly spaced nodes disposed longitudinally in the first channel and actuating the second source of acoustic energy of the device to propagate an acoustic wave having a second plurality of evenly spaced nodes disposed longitudinally in the second channel;

c) allowing first particles in a first liquid to evenly space in the first channel in the direction of flow and allowing second particles in a second liquid in the second channel to evenly space in the second channel in the direction of flow; and d) pumping the first particles in the first channel to the droplet formation region with the first pump and pumping the second particles in the second channel with the second pump to the droplet formation region so that the droplets produced by the droplet formation region preferentially contain a specified number of particles.

12. The method of claim 11, wherein:

i) the first source of acoustic energy comprises an interdigitated transducer or a piezoelectric material; and/or ii) the device further comprises a collection region in fluid communication with the first outlet.

13. The method of claim 12, wherein the first source of acoustic energy comprises a standing acoustic wave actuator that propagates an acoustic wave with one or more the first plurality of nodes in the first channel.

14. The method of claim 13, wherein:

i) the second source of acoustic energy comprises an interdigitated transducer or a piezoelectric material; and/or a specified number of particles in the first channel are preferentially associated with a specified number of particles in the second channel at the intersection of the first and second channels.

15. The method of claim 14, wherein:

i) the specified number of particles in the first channel is 1;

ii) the specified number of particles in the second channel is 1; and/or iii) the particles in the first channel and/or the second channel comprise a cell, a bead, or a combination thereof.

16. A system for ordering particles in a liquid, comprising:

a) a device comprising a first channel having a first inlet and a first outlet;

b) a first source of acoustic energy operatively coupled to the first channel to produce an acoustic wave having a first plurality of evenly spaced nodes disposed longitudinally in the first channel to generate evenly spaced first particles in a first liquid in the first channel in the direction of flow;

c) a first pump configured to transport the first particles in the first channel;

d) a second channel having a second inlet and a second outlet, wherein the second channel intersects the first channel between the first inlet and the first outlet;

e) a second source of acoustic energy operatively coupled to the second channel to produce an acoustic wave having a second plurality of evenly spaced nodes disposed longitudinally in the second channel to generate evenly spaced second particles in a second liquid in the second channel in the direction of flow;

f) a second pump configured to transport the second particles in the second channel; and g) a third channel, wherein the third channel has an intersection with the first channel between (i) the intersection of the second channel and (ii) the first channel outlet.

17. The system of claim 16, wherein:

i) the system further comprises a first source of first particles in fluid communication with the first inlet;

ii) the first source of acoustic energy comprises an interdigitated transducer or a piezoelectric material; and/or iii) the device further comprises a collection region in fluid communication with the first outlet.

18. The system of claim 17, wherein:

i) the device further comprises a source of second particles in fluid communication with the second channel.

19. The system of claim 16, wherein:

i) the second source of acoustic energy comprises an interdigitated transducer or a piezoelectric material; and/or ii) the particles in the second channel comprise a cell, a bead, or a combination thereof.

20. The system of claim 16, wherein the particles in the first channel comprise a cell, a bead, or a combination thereof.

* * * * *